(12) United States Patent
Gurski

(10) Patent No.: US 12,447,812 B2
(45) Date of Patent: Oct. 21, 2025

(54) HYBRID VEHICLE CONVERSION SYSTEM

(71) Applicant: CARBYNE ENTERPRISES, INC., Seattle, WA (US)

(72) Inventor: Thomas Q. Gurski, Seattle, WA (US)

(73) Assignee: Carbyne Enterprises, Inc., Seattle, WA (US)

( * ) Notice: Subject to any disclaimer, the term of this patent is extended or adjusted under 35 U.S.C. 154(b) by 733 days.

(21) Appl. No.: 17/659,395

(22) Filed: Apr. 15, 2022

(65) Prior Publication Data

US 2022/0348070 A1 Nov. 3, 2022

Related U.S. Application Data

(63) Continuation of application No. 16/079,058, filed as application No. PCT/US2017/020062 on Mar. 1, 2017, now Pat. No. 11,332,000.

(Continued)

(51) Int. Cl.
*F16H 7/06* (2006.01)
*B60K 1/00* (2006.01)
(Continued)

(52) U.S. Cl.
CPC ............ *B60K 6/40* (2013.01); *B60K 6/00* (2013.01); *B60K 6/36* (2013.01); *B60K 6/48* (2013.01);
(Continued)

(58) Field of Classification Search
CPC .......... B62D 5/063; B62D 5/064; B60K 1/00; B60K 6/00; B60K 6/36; B60K 6/40; B60K 6/48; B60K 6/46; B60K 2001/001; B60K 2001/003; B60K 2001/005; B60K 2001/006; B60K 2006/4808; B60L 50/16; B60L 2200/46; B60W 20/00; B60W 2300/14; B60Y 2200/92; B60Y 2304/076;
(Continued)

(56) References Cited

U.S. PATENT DOCUMENTS

| 3,876,255 A | 4/1975 | Ilon |
| 4,034,821 A | 7/1977 | Stoddard et al. |

(Continued)

OTHER PUBLICATIONS

International Search Report dated May 10, 2017 issued in PCT/US2017/020062 filed Mar. 1, 2017, which is related to the present application.

(Continued)

*Primary Examiner* — Jason D Shanske
*Assistant Examiner* — Felicia L. Brittman-Alabi
(74) *Attorney, Agent, or Firm* — Knobbe Martens Olson & Bear LLP

(57) ABSTRACT

Provided herein is an auxiliary hybrid system (AHS) that may be configured to provide electrical propulsion to an e.g., internal combustion-powered vehicle through the use of a battery and electric motor. Alternatively, the AHS may be configured to increase range to electric vehicles through the use of an internal combustion-powered generator. In either embodiment, the AHS is added to a vehicle without altering the operation of the vehicles' standard drivetrain, allowing the vehicle to operate conventionally when the AHS is not engaged. The AHS is compatible with a wide range of vehicles with a minimum of vehicle-specific parts.

34 Claims, 27 Drawing Sheets

Related U.S. Application Data

(60) Provisional application No. 62/302,176, filed on Mar. 2, 2016.

(51) Int. Cl.
| | |
|---|---|
| *B60K 6/00* | (2007.10) |
| *B60K 6/36* | (2007.10) |
| *B60K 6/40* | (2007.10) |
| *B60K 6/48* | (2007.10) |
| *B60W 20/00* | (2016.01) |
| *F16H 1/14* | (2006.01) |
| *F16H 1/16* | (2006.01) |
| *F16H 7/08* | (2006.01) |
| *B62D 5/06* | (2006.01) |

(52) U.S. Cl.
CPC ............... *B60W 20/00* (2013.01); *F16H 1/14* (2013.01); *F16H 1/16* (2013.01); *F16H 7/06* (2013.01); *F16H 7/08* (2013.01); *B60K 2001/005* (2013.01); *B60Y 2200/92* (2013.01); *B62D 5/063* (2013.01); *B62D 5/064* (2013.01); *Y02T 10/62* (2013.01)

(58) Field of Classification Search
CPC ..... F16H 1/14; F16H 1/16; F16H 7/06; F16H 7/08; Y02T 10/62; Y02T 10/7072
USPC .......................................................... 180/11
See application file for complete search history.

(56) References Cited

U.S. PATENT DOCUMENTS

| | | | |
|---|---|---|---|
| 4,222,283 | A | 9/1980 | Nagy |
| 4,269,280 | A | 5/1981 | Rosen |
| 5,680,907 | A * | 10/1997 | Weihe ...................... B60K 6/48 180/2.2 |
| 6,386,789 | B1 | 5/2002 | Chausse et al. |
| 8,606,443 | B2 | 12/2013 | Pandit |
| 8,954,232 | B2 | 2/2015 | Takeuchi |
| 9,902,223 | B2 | 2/2018 | Cervantes |
| 10,436,601 | B2 | 10/2019 | Gilman |
| 10,549,636 | B2 | 2/2020 | Skaff |
| 2003/0102322 | A1 | 6/2003 | Jones et al. |
| 2009/0127008 | A1* | 5/2009 | Batdorf ...................... B60K 6/48 29/401.1 |
| 2010/0106351 | A1 | 4/2010 | Hanssen et al. |
| 2011/0320074 | A1 | 12/2011 | Erlston et al. |
| 2014/0081490 | A1 | 3/2014 | Adelman |
| 2014/0346755 | A1 | 11/2014 | Svihla |
| 2015/0045180 | A1 | 2/2015 | Hodowanec et al. |
| 2015/0142215 | A1 | 5/2015 | Oltheten et al. |

OTHER PUBLICATIONS

Extended European Search Report dated Dec. 11, 2019 for related European Application No. 17760670.4, in 9 pages.

\* cited by examiner

HYBRID VEHICLE CONVERSION SYSTEM

PRIORITY APPLICATIONS

The present application is a continuation of U.S. patent application Ser. No. 16/079,058, filed Aug. 22, 2018, which is a U.S. National Stage Application of International Patent Application No. PCT/US2017/020062, filed Mar. 1, 2017, which claims the benefit of U.S. Provisional Patent Application No. 62/302,176, entitled "Auxiliary Hybrid System" filed Mar. 2, 2016, each of which is incorporated herein by reference in its entirety. Any and all applications for which a foreign or domestic priority claim is identified in the Application Data Sheet as filed with the present application are hereby incorporated by reference under 37 CFR 1.57.

TECHNICAL FIELD

This application relates generally to a vehicle, and more specifically to a hybrid vehicle, and a system for retrofitting a known vehicle to achieve a hybrid vehicle.

BACKGROUND

In an effort to conserve resources and reduce environmental impact, a growing effort has been made to produce electrical vehicles or hybrid electrical vehicles, which use a combination of electric power and an alternate power source, such as an internal combustion engine. Although the rate of sales has been increasing greatly in recent years for hybrid vehicles, hybrid vehicles still only account for a mere fraction of new vehicle sales. One reason for this is that there is a significant premium on the price for hybrid vehicles that tends to far exceed the fuel cost and any tax savings that may be achieved with the hybrid vehicle. Furthermore, there is not currently any aftermarket conversion available for converting a standard internal combustion engine into a hybrid vehicle.

It would be desirable to provide a system for use in converting a standard internal combustion engine into a hybrid vehicle to increase the fuel efficiency of internal combustion vehicles. It would also be desirable to provide such a conversion system in an economical manner that will allow the owner to realize a savings in the operation of the vehicle.

SUMMARY

Provided herein is an auxiliary hybrid system (AHS) that may be configured to provide electrical propulsion to an e.g., internal combustion-powered vehicle through the use of a battery and electric motor. Alternatively, the AHS may be configured to increase range of electric vehicles through the use of an internal combustion-powered generator. In either embodiment, the AHS is added to a vehicle without altering the operation of the vehicles' standard drivetrain, allowing the vehicle to operate conventionally when the AHS is not engaged. The AHS is compatible with a wide range of vehicles with a minimum of vehicle-specific parts.

A system is disclosed including: an energy storage device configured to store power for a vehicle; a power conversion device configured to transfer power between the energy storage device and the vehicle; a power conversion controller configured to regulate power flow between the energy storage device and the power conversion device; and an input device configured to receive input from a user and configured to translate the input into instructions for the power conversion controller.

BRIEF DESCRIPTION OF THE DRAWINGS

The above-mentioned and other features and advantages of the present disclosure, and the manner of attaining them, will become more apparent and the disclosure itself will be better understood by reference to the following description of nonlimiting embodiments of the disclosure, taken in conjunction with the accompanying drawings, wherein.

DETAILED DESCRIPTION

The present disclosure provides for a hybrid vehicle conversion system, methods of attaching the conversion system to a vehicle, and methods of using the hybrid vehicle conversion system. Various nonlimiting embodiments of the present disclosure will now be described to provide an overall understanding of the principles of function, design and use of the vehicle conversion system disclosed herein. One or more examples of these nonlimiting embodiments are illustrated in the accompanying drawings. Those of ordinary skill in the art will understand that the methods describe herein and illustrated in the accompanying drawings are nonlimiting example embodiments and that the scope of the various nonlimiting embodiments of the present disclosure are defined solely by the claims. The features illustrated or described in connection with one nonlimiting embodiments can be combined with the features of other nonlimiting embodiments. Such modifications and variations are intended to be included within the scope of the present disclosure.

Figure 1:
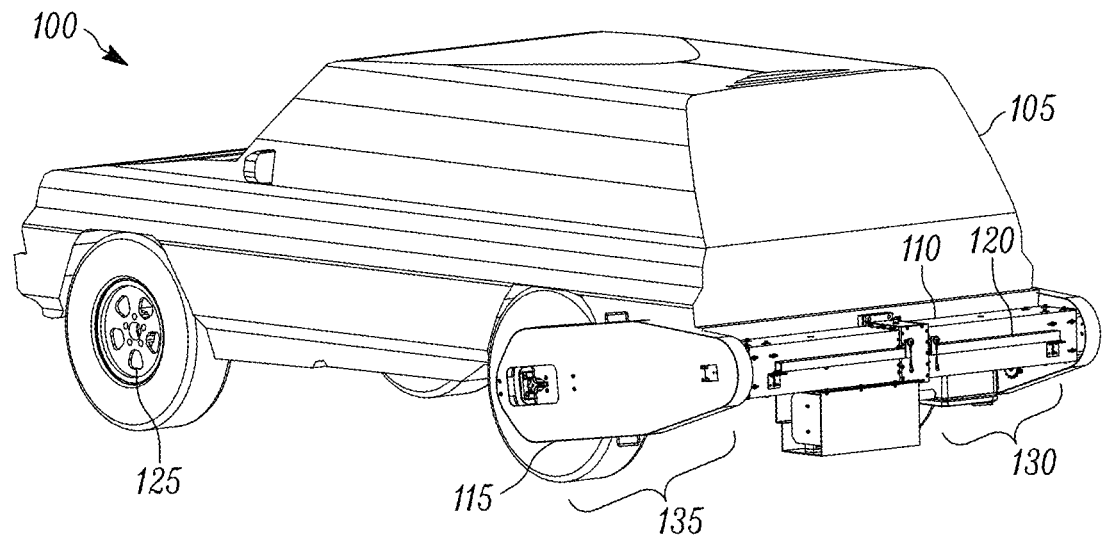
FIG. 1 is an isometric rear view of an example electric version (AHS-E) of an AHS engaged with a vehicle in accordance with an embodiment of the disclosure.

In an electric embodiment of the auxiliary hybrid system (AHS-E), the AHS-E may include a battery pack or other energy storage device, an electric motor or other power conversion device, drivetrain, chassis, motor controller, mounting system, coupling system, battery charger, throttle, and control and display electronics. The AHS-E may be coupled to a vehicle in a configuration that allows mechanical power to be transferred between the AHS-E and the vehicle to provide propulsion and/or braking, as shown in FIG. 1. The AHS-E may also be coupled to a vehicle in a configuration such that no power coupling between the vehicle and the AHS-E is in effect, as shown in FIG. 2.

FIG. 1 shows an example of a system 100 where an AHS-E drive 110 is coupled to a vehicle 105. Vehicle 105 can be any suitable vehicle having one or more wheels such as a light-duty vehicle, a medium-duty passenger vehicle, a light-duty truck, or a heavy-duty vehicle, as defined by the United States Environmental Protection Agency, or also an off-highway vehicle, a 2-wheeled motorcycle, or a 3-wheeled motorcycle. In some embodiments, vehicle 105 is a conventional four-wheel passenger vehicle such as a Jeep® Cherokee. In such embodiments, vehicle 105 may be a gas or diesel powered vehicle, an electric vehicle, a gas-electric hybrid vehicle, a diesel-electric hybrid vehicle, a fuel cell vehicle, a natural gas vehicle, a natural gas-electric hybrid vehicle, a plug-in hybrid vehicle, or the like.

System 100 includes AHS-E drive 110 mounted to vehicle 105 with one or more swing arms 115 in an engaged position 135 and coupled to one or more wheels 125 of vehicle 105. While shown as being coupled to two wheels 125, AHS-E drive 110 may be coupled to any suitable number of wheels 125 of vehicle 105. Swing arms 115 may include a chain drive as described in FIG. 8. While not wishing to be bound by any particular construction, swing arms 115 may be any suitable structure capable of transmitting power from a rear drive 305, as described in FIG. 3, to the wheels 125.

Figure 2:
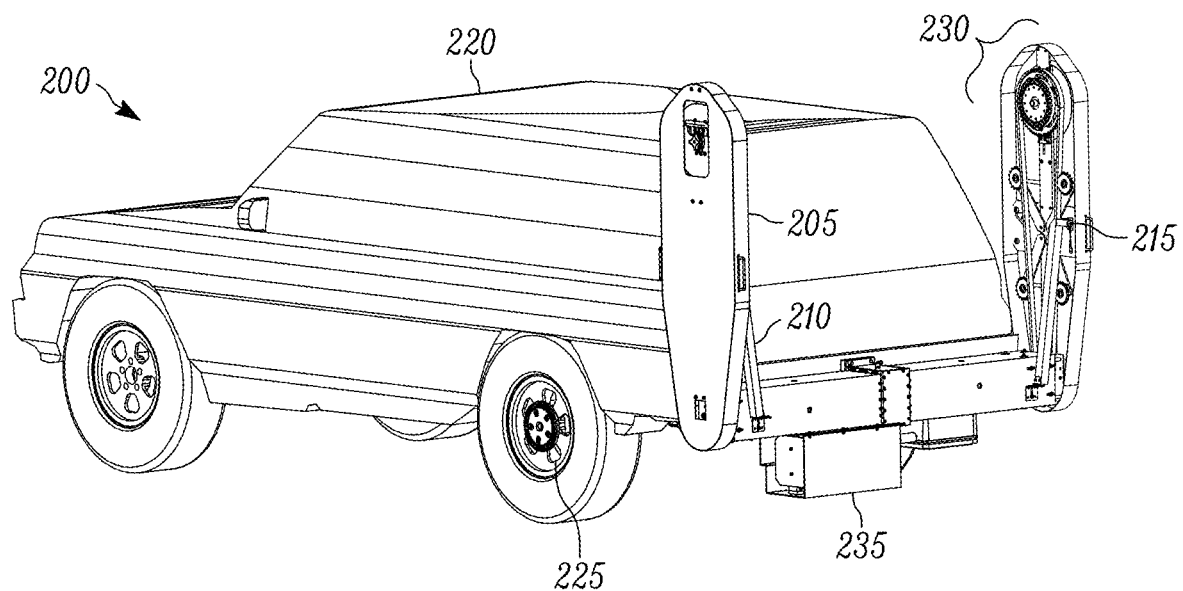
FIG. 2 is an isometric rear view of an AHS-E with a drivetrain decoupled from the vehicle in accordance with an embodiment of the disclosure.

FIG. 2 shows an example of a system 200 where an AHS-E drive 235 is decoupled from the wheels 225 of a vehicle 220. The AHS-E drive 235 is mounted to the vehicle 220 with the swing arms 205, shown as disengaged from the wheels 225 of vehicle 220 and in a standby position 230. The swing arms 205 may be supported by supports 210, which may be connected to the swing arms 205 with a pin 215 or a clip, a screw, a nut, an elastic band, hook-and-loop fastener, magnet, or any other common method of mechanically coupling or connecting two or more components together. When the swing arms 205 are engaged with the wheels 225, the supports 120 may be in a stowed position 130, as shown in FIG. 1, and secured with pin 215 or a clip, a screw, a nut, an elastic band, hook-and-loop fastener, magnet, or any other common method of mechanically coupling or connecting two or more components together.

Thus, it can be appreciated, that there are multiple general positions for the swing arms 115, 205—an engaged position 135, where the AHS-E drive 110 is engaged with the wheels 125, and a standby position 230, where the AHS-E drive 235 is disengaged from vehicle wheels 225. The swing arms 115, 205 may also be in a lowered position 2715 where they are in contact with the ground, as described in FIG. 27, so that the AHS-E drive 300, described in FIG. 3, can be moved around when disconnected from the vehicle 220.

Figure 3:
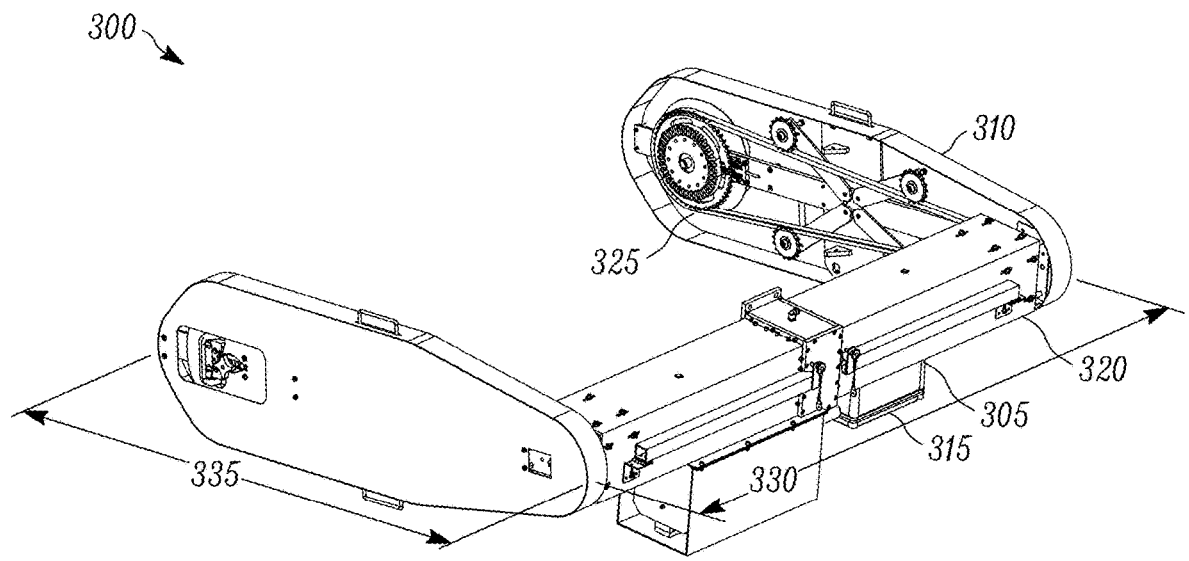
FIG. 3 is an isometric rear view of a drive of an AHS-E in accordance with an embodiment of the disclosure.

An example of an AHS-E drive subsystem 300 is shown in FIG. 3. In some embodiments, AHS-E drive subsystem 300 includes a power conversion device or rear drive 305 and one or more swing arms 310. The rear drive 305 includes a chassis 320, one or more motors (not shown), a portion of the drivetrain (not shown), and a portion of the mounting system components (not shown). The chassis 320 provides a structure for mounting and/or enclosing the components of the rear drive 305. The portion of the drivetrain (not shown) included in the rear drive 305 transfers power between one or more motors (not shown) and the swing arms 310. The swing arms 310 include a portion of the drivetrain 325. The swing arms 310 transfer power between the rear drive 305 and the vehicle wheels (not shown). AHS-E drive 300 may also include a lubrication pump 315 to circulate oil or other suitable lubricant to components of the rear drive 305 requiring lubrication.

The AHS-E drive 300 may be mounted to a vehicle using a mounting system in which a portion of the mounting system components are affixed to the vehicle and couple with components of the mounting system that are included in the AHS-E drive. The mounting system may allow the AHS-E drive to be easily mounted to the rear or any other desirable location of the vehicle. In one embodiment, the mounting system utilizes a trailer hitch receiver as a component of system as they are widely available for a variety of vehicles and follow a common standard, providing consistent features to interface with. AHS-E drive subsystem may have a width 330 in the range of approximately 36-102 inches and a longitudinal length 335 in the range of approximately 12-72 inches.

Figure 4:
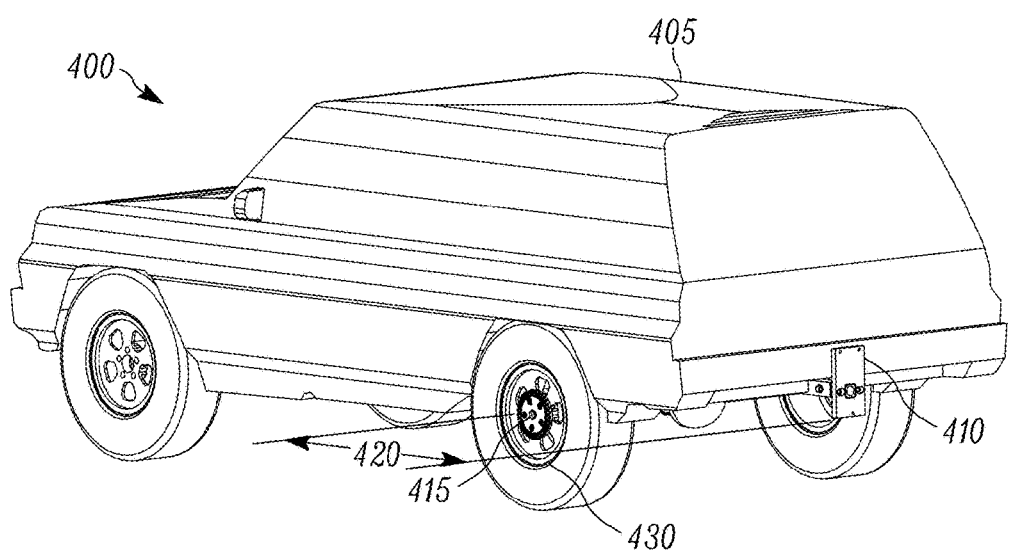
FIG. 4 is an isometric rear view of a vehicle subsystem in accordance with an embodiment of the disclosure.

FIG. 4 shows an example vehicle subsystem 400 including a vehicle 405 having vehicle-mounted components 410 of the mounting system and one or more wheel-side coupling assemblies 415. Components 410 may interface with corresponding components, e.g. male pilot feature 1515 and pins 1525 described in FIG. 15, on the AHS drive 300. Wheel-side coupling assembly 415 may interface with corresponding components, e.g. a coupling assembly 530 described in FIG. 5, on the on the AHS drive 300.

In general, a coupling system may be used to transfer power from the drive to the vehicle wheels. The couplings system may allow the drivetrain to be coupled to the vehicle wheels when the AHS-E is in use, and decoupled when not in use. The coupling system may generally include two halves, with one half included as part of the swing arm and the other half rigidly connected to a vehicle wheel. The two halves may be configured such that they can be rigidly connected together and able to transmit torque between them when coupled. The swing arm half of the coupling system may be a coupling assembly 530 and the vehicle half of the coupling system may be a wheel-side coupling assembly 415, both described below.

Figure 5:
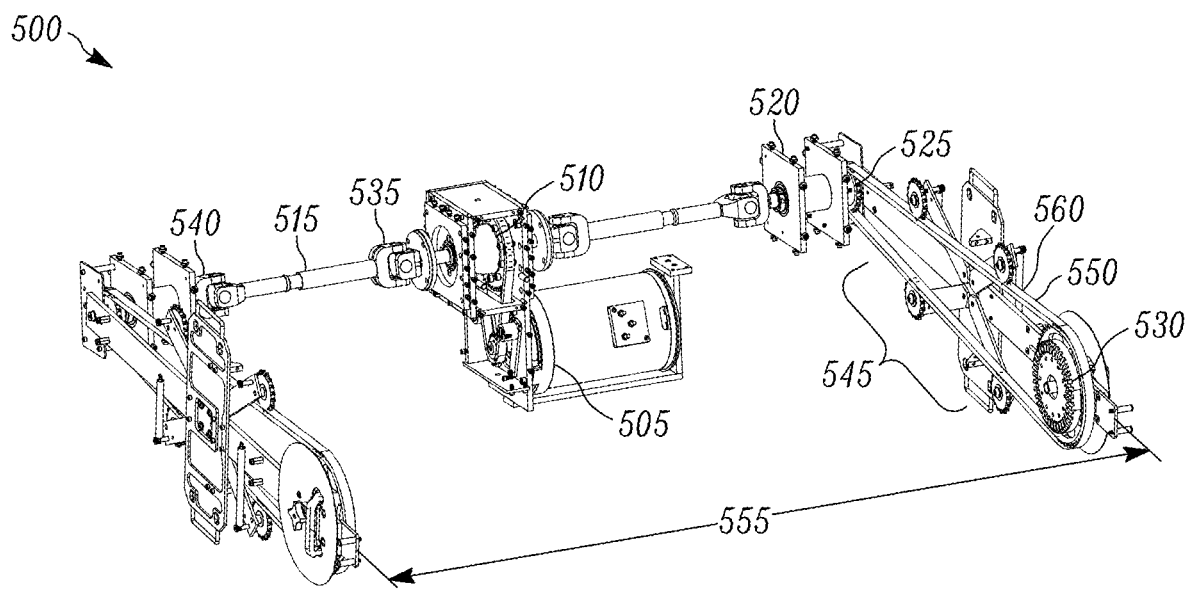
FIG. 5 is an isometric front view of a motor and drivetrain of an AHS-E in accordance with an embodiment of the disclosure.
Figure 44:
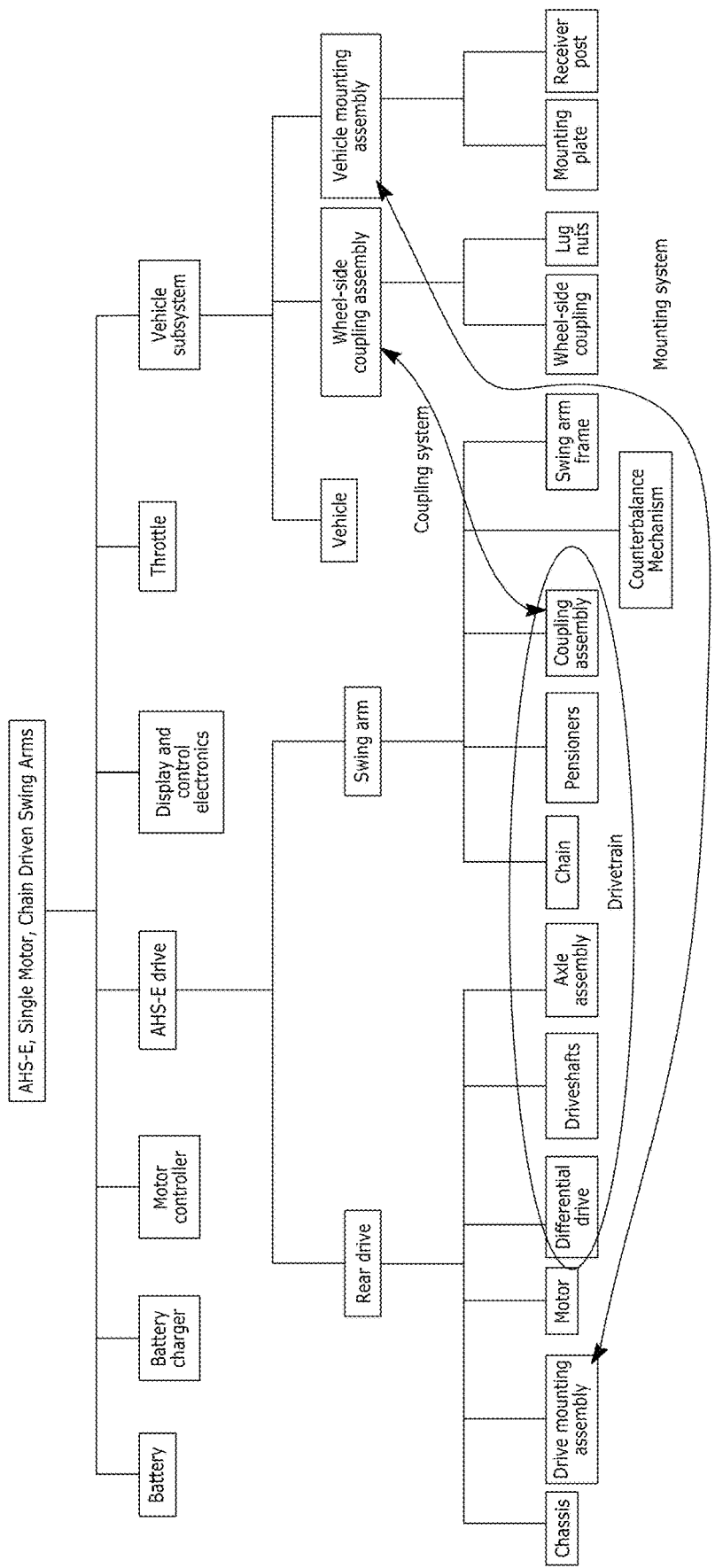
FIG. 44 is an example layout of an AHS-E with a single motor and chain-driven swing arm in accordance with an embodiment of the disclosure.

Referring generally to FIG. 44 and to FIG. 5, the AHS-E may be configured with a single motor 505 and one or more swing arms 545 that includes a chain 550. FIG. 44 shows an example AHS-E layout with a single rear motor and swing arms that include a chain.

FIG. 5 shows an example drivetrain 500 and a motor 505. Drivetrain 500 includes a differential 510, one or more driveshafts 515, one or more axle assemblies 520, and one or more swing arms 545. In some embodiments, drivetrain 500 may be coupled to a vehicle using a coupling system 1100, 1200, as described in FIGS. 11 and 12, so that mechanical power can be transferred between the drivetrain 500 and vehicle. The coupling system may be a quick coupling system, which may allow the drivetrain 500 to be coupled to the rear wheels of the vehicle when the AHS-E is in use and decoupled when not in use. The wheel-side coupling assembly 415 of the coupling system may be connected to the wheels of the vehicle using specially configured lug nuts. Because there are a limited number of lug nut geometries in use in the world's fleet of vehicles, a small number of different configurations of lug nuts can be used to mount the vehicle portion of the coupling system to a large variety of vehicles.

Figure 6:
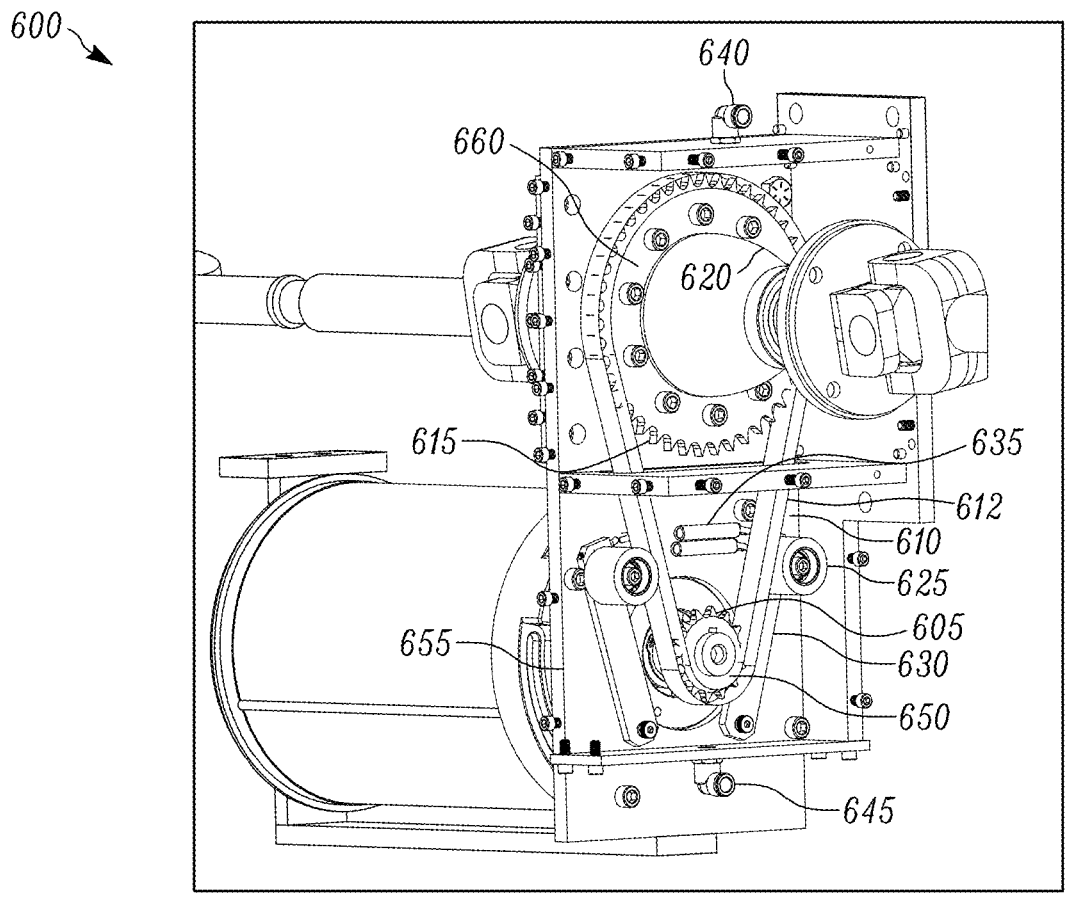
FIG. 6 is an isometric rear view of a differential drive using a chain in accordance with an embodiment of the disclosure.

Power may be transferred between the motor 505 and the differential 510 via a differential drive 600, as shown in FIG. 6. Power may be transferred by the differential drive 600 with any coupler 610 such as a chain, belt, gear set, or the like. As shown, coupler 610 is a chain 612.

In some embodiments, the differential 510 may decrease the drivetrain rotational speed, increase the drivetrain torque, split drivetrain power such that a portion of the power may be sent left and portion may be sent right, and/or transmit power between the motor 505 and the driveshafts 515. In some embodiments, differential 510 may also allow the left and right driveshafts 515 to rotate at different speeds, such as occurs when a vehicle is turning and the outside wheel needs to rotate faster than the inside wheel. Any suitable differential 510 may be utilized such as automotive-style ring and pinion differential.

Driveshafts 515 may transmit power between the differential 510 and the axle assemblies 520. As shown, driveshafts 515 may be capable of telescoping so that the width 555 of the drivetrain 500 can be adjusted to compensate for vehicles of various track widths. As used herein, track width refers to the distance between the outside faces of the pair of wheels to which coupling assemblies 530 are to be connected. As used herein, telescoping refers to the ability of a component to change length, typically by one portion of the component sliding inside the remaining portion in the manner of a handheld telescope. The driveshafts 515 may include an inner universal joint 535 and an outer universal joint 540 to compensate for misalignment, for example if the axle assemblies 520 are not sufficiently well-aligned with the differential 510 for the use of a solid shaft.

Figure 11:
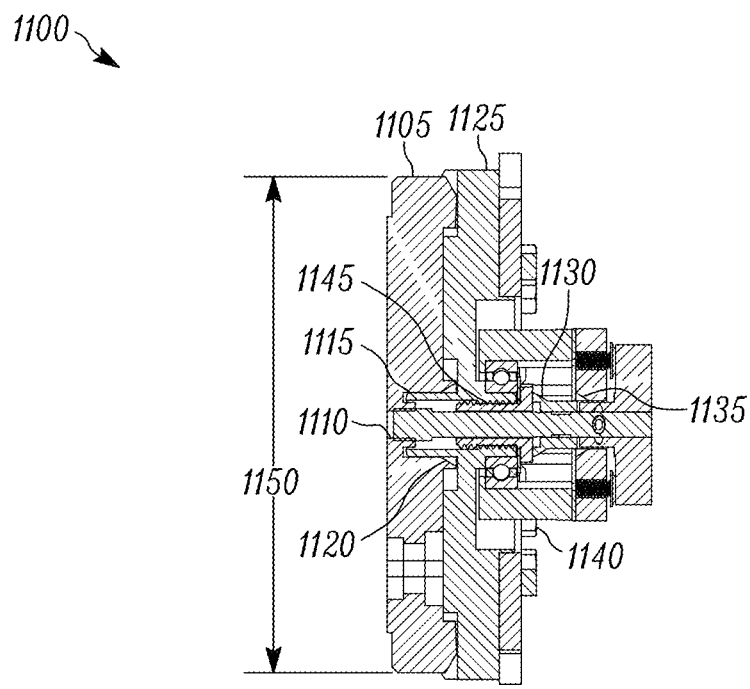
FIG. 11 is a front section view of a coupling system in a fully-coupled state in accordance with an embodiment of the disclosure.

In some embodiments, power may be transferred between the axle assemblies 520 and a coupling assembly 530 by a swing arm 545. The swing arm 545 may transfer power with any type of coupler 560, such as a chain and one or more sprockets, or a shaft and one or more gears. As shown, swing arm 545 uses a chain 550 to transfer power between a drive sprocket 525 and a wheel sprocket 855, shown in FIG. 8. Referring briefly to FIG. 11, when coupled to a corresponding wheel-side coupling 1105, drive-side coupling 1125 may transmit power to the vehicle 105 as shown in FIG. 1.

FIG. 6 shows an example differential drive 600. Differential drive 600 includes a motor sprocket 605, a differential chain 610, a differential sprocket 615, a differential spool 620, one or more differential roller tensioners 625, one or more differential tensioner arms 630, and one or more differential tensioner springs 635. Motor sprocket 605 may be rigidly connected to the motor shaft 650. The differential drive 600 may transmit power between motor shaft 650 and differential spool 620. As used herein, differential spool 620 refers to the rotating structure of the differential 660 that houses the differential gearing (not shown).

In some embodiments, motor sprocket 605 may drive differential chain 610, which may transmit power between the motor sprocket 605 and differential sprocket 615. In some embodiments, the differential sprocket 615 may be rigidly mounted to the differential spool 620. As desired, slack may be removed from differential chain 610 by a pair of differential roller tensioners 625. Differential roller tensioners 625 may be mounted to differential tensioner arms 630 which may be rotationally mounted to the rear drive structure 655. Differential tensioner arms 630 may be pulled inward towards each other by one or more differential tensioner springs 635. This arrangement may allow slack to be removed from differential chain 610 regardless of which direction torque is being applied by the motor shaft 650.

While described with chains and sprockets, differential drive 600 may alternately include belts and pulleys to transmit power from the motor shaft 650 to the differential spool 620. In such a configuration, the chain 610 may be replaced by a toothed belt and the chain sprockets 525, 855 may be replaced by toothed pulleys. Differential drive 600 may alternatively include a gear pair to transmit power from the motor shaft 650 to the differential spool 620. In such a configuration, a comparatively small gear may be rigidly connected to the motor shaft 650 and may mesh in parallel with a comparatively large gear rigidly connected to the differential spool 620.

In some embodiments, lubricating oil may be circulated in differential drive 600. For example, a lubrication pump (e.g., lubrication pump 315 of FIG. 3) may provide oil from an oil pick-up 645 to an oil outlet 640. Oil may also be delivered to the components of the differential chain drive 600 by a splash system, such as those utilized in engine crank cases, similar to that described in U.S. Pat. No. 730,738 incorporated by reference herein. In such a system, an oil flinger is mounted to one of the rotating components and flings oil from an oil sump onto the components requiring lubrication. Oil may also be delivered to the components of the differential drive 600 by an oil bath system such as is used in an automotive transmission, similar to that described in U.S. Pat. No. 4,222,283, incorporated by reference herein. In such a configuration, the gear or sprocket connected to the motor shaft is partially submerged in a pool of oil. Rotation of the gear or sprocket causes oil to be drawn out of the bath and distributed to other components due to the oil's tendency to cling to components. In either system, oil may also be flung into a series of channels that distribute the oil to various components.

In another example of a differential drive (not shown), the differential is coaxially located with the motor and the driveshafts and may be of an epicyclic gear type. In this example, the motor shaft may be connected directly to the ring gear of the differential and one of the driveshafts may pass through a hollow motor shaft.

Figure 7:
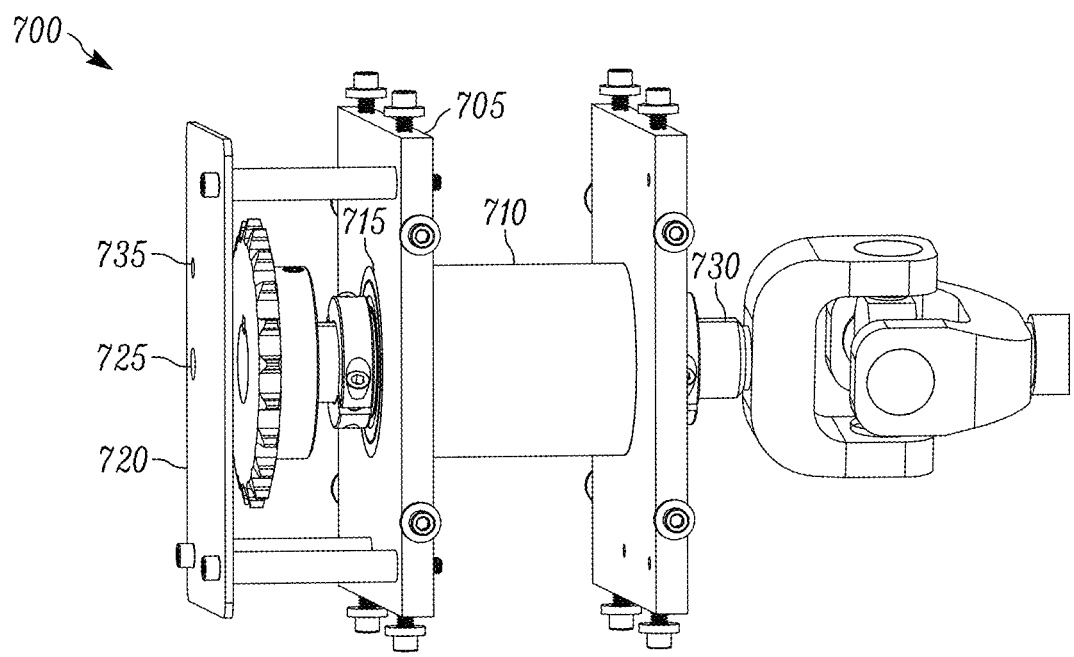
FIG. 7 is an isometric rear view of an axle assembly in accordance with an embodiment of the disclosure.

FIG. 7 shows an example axle assembly 700. Axle assembly 700 includes an axle 730, one or more bearings 715, a bearing tube 710, one or more slider blocks 705, and a pivot plate 720. In some embodiments, the axle 730 may be supported by one or more bearings 715 in a bearing tube 710 so as to be able to resist the forces imparted on the axle 730 by a swing arm 800, described in FIG. 8. The bearing tube 710 may be rigidly connected to one or more slider blocks 705, which may allow the axle assembly 700 to be positioned left-to-right at a variety of locations within the rear drive 305, described in FIG. 3. The ability to be positioned left-to-right may allow the swing arms 800, as described in FIG. 8, to line up with the wheels of vehicles with varying track width.

Figure 8:
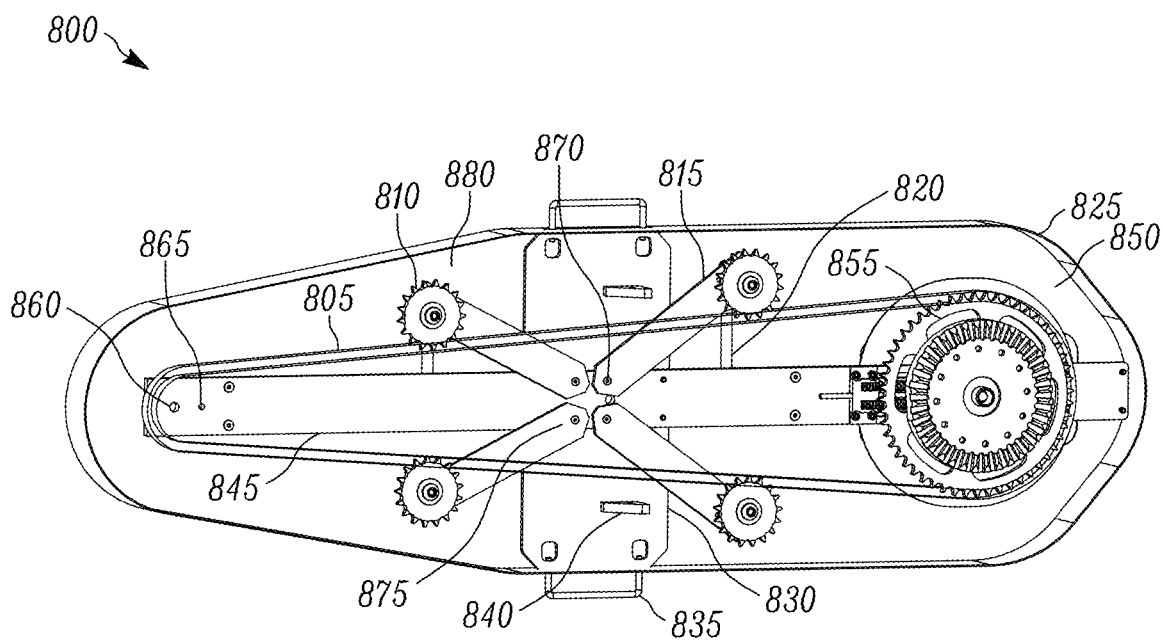
FIG. 8 is an isometric side view of a swing arm using a chain in accordance with an embodiment of the disclosure.

A pivot plate 720 may be rigidly connected to the slider block 705 and may provide a pivot point 725 for a swing arm frame 845, as described in FIG. 8, to mount to that is approximately concentric with the axle 730. A concentric arrangement between the pivot point 725 and the axle 730 may minimize changes in the distance between the axle 730 and a wheel-side coupling 850, as described in FIG. 8, as the vehicle's suspension articulates. As described herein, articulation of the vehicle's suspension refers to the relative movement of the vehicle's wheels to the vehicle's body in response to loads on the suspension, as happens when traversing bumpy terrain or when weight is added to the vehicle.

The pivot plate 720 may also have one or more lock holes 735 that may allow a swing arm frame 845, as described in FIG. 8, to be fixed in various positions by inserting a pin, screw, or other suitable fastener (not shown) through the lock hole 735 in the pivot plate 720 and a lock hole 865 in the swing arm frame 845.

FIG. 8 shows an example of a swing arm 800. In one embodiment, swing arm 800 includes a swing arm frame 845, a chain 805, a coupling assembly 850, one or more tensioners 880, one or more swing arm handles 835, one or more support anchors 840, and a counterbalance mechanism 1300, shown in FIG. 13. Swing arm 800 may allow power to be transferred between the rear drive 305, and the wheels of a vehicle. As shown in FIG. 2, swing arms 205 may also allow AHS-E drive 235 to be partially decoupled from the vehicle 220 such that there is no power-transferring connection.

Power may be transferred or transmitted between a drive sprocket 525 and a wheel sprocket 855 on the coupling assembly 850 by chain 805. Drive sprocket 525 may be coupled to the axle 730 with a pivoting interface (not shown) such that the drive sprocket 525 can pivot relative to the axle 730 and remain coplanar with the wheel sprocket 855. The pivoting interface may be a spherical joint (not shown). Slack may be removed from chain 805 by one or more tensioners 880. Tensioners 880 may include tensioner sprockets 810, which may be rotationally mounted to a tensioner arm 815. Tensioner arms 815 may be rotationally mounted to the swing arm frame 845 at tensioner pivot 870 with a bushing or bearing and a shaft, pin, screw, or any other set of suitable rotational components 875. Each tensioner 880 may be pulled inwards towards the swing arm frame 845 by one or more tensioner springs 820. In some embodiments, the tensioner springs 820 may pull opposing tensioners 880 inwards towards each other. This arrangement allows slack to be removed from chain 805 regardless of which direction torque is being applied to the wheels of a vehicle.

In some embodiments, swing arm frame 845 may provide mounting for the swing arm components, e.g. tensioner arms 815, swing arm handles 835, support anchors 840, and a guard 825. Swing arm frame 845 may be rotationally mounted to a pivot point 725 at a swing arm pivot point 860. One or more lock holes 865 may allow the swing arm frame 845 to be fixed in various positions, such as a standby position 230 when in the decoupled state (as shown in FIG. 2), by inserting a pin (not shown) through one or more lock holes 865 and a corresponding lock hole 735 in pivot plate 720, as described in FIG. 7. One or more swing arm handles 835 may allow a user (e.g., vehicle driver, AHS installer, etc.) to pivot the swing arm frames 845 when engaging or disengaging the AHS. One or more support anchors 840 may provide a hole through which a pin or other fastener may be inserted to couple the swing arm 205 to supports 210 when positioning the swing arms 205 in their standby position 230, as described in FIG. 2. Guard 825 may inhibit user access to moving components that have the potential to cause injury and may reduce noise and provide environmental protection to components of the swing arm 800.

Figure 40:
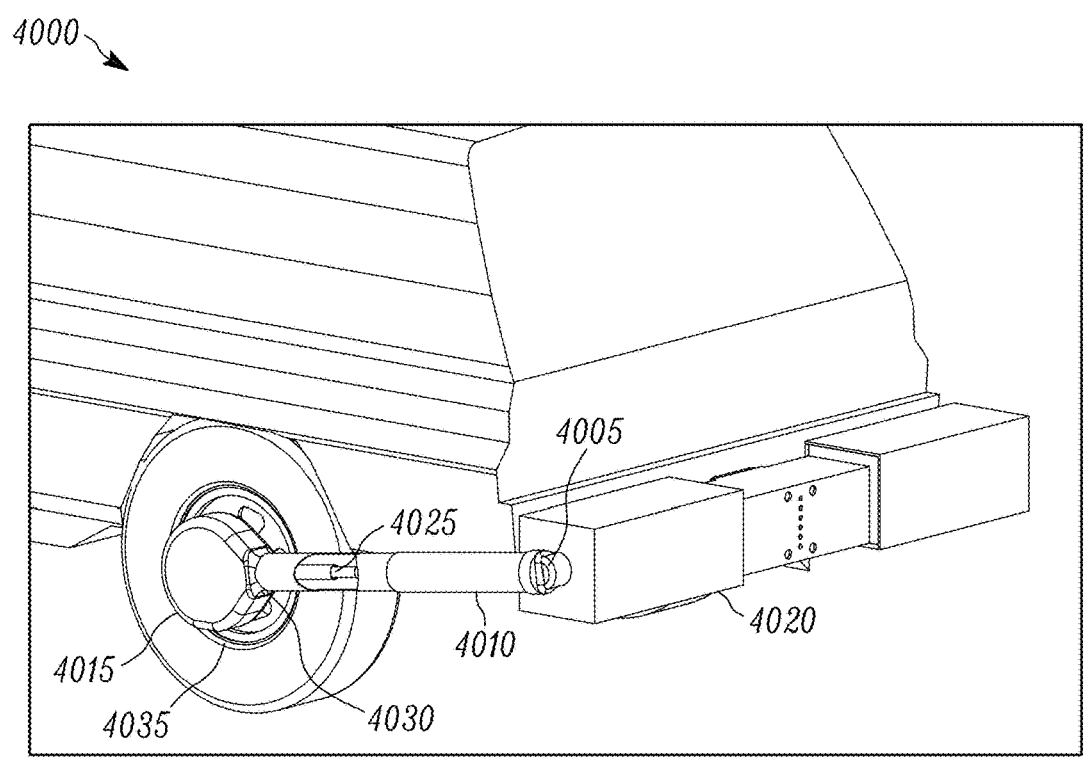
FIG. 40 is an isometric rear view of a dual-motor example of an AHS-E with a shaft-driven swing arm in accordance with an embodiment of the disclosure.
Figure 46:
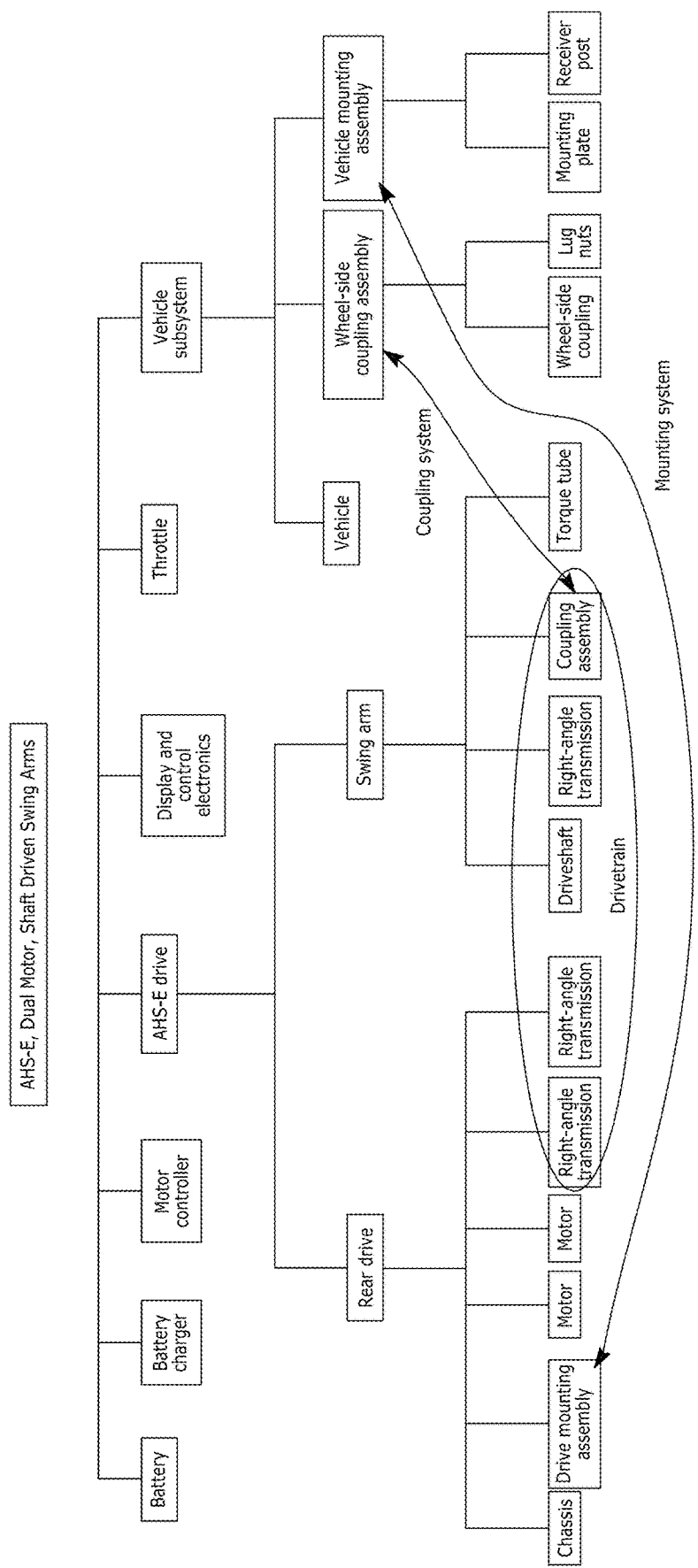
FIG. 46 is an example layout of an AHS-E with dual motors and a shaft-driven swing arm in accordance with an embodiment of the disclosure.

Referring generally to FIG. 46 and to FIG. 40, the AHS-E may be configured with swing arms that include a driveshaft 4025. FIG. 46 shows an example AHS-E layout with dual motors and a shaft-driven swing arm.

FIG. 40 shows an example of a shaft-driven swing arm 4000. The swing arm 4000 includes a first gearbox 4005, a driveshaft 4025, a torque tube 4010, a second gearbox 4015, and a drive-side coupling (not shown). This example replaces the sprockets 525, 855 and chain 805 of the chain-driven swing arm 800, described in FIG. 8, with two gearboxes 4005, 4015 and a driveshaft 4025. In this embodiment, a driveshaft 4025 is used to transfer power between a rear drive 4020 and a drive-side coupling 1020, described in FIG. 10, in a similar manner to shaft-driven motorcycles.

The rear drive 4020 may transfer or transmit power to first gearbox 4005. First gearbox 4005 may be a right-angle gearbox. First gearbox 4005 may be similar to that used in a shaft-driven motorcycle with a transversely oriented engine to transfer power from the transmission (not shown) to the driveshaft 4025. First gearbox 4005 may include e.g., a miter, bevel, or hypoid gear set (not shown). First gearbox 4005 may transfer or transmit power to driveshaft 4025 inside torque tube 4010.

In some embodiments, driveshaft 4025 and/or torque tube 4010 are telescoping components so that their length can change to accommodate vehicles with different distances between their rear wheels and the AHS mounting system at the rear of the vehicle, and to allow for suspension articulation.

Driveshaft 4025 may be supported inside torque tube 4010 by one or more bearings (not shown). At the wheel-end 4030 of the torque tube 4010, the driveshaft 4025 may transfer or transmit power between the first gearbox 4005 and second gear box 4015. Second gearbox 4015 may be a right-angle gearbox. Second gearbox 4015 may be similar to that used in a shaft-driven motorcycle to transmit power from the driveshaft 4025 to the rear wheel 4035 and may include e.g., a miter, bevel, or hypoid gear set (not shown). The output gear (not shown) of the second gearbox 4015 may be rigidly connected to drive-side coupling 1020, described in FIG. 10.

Torque tube 4010 may provide a mounting structure for the first gearbox 4005 and second gearbox 4015. Torque tube 4010 may be rotationally connected to the rear drive 4020 and may allow the swing arm 205 to be pivoted into a standby position 230, as described in FIG. 2. Torque tube 4010 may provide resistance to second gearbox 4015, preventing or minimizing rotation about the wheel 225 when torque is applied.

Referring back to FIG. 8, coupling assembly 850 may allow swing arm 800 to be coupled to and decoupled from the wheels of a vehicle. Coupling assembly 850 may be connected by the user to wheel-side coupling assembly 1455, shown in FIG. 14, so that power can be transmitted to the vehicle wheel. It is understood then that coupling assembly 850 forms half of a coupling system 1100, shown if FIG. 11, while the wheel-side coupling assembly 1455 forms the other half.

Figure 10:
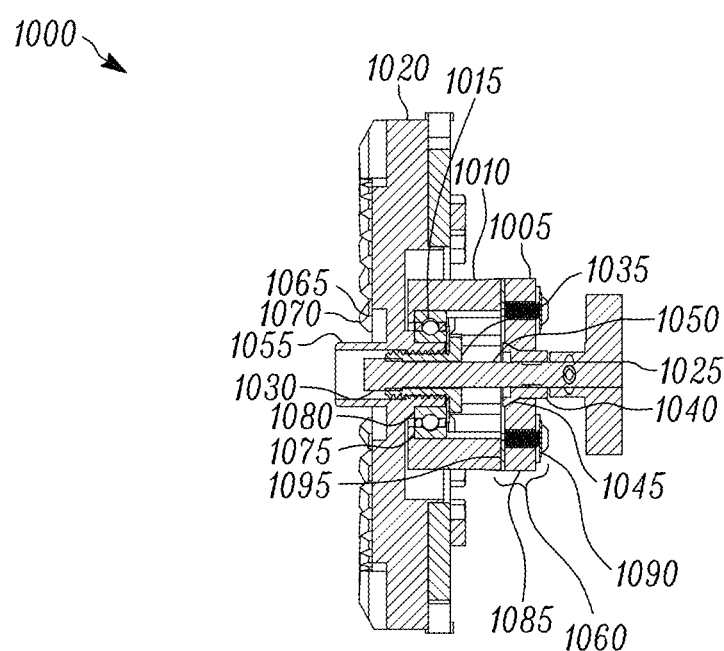
FIG. 10 is a front section view of a coupling assembly in accordance with an embodiment of the disclosure.
Figure 12:
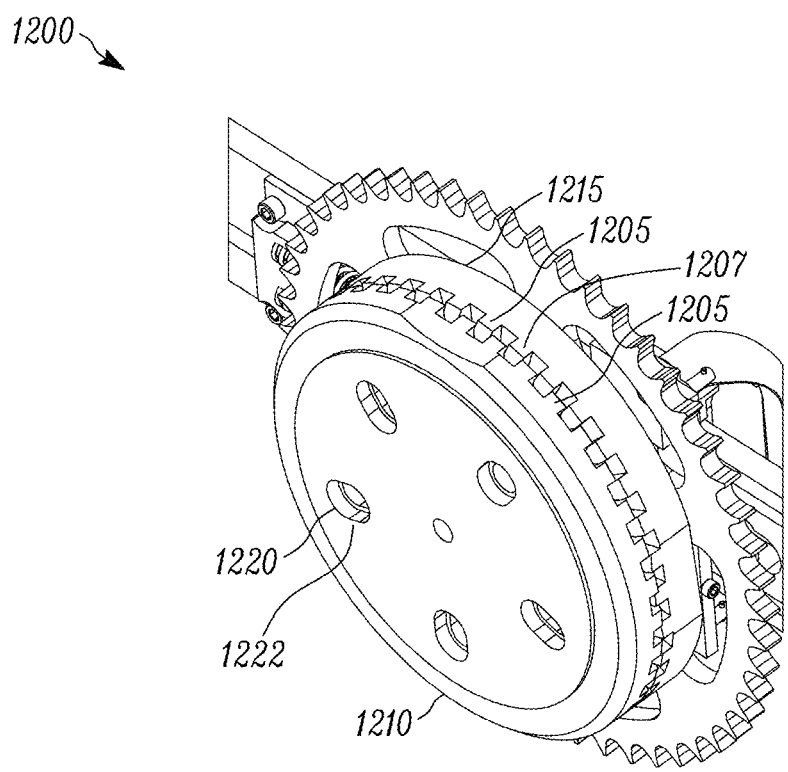
FIG. 12 is an isometric view of a coupling system in a fully coupled state in accordance with an embodiment of the disclosure.

Referring now to FIGS. 10, 11, and 12, coupling assembly 850 includes components, e.g. a drive-side coupling 1020 and a coupling shaft 1050, that interface with the wheel-side coupling 1105. It should be noted that FIG. 10 shows coupling assembly 1000 as decoupled from a vehicle, while FIGS. 11 and 12 show a coupling system 1100, 1200, with the coupling assembly 1140 connected to the wheel-side coupling 1105. In some embodiments, coupling assembly 850 also includes a bearing housing 1010, a bearing 1015, a bearing screw 1035, a coupling shaft 1050, a coupling knob 1025, and a locking ferrule 1040.

FIG. 11 shows an example coupling system 1100 in a coupled state. The coupling system includes the coupling assembly 1140 and the wheel-side coupling 1105. The coupling assembly 1140 is included in the swing arm 800 and the wheel-side coupling 1105 is included in the vehicle system 400. When in a coupled state as shown, a drive-side coupling 1125 is rigidly connected to the wheel-side coupling 1105, allowing power to be transferred or transmitted between AHS-E drive 300 and the vehicle system 400. The couplings 1105, 1125 may have a diameter 1150 in the range of approximately 4-18 inches.

Referring also to FIG. 10, axial coupling of the coupling assembly 1140 to wheel-side coupling 1105 may be provided by a coupling shaft 1050 that includes a threaded portion 1030. A coupling knob 1025 may be rigidly connected to coupling shaft 1050 and locking ferrule 1040 may be rotationally connected and axially constrained to coupling shaft 1050. By turning coupling shaft 1050 with coupling knob 1025, the threaded portion 1030 of coupling shaft 1050 may engage with an internal thread 1110 of wheel-side coupling 1105, causing it to advance into wheel-side coupling 1105. Axial coupling may be achieved when coupling shaft 1050 advances far enough for locking ferrule 1040 to be compressed between bearing screw 1035 and coupling knob 1025.

Rotational coupling of the coupling assembly 1140 to the wheel-side coupling 1105 may be provided by torque-transmitting features 1205 such as dogs 1207, as shown in FIG. 12. As used herein, dogs refer to protrusions on the face of a rotating component that mesh with similar features on the face of another rotating component and allow torque to be transmitted from one component to the other, such as is used to transfer torque between gears and dog clutches in a constant-mesh automobile transmission. Dogs 1207 may include chamfers 1065, as shown in FIG. 10, to aid in rotational alignment for e.g., meshing. The chamfers 1065 may be sized such that each dog 1207 forms a narrow or sharp peak 1070, thereby ensuring that the wheel-side coupling 1210 and drive-side coupling 1215 align sufficiently to mesh. The torque-transmitting features 1205 may alternatively be protrusions on either the wheel-side coupling 1210 or drive-side coupling 1215 that mate with slots or holes in either the wheel-side coupling 1210 or drive-side coupling 1215. The protrusions, holes, and/or slots may be chamfered to aid in rotational alignment for coupling meshing.

Referring to FIGS. 10 and 11, in some embodiments, to aid in alignment of drive-side coupling 1125 to wheel-side coupling 1105, drive-side coupling 1125 may include a male pilot feature 1055, which may be inserted into a corresponding female pilot feature 1115 in wheel-side coupling 1105 during the coupling process. Both pilot features 1055, 1115 may include a lead-in chamfer 1120 to aid alignment for insertion. In another embodiment, the male and female pilot feature may be reversed, with the male feature on the wheel-side coupling 1105 and the female feature on the drive-side coupling 1125.

Referring to FIG. 10, the coupling assembly 1000 may be slidably connected to swing arm frame 1005 with a sliding interface 1085 between bearing housing 1010 and swing arm frame 1005. An outer race 1075 of bearing 1015 may be rigidly connected to bearing housing 1010. An inner race 1080 of bearing 1015 may be rigidly connected to drive-side coupling 1020. In some embodiments, bearing screw 1035 may be threaded into drive-side coupling 1020 and may help connect the inner race 1080 of the bearing 1015 to the drive-side coupling 1020. Bearing 1015 may allow the drive-side coupling 1020 to rotate freely and with little friction while otherwise being constrained to bearing housing 1010.

Without wishing to be bound by any particular theory, to allow for varying lengths in vehicles and vehicle suspension articulation, coupling assembly 850 may be allowed to slide relative to swing arm frame 845. Varying lengths in vehicles may occur, for example, as vehicles have varying distance 420 between their rear wheels 430 and mounting system 410, shown in FIG. 4 at the rear of vehicle 405.

Figure 9:
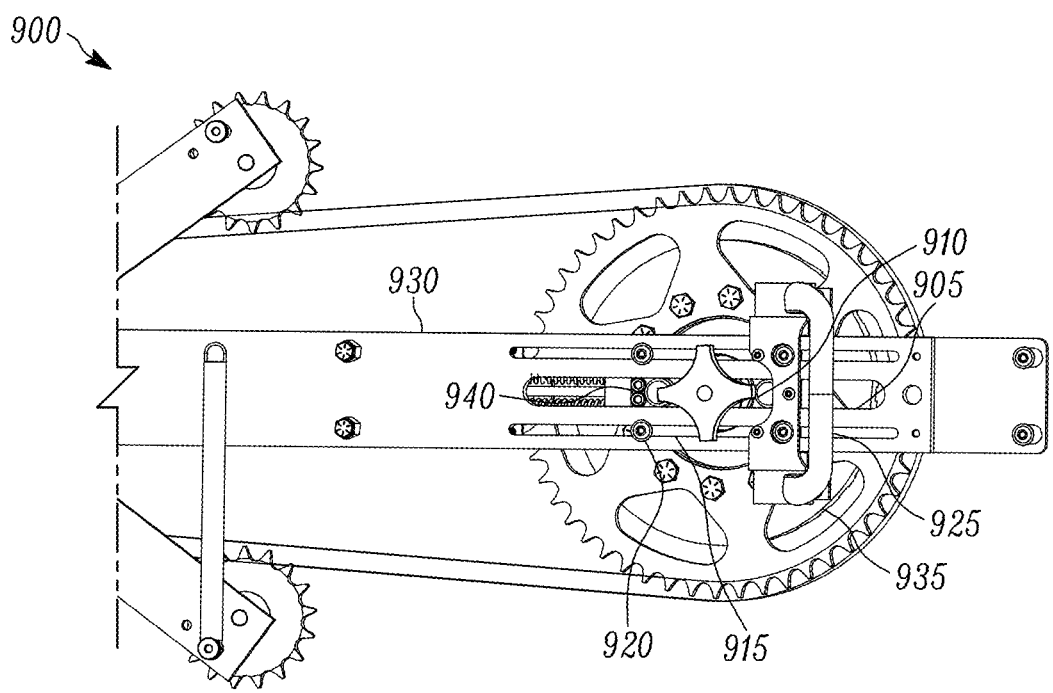
FIG. 9 is an isometric side view of a sliding interface between a coupling assembly and a swing arm frame in accordance with an embodiment of the disclosure.

Referring now to FIG. 9, an example of a sliding interface 900 is shown. Sliding interface 900 includes a central slot 905 and one or more outer slots 915 in a swing arm frame 930, one or more guide protrusions 910 and one or more constraint protrusions 920 on a bearing housing 940, and a handle 925. Guide protrusions 910 may be slidably connected to the central slot 905, which may allow fore-aft sliding of the bearing housing 940 but may restrict pitch and vertical translation. The constraint protrusions 920 may pass through the outer slots 915. Heads 1090 of the constraint protrusions 920 (shown in FIG. 10) and a bearing face 1095 of the bearing housing 940 (shown in FIG. 10) may allow fore-aft sliding of the bearing housing 940 but may restrict yaw, roll, and left-right translation. Handle 925 may be rigidly connected to bearing housing 940 and allow a user to align coupling assembly 935, 1140 with wheel-side coupling 1105, as shown in FIG. 11. In some embodiments, guide protrusions 910 and constraint protrusions 920 are pins, screws, or shafts.

In some embodiments, sliding interface 900 includes a lubricant or low friction material 1060, as shown in FIG. 10, to allow smoother sliding and reduce the force required for the user to align the coupling system 1100. Low friction material 1060 may comprise any suitable known material capable of reducing or minimizing friction such as acetal, nylon, polyethylene, polytetrafluoroethylene (PTFE) or the like. Low friction material 1060 may be a spray-on film, a shim, a flat sheet, a washer, or the like.

In some embodiments, low friction material 1060 may be sandwiched between bearing housing 940 and swing arm frame 930 and/or between the heads 1090 of constraint protrusions 920 and swing arm frame 930.

As previously described, sliding interface 900 may function as a linear bearing. Any number of common types of linear bearings may be used. Sliding interface 900, as disclosed herein, provides a very compact example with smooth operation, low friction, and high stiffness.

When coupling assembly 850, shown in FIG. 8, is decoupled from a vehicle 220, such as when the swing arms 205 are in standby position 230 as shown in FIG. 2, chain or belt tension in the swing arm 205 may tend to pull coupling assembly 850 towards pivot point 860, making it difficult to recouple the coupling assembly 850 with the vehicle 220. To reduce this tendency, coupling assembly 850 may be constrained to the swing arm frame 845 when decoupled from the vehicle, effectively locking the sliding interface 900.

Referring to FIGS. 9, 10, and 11, locking ferrule 1040 may be rigidly connected to swing arm frame 1005 when coupling assembly 1000 is decoupled from the vehicle 220. Rigid connection may be achieved by turning coupling shaft 1050 with coupling knob 1025, causing the threaded portion 1030 of coupling shaft 1050 to engage with an internal thread 1145 in the bearing screw 1035, causing locking ferrule 1040 to advance towards swing arm frame 1005. Friction produced at the interface 1045 between swing arm frame 1005 and locking ferrule 1040 may reduce or prevent relative motion of bearing housing 1010 to swing arm frame 1005, allowing easier engagement of the coupling assembly 1140 with wheel-side coupling 1105. In some embodiments, the locking ferrule 1040 may include a conical profile 1130 and central slot 905 may include a chamfer 1135. Thus, when locking ferrule 1040 engages swing arm frame 1005, an angled interface 1045 is produced which may increase the holding strength between swing arm frame 1005 and locking ferrule 1040. In another example, the locking ferrule 1040 and the swing arm frame 1005 may include meshing teeth (not shown) to further increase holding strength.

Figure 43:
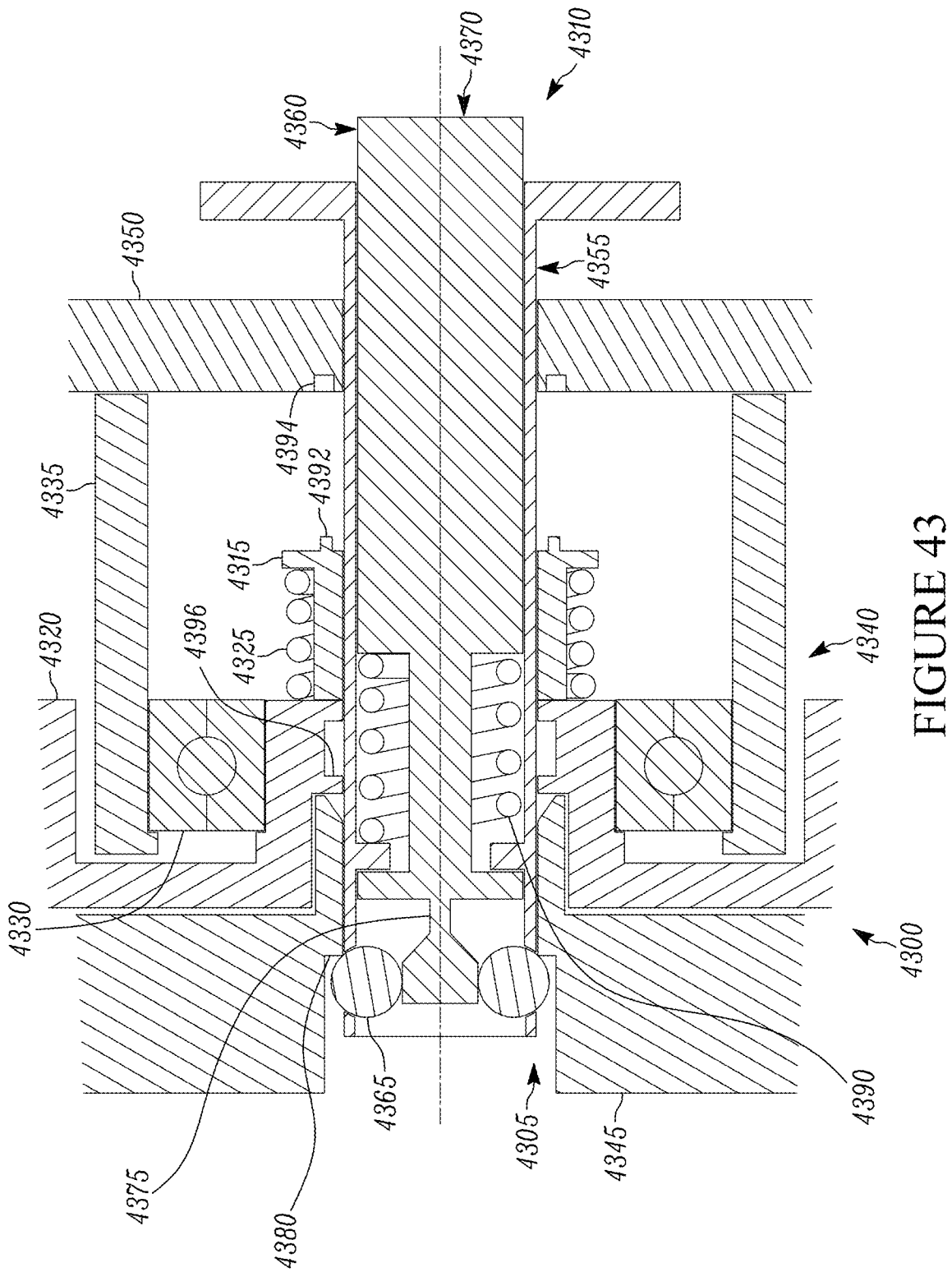
FIG. 43 is a front section of an example of a coupling system in accordance with an embodiment of the disclosure.

Another example of the coupling system 4300 is shown in FIG. 43. In this example, the threaded interfaces described in FIGS. 10 and 11 between the coupling shaft 1050 and wheel-side coupling 1105 and between the coupling shaft 1050 and the drive-side coupling 1125 are replaced by a quick-release pin interface 4305. As used herein, a quick release pin is a locking pin similar to that described in U.S. Pat. No. 6,386,789. In this example, the coupling system 4300 includes the coupling assembly 4340 and wheel-side coupling 4345. Coupling assembly 4340 includes a quick release pin 4310, locking ferrule 4315, drive-side coupling 4320, ferrule spring 4325, bearing 4330, and bearing housing 4335. Coupling assembly 4340 is slidably connected to swing arm frame 4350. Quick release pin 4310 includes a pin body 4355, a plunger 4360, one or more locking components 4365, and a plunger spring 4390.

To secure the drive-side coupling 4320 to the wheel-side coupling 4345 after they have been positioned together, the plunger 4360 of the quick release pin 4310 is depressed by the user by pressing on the outer face 4370. This allows the locking components 4365 to retract into the relieved section 4375 of the plunger 4360. Once inserted past a shoulder 4380 of the wheel-side coupling 4345, the plunger 4360 is released and the plunger spring 4390 returns it such that the locking features 4365 are forced outwards against the shoulder 4380, locking the quick release pin 4310 in place.

To lock the coupling assembly 4340 to the swing arm frame 4350 as described in FIG. 10, the plunger 4360 is depressed by the user and the quick release pin 4310 is pulled out of the wheel-side coupling 4345. The ferrule spring 4325 now pushes the locking ferrule 4315 and the quick release pin 4310 towards the swing arm frame 4350, such that a tooth feature 4392 of the locking ferrule 4315 engages a tooth feature 4394 of the swing arm frame 4350, preventing the coupling assembly 4340 from sliding. The locking features 4365 may here engage a shoulder 4396 in the drive-side coupling 4320 to more securely engage the tooth features 4392, 4394.

Figure 13:
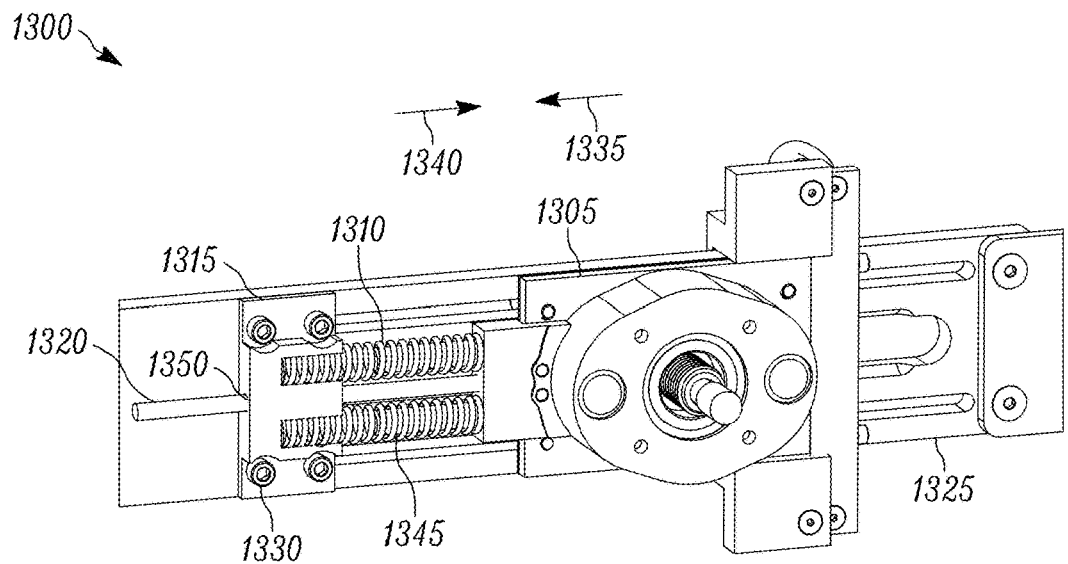
FIG. 13 is an isometric side view of a counterbalance mechanism in accordance with an embodiment of the disclosure.

To further resist the tendency of chain or belt tension to pull drive-side coupling 1125 away from wheel-side coupling 1105 and make it easier to couple the coupling system 1100, chain or belt tension may be counterbalanced by a counterbalance mechanism or system 1300 as shown in FIG. 13. Counterbalance mechanism 1300 may include one or more counterbalance springs 1310, a bearing housing 1305, a spring perch 1315, and a threaded rod 1320. Counterbalance springs 1310 may apply force to bearing housing 1305 in the opposite direction 1340 to the direction 1335 of chain or belt tension pull. Counterbalance springs 1310 may be preloaded by sliding spring perch 1315 towards bearing housing 1305, thereby compressing counterbalance springs 1310. When sufficient preload is achieved, spring perch 1315 may be rigidly connected to swing arm frame 1325 using screws 1330 or other suitable fasteners.

Counterbalance mechanism 1300 may also include one or more spring guides 1345, which may prevent buckling of the springs 1310 and may provide spring retention when the counterbalance mechanism 1300 is being adjusted. Referring to briefly to FIG. 8, the amount of preload needed may be determined by the force exerted on the chain or belt 805 by the tensioner springs 820 through the tensioner sprockets 810 and by an angle (shown as straight) formed in the chain 805 when slack is removed. The preload should be sufficient to allow the user to easily slide the coupling assembly 850 for alignment with the wheel-side coupling 1105. Preload force may generally vary in the range of approximately 10 to 1,000 pounds force.

In some embodiments, threaded rod 1320 may be rigidly connected to bearing housing 1305 and may pass through a hole 1350 in spring perch 1315. A nut (not shown) may be threaded onto the threaded rod 1320 and used to advance spring perch 1315 towards the bearing housing 1305, generating greater spring preload than may be possible by sliding the spring perch 1315 by hand. The nut may then be removed to allow bearing housing 1305 to slide freely as the vehicle suspension articulates. The ability to move the fore-aft position of spring perch 1315 may allow spring preload to be achieved regardless of where bearing housing 1305 is positioned on swing arm frame 1325 when coupling assembly 1100 is in a coupled state, as shown in FIG. 11.

Figure 14:
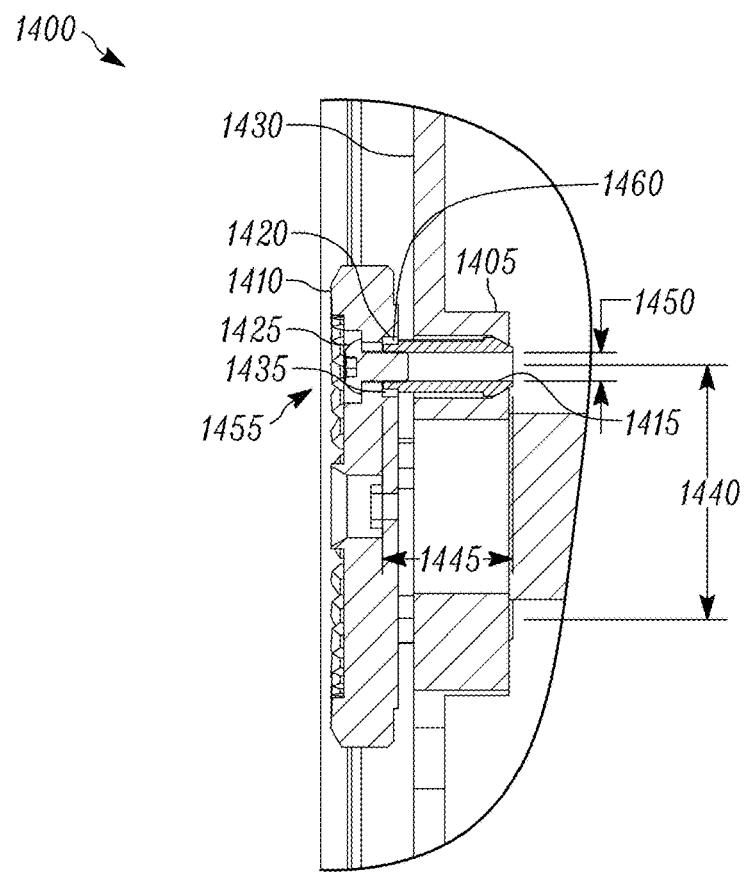
FIG. 14 is a front section view of a wheel-side coupling assembly in accordance with an embodiment of the disclosure.

FIG. 14 shows an example interface 1400 between a wheel-side coupling assembly 1455 and a wheel 1405. Wheel-side coupling assembly 1455 includes wheel-side coupling 1410, lug nuts 1415, and coupling screws 1425. Lug nuts 1415 may have an internal thread matching that required by the vehicle and may be used to mount wheels 1405 to vehicle 220, as shown in FIG. 2. Lug nuts 1415 may include one or more features 1420 on an outside end 1435 that allow lug nuts 1415 to be rigidly connected with features 1222, as shown in FIG. 12, on wheel-side coupling 1410 with coupling screws 1425. Features 1420 on the lug nuts 1415 may include a cylindrical portion 1460 and features 1222 on the wheel-side coupling 1410 may include slots 1220, as shown in FIG. 12. Slots 1220 may allow a single wheel-side coupling 1410 to couple with wheels 1405 with different bolt circle diameters 1440. In another example of wheel-side coupling assembly, lug nuts 1415 may be lug screws.

In some embodiments, slots 1220 may be arranged concurrently in a pattern of four, five, six, eight, or any combination thereof, so that a single wheel-side coupling 1410 may be coupled to wheels 1405 with different numbers of lug nuts. Slots 1220 may be arranged radially and be of sufficient length to allow the wheel-side coupling 1410 to be coupled to wheels of varying bolt circle diameter 1440. Lug nuts 1415 may be configurable in different lengths so that a correct length can be chosen to place the wheel-side coupling 1410 at an appropriate distance from a wheel face 1430 to mate with the drive-side coupling 1215, described in FIG. 12. This means of coupling wheel-side coupling 1410 to wheel 1405 may allow coupling to a variety of vehicles by varying only the lug nut 1415 length 1445 and thread diameter 1450 and pitch (not shown). If positioning wheel-side coupling 1410 at an appropriate distance from the wheel face 1430 results in lug nuts 1415 of a length that results in insufficient strength to transmit the necessary torque, shorter lug nuts 1415 may be used and an intermediate spacer plate (not shown) may be placed between the lug nuts 1415 and the wheel-side coupling 1410.

Generally, in order to mount the AHS-E drive or power conversion device to the vehicle, a mounting system is included. The mounting system includes two halves, one of which is connected to the vehicle and the other of which is included in the AHS-E drive. The half included in the AHS-E drive may be a drive mounting assembly. The half connected to the vehicle may be a rear-side coupling. In some examples, the rear-side coupling together with the wheel-side coupling assembly 1455 form a vehicle mounting assembly. In another example, the rear-side coupling alone comprises the vehicle mounting assembly.

Figure 15:
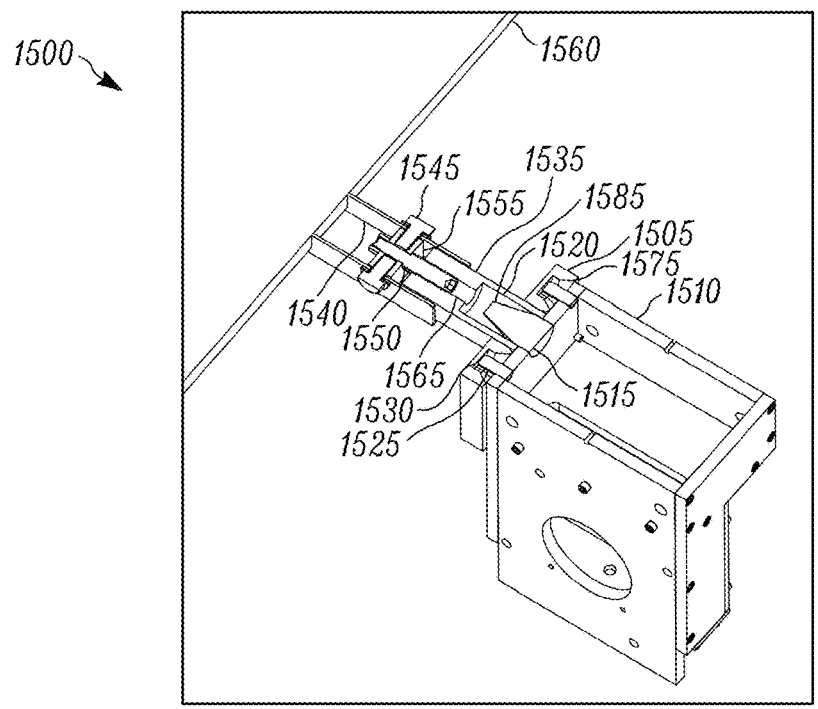
FIG. 15 is an isometric view of a plan section of a mounting system in accordance with an embodiment of the disclosure.

FIG. 15 shows an example of a mounting system 1500. Mounting system 1500 includes a mounting plate 1505, a receiver post 1535, a receiver stop 1555, and an adjustment screw 1550 which are coupled to a vehicle 1560 and allow AHS-E drive 1510 to be quickly and easily coupled and decoupled from vehicle 1560. Mounting system 1500 further includes a male pilot feature 1515 and one or more pins 1525 which may be included as part of the AHS-E drive 1510. A trailer hitch receiver 1540 may be rigidly connected to the vehicle 1560. Receiver stop 1555 may be mounted rigidly to trailer hitch receiver 1540 with one or more fasteners or screws 1545. Receiver post 1535 may be inserted into the end of the hitch receiver 1540. An adjustment screw 1550 may be rotationally connected to receiver stop 1555 but constrained axially with a nut, clip, pin, screw or other common retention device. Threading adjustment screw 1550 into an internal thread 1565 in the receiver post 1535 may constrain the receiver post 1535 fore-to-aft while allowing its position to be adjusted by turning the adjustment screw 1550. Mounting plate 1505 may be rigidly connected to the receiver post 1535, or they may be combined into a single component (not shown). By turning adjustment screw 1550, the fore-aft position of AHS-E drive 1510 may be adjusted so that an appropriate distance from a rear bumper (not shown) of vehicle 1560 may be achieved as well as an appropriate amount of chain slack in the swing arms chain drive 800 described in FIG. 8.

Receiver post 1535 may have a female pilot feature 1520 that couples with a male pilot feature 1515 on the AHS-E drive 1510 to aid alignment. Both pilot features 1515, 1520 may include one or more chamfers 1585 to aid insertion male pilot feature 1515 into female pilot feature 1520. Mounting plate 1505 may have one or more slots 1530 that couple with one or more pins 1525 on the AHS-E drive 1510 to rotationally align the interface. Both pins 1525 and slots 1530 may include chamfers 1575 to aid insertion of pins 1525 into slots 1530.

Figure 16:
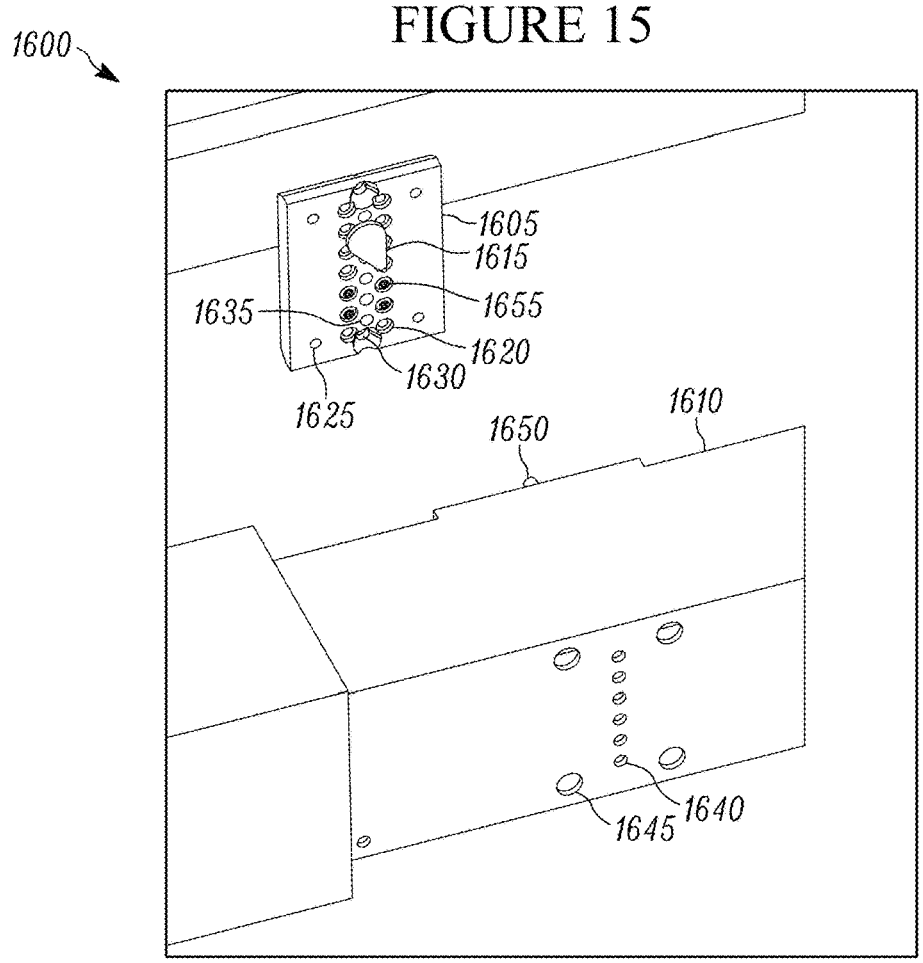
FIG. 16 is an isometric rear view of a mounting system in accordance with an embodiment of the disclosure.
Figure 17:
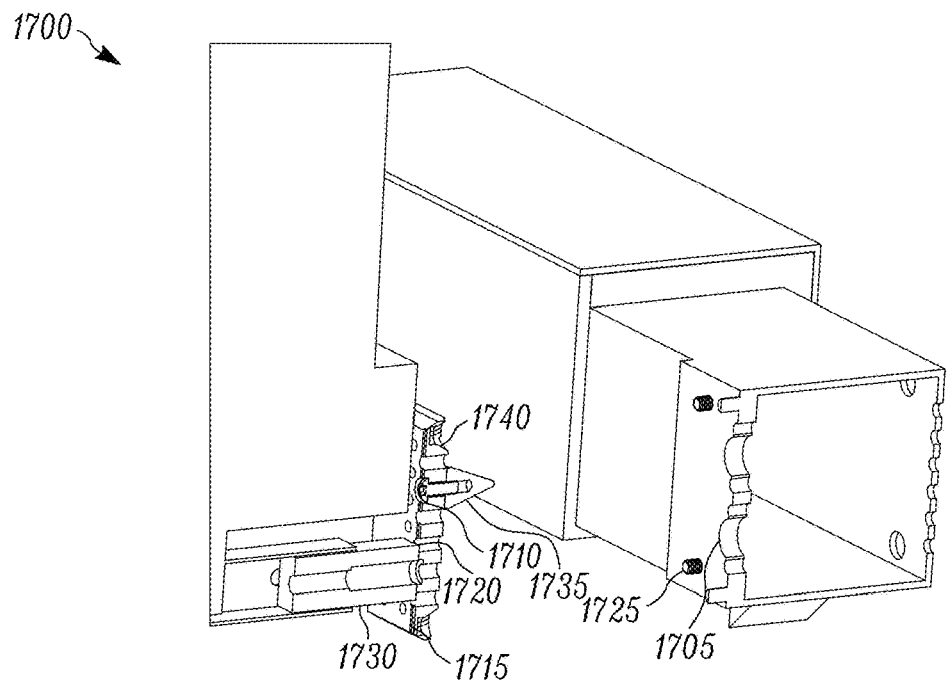
FIG. 17 is an isometric view of a side section of a mounting system in accordance with an embodiment of the disclosure.

FIG. 16 shows a rear view and FIG. 17 shows a front section view of an alternative embodiment of mounting systems 1600 and 1700, respectively. Mounting system 1600 includes an AHS-E drive 1610, a mounting plate 1605, a male pilot feature 1615, a receiver post 1730, one or more receiver post screws 1655, one or more pilot screws 1710, one or more pins 1650, and one or more captured screws 1725. This embodiment may allow mounting plate 1605 to be connected to receiver post 1730 in a variety of vertical positions, which may allow the AHS-E drive 1610 to be positioned optimally for ground clearance and clearance with the vehicle hatch or tailgate (not shown). While a number or fasteners have been described, such as receiver post screws 1655, pilot screws 1710, pins 1650, and captured screws 1725, any type of suitable fasteners may be used, including, for example, studs, nuts, retaining rings, and the like.

In the present embodiment, receiver post 1730 may be rigidly connected to mounting plate 1605 with one or more screws 1655 inserted through one or more holes 1620 in mounting plate 1605. A plurality of holes 1620 may be provided so that a variety of positions may be achievable by removing receiver post screws 1655, positioning receiver post 1730 as desired, and reinstalling receiver post screws1655. The number of positions may be between approximately two and ten. The screws 1655 may be in the ¼-inch to ½-inch diameter range. Mounting plate 1605 may have a vertical slot 1715 that couples with a tab 1720 on receiver post 1730 to tightly clock the receiver post 1730 to the mounting plate 1605. As shown, tab 1720 is a rectangular tab. In some embodiments, the tab and slot interface may be reversed, with the slot 1715 being in the receiver post 1730 and the tab 1720 being on the mounting plate 1605.

In some embodiments, male pilot feature 1615 may be rigidly connected to mounting plate 1605 with one or more pilot screws 1710 inserted through holes 1635 in the mounting plate 1605. The pilot screws 1710 may be in the ¼-inch to ½-inch diameter range. A plurality of holes 1635 may be provided so that the male pilot feature 1615 may be moved to a different position if it interferes with the desired location of the receiver post 1730. The number of positions may be between approximately two and ten. One or more female pilot features 1705 may be included on the AHS-E drive 1610. In some embodiments, a plurality of female pilot features 1705 may be provided to correspond with the holes 1635 for male pilot feature 1615. The male pilot feature 1615 and the female pilot features 1705 may both include chamfers 1735 to aid insertion of male pilot feature 1615 into female pilot feature 1705.

Mounting plate 1605 may include slots 1630 that interface with pins 1650 on the AHS-E drive 1610 to rotationally align mounting system 1600. Slots 1630 and pins 1650 may be vertically aligned with male pilot feature 1615 and female pilot feature 1705. Slots 1630 and pins 1650 may include chamfers 1740 to aid insertion of pins 1650 into slots 1630. In some embodiments, AHS-E drive 1610 may include one or more captured screws 1725 that thread into threaded holes 1625 in the mounting plate 1605 to secure the AHS-E drive 1610 to the mounting plate 1605. Approximately four screws of approximately ½-inch diameter may be used. AHS-E drive 1610 may include one or more holes 1645 that allow captured screws 1725 to be accessed with a tool to tighten them.

In some embodiments, mounting system 1600, 1700 may include the similar components described in FIG. 15 for adjusting the fore-aft position of the mounting plate 1605. For example, receiver post 1730 may be connected to a receiver stop 1555 with an adjustment screw 1550. Also, for example, AHS-E 1610 drive may include one or more holes 1640 that align with holes 1635 in the mounting plate 1605, which allow an adjustment screw 1550 to be accessed with a tool.

In another embodiment, receiver post 1730 may be rigidly connected to the AHS-E drive 1610 and may be secured to a hitch receiver 1540, described in FIG. 15, with a hitch pin (not shown) as is common with hitch-mounted accessories. In this embodiment, the fore-aft positioning of AHS-E drive 1610 may be accomplished with receiver posts 1730 of different lengths, or with a plurality of holes (not shown) in the receiver post 1730 that couple with the hitch pin (not shown). Positioning of AHS-E drive 1610 may also be accomplished with spacers (not shown) inserted between the AHS-E drive 1610 and the receiver post 1730.

Figure 18:
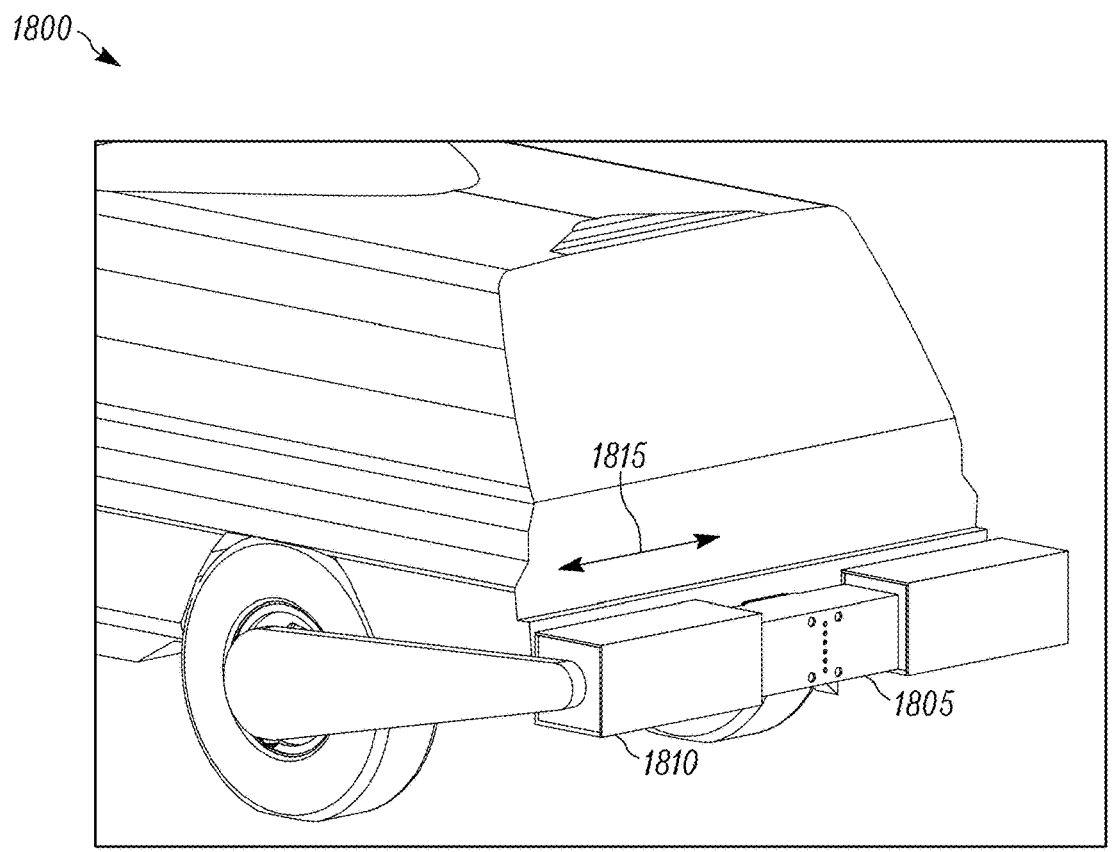
FIG. 18 is an isometric rear view of a dual-motor AHS-E in accordance with an embodiment of the disclosure.
Figure 19:
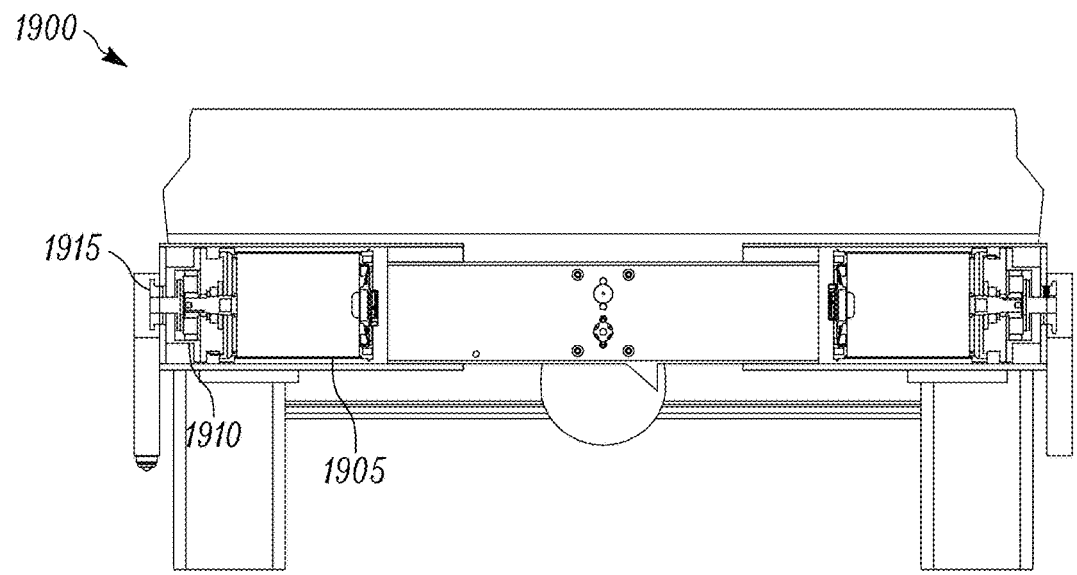
FIG. 19 is a rear section view of a dual-motor AHS-E in accordance with an embodiment of the disclosure.
Figure 45:
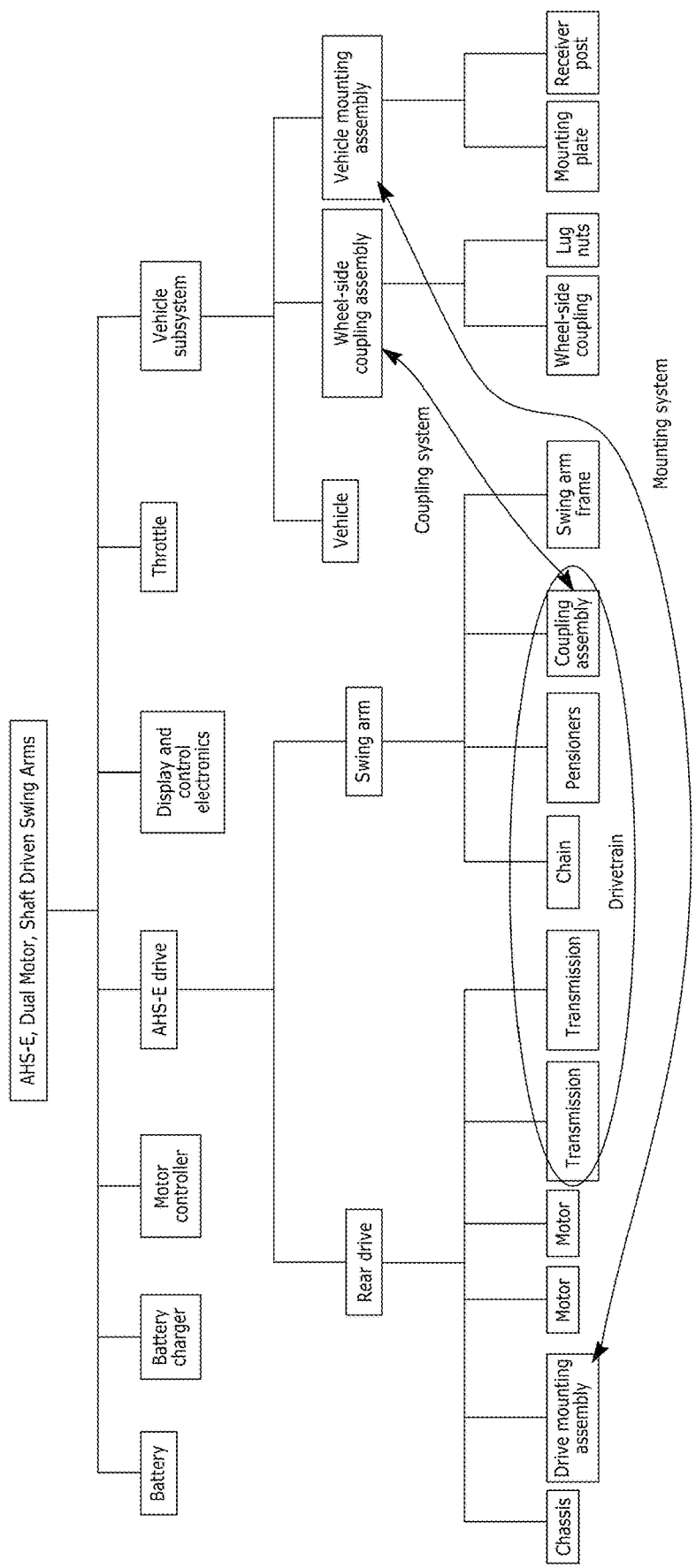
FIG. 45 is an example layout of an AHS-E with dual motors and a chain-driven swing arm in accordance with an embodiment of the disclosure.

Referring generally to FIG. 45 and to FIGS. 18 and 19, the AHS-E may be configured with dual motors 1905. FIG. 45 shows an example AHS-E layout with dual motors and swing arms that include a chain.

FIG. 18 shows an example of an AHS-E 1800. In this embodiment, dual motors 1905 may be utilized. Each motor 1905 may be inside and rigidly connected to a housing or nacelle 1810, which may be connected to a central chassis 1805 such that the nacelle 1810 can slide in an inward and outward direction 1815 to accommodate vehicles of different track width.

FIG. 19 shows a cross-section 1900 through example AHS-E 1800. Power from each motor 1905 may be routed through a transmission 1910 that decreases speed and increases torque, as is known in the art. The transmission may be of an epicyclic gear type, or any other type used in vehicles. The power from the transmission 1910 may be provided to a drive sprocket 1915 and on to swing arm chain drive 800 as described in FIG. 8.

Figure 20:
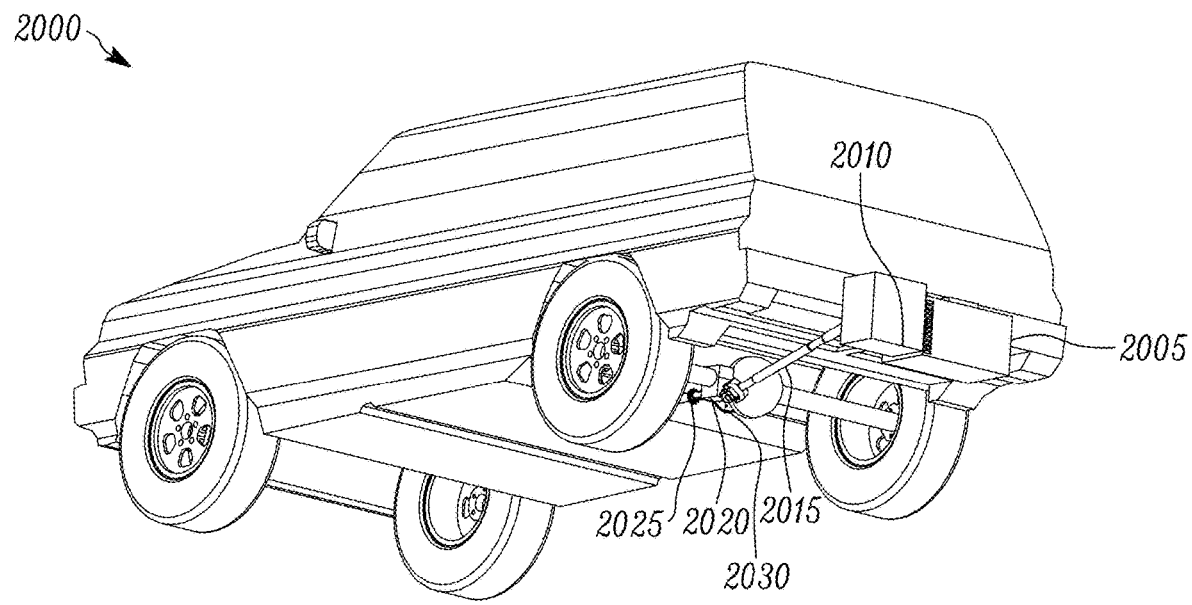
FIG. 20 is an isometric bottom view of an AHS-E for live-axle vehicles in accordance with an embodiment of the disclosure.
Figure 21:
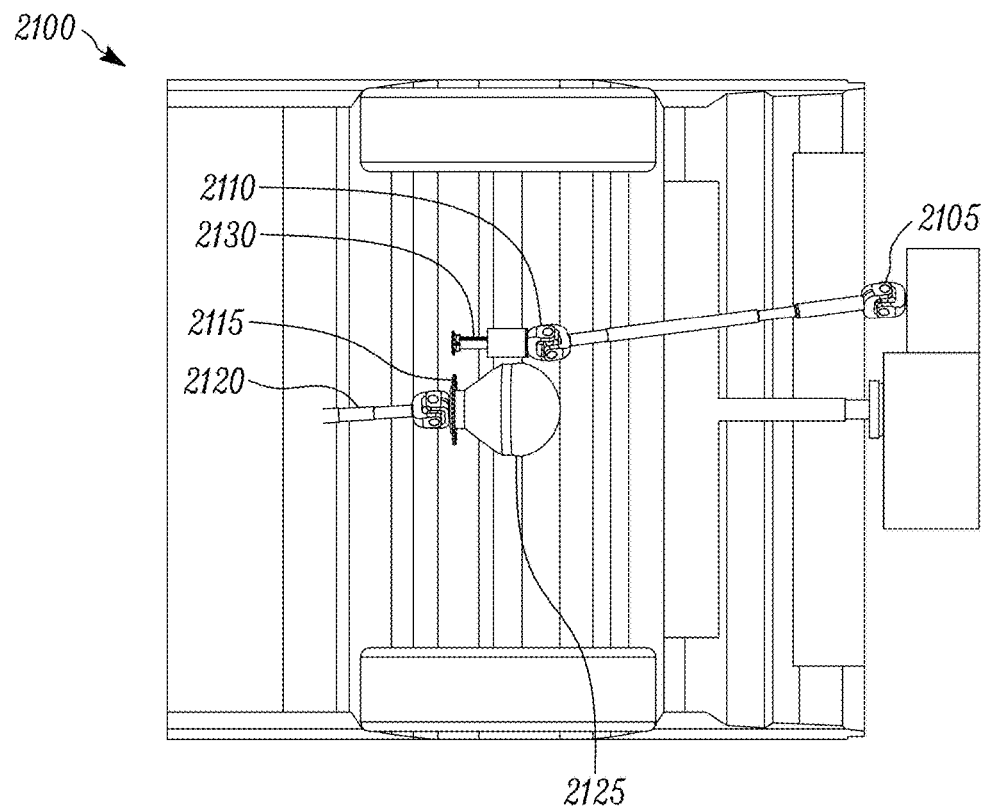
FIG. 21 is a bottom view of an AHS-E for live-axle vehicles in accordance with an embodiment of the disclo-sure.
Figure 22:
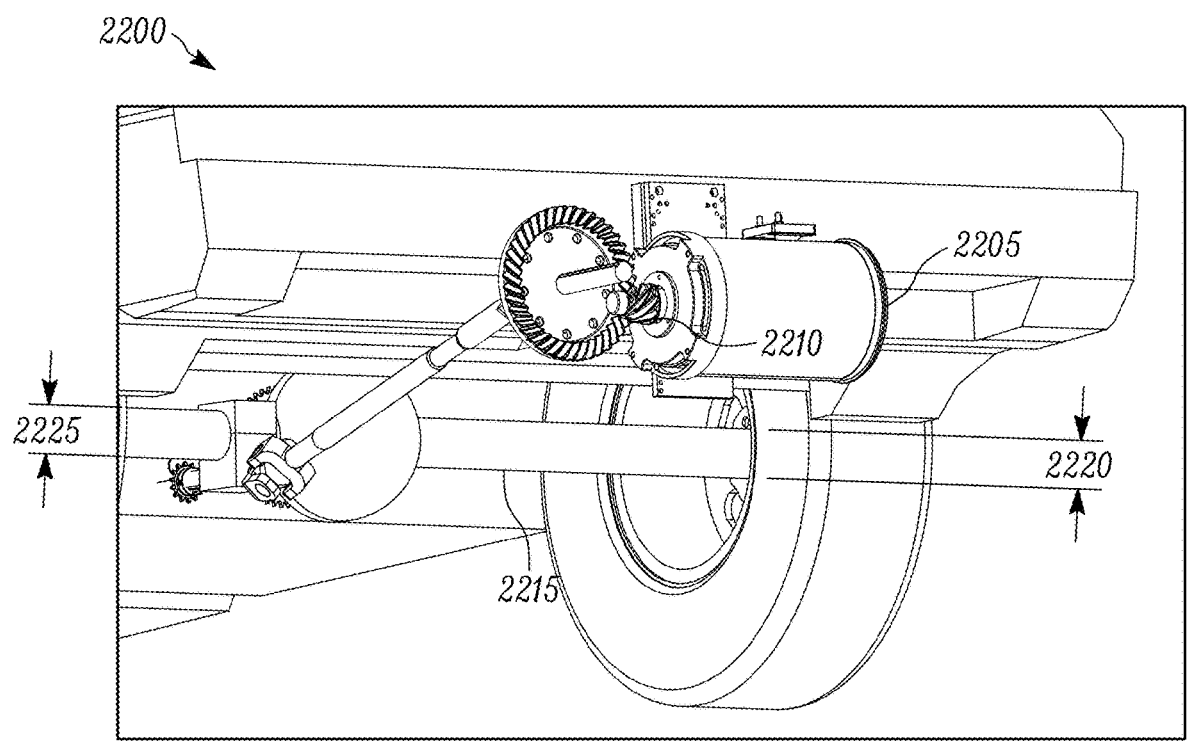
FIG. 22 is an isometric rear view of the motor and drivetrain of an AHS-E for live-axle vehicles in accordance with an embodiment of the disclosure.
Figure 47:
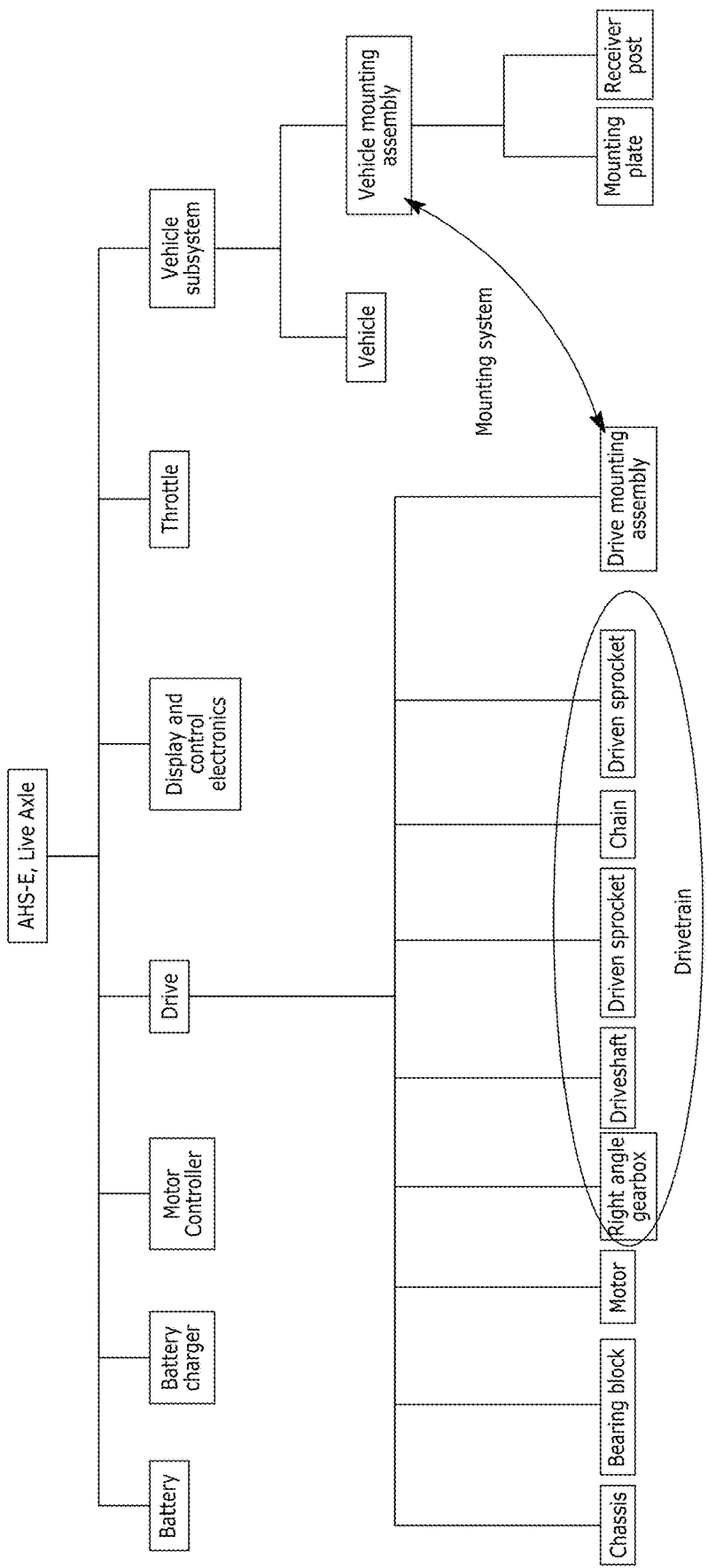
FIG. 47 is an example layout of an AHS-E with a single motor configured to deliver power to the differential of a vehicle with a live rear axle in accordance with an embodiment of the disclosure.

Referring in general to FIG. 47 and to FIGS. 20, 21, and 22, the AHS-E may be configured to be compatible with vehicles that have a live rear axle. This example may include a single motor 2205. FIG. 47 shows an example AHS-E layout with a single motor and a drivetrain that transfers power directly to the vehicle's differential 2125.

FIGS. 20, 21, and 22 show additional examples, of an AHS-E 2000, 2100, 2200, respectively, that simplifies power delivery and is compatible with vehicles that have a live rear axle. As used herein, a live rear axle refers to an automotive suspension and drivetrain design in which a pair of wheels are connected by a rigid member with the axles passing through the center of the member. AHS-E 2000 includes a motor 2205, a chassis 2005, a gearbox 2010, a driveshaft 2015, a bearing block 2020, a drive sprocket 2025, a driven sprocket 2115 and a chain (not shown). FIG. 21 shows the underside of AHS-E 2000, shown as AHS-E 2100.

FIG. 22 shows a portion of the internal components of AHS-E 2000, shown as AHS-E 2200. Motor 2205 may transmit power to a gear set 2210 inside gearbox 2010, such as a bevel, miter, or hypoid gear set. In some embodiments, gear set 2210 comprises a right-angle gear set and/or gearbox 2010 comprises a right-angle gearbox. Gear set 2210 may increase torque, decrease speed, and/or translate motor rotation from a generally transverse to a generally longitudinal orientation.

A forward end 2130 of driveshaft 2015 may be supported by bearings (not shown) in bearing block 2020. In some embodiments, bearing block 2020 may include two separate parts that may be clamped around the axle tube 2215 using screws and or nuts (not shown).

Driveshaft 2015 may transmit power from gear set 2210 to drive sprocket 2025. A chain (not shown) may transmit power from drive sprocket 2025 to driven sprocket 2115. Driven sprocket 2115 may be sandwiched between the vehicle's driveshaft 2120 and the vehicle's differential 2125. Driveshaft 2015 may include a rear universal joint 2105 and front universal joint 2110 that allow driveshaft 2015 to transfer or transmit power without requiring the gearbox 2010 to be coaxial with the forward end 2130 of the driveshaft 2015.

In some embodiments, driveshaft 2015 may be telescoping to be compatible with a variety of vehicles and to allow the vehicle's suspension to articulate without transmitting significant force to the gearbox 2010. In order to attach AHS-E 2000, 2100, 2200 to any vehicle with a live rear axle, it is only necessary for a clamping diameter 2225 of bearing block 2020 to match the diameter 2220 of a vehicle's axle tube 2215 and for driven sprocket 2115 to match the bolt pattern (not shown) of the vehicle's driveshaft 2120. Bearing block 2020 may be configurable with different clamping diameters, or a large clamping diameter may be utilized and shims (not shown) may be used to decrease the clamping diameter for smaller axle tubes 2215. In some embodiments, driven sprocket 2115 may incorporate multiple bolt patterns so that it may be compatible with a variety of vehicles. In some embodiments, a clutch (not shown) may be included either between the driveshaft 2015 and the bearing block 2020 or between the driveshaft 2015 and the gearbox 2010 such that the motor 2205 and gearbox 2010 can be decoupled from the vehicle's drivetrain when the AHS-E 2000 is not in use.

Figure 23:
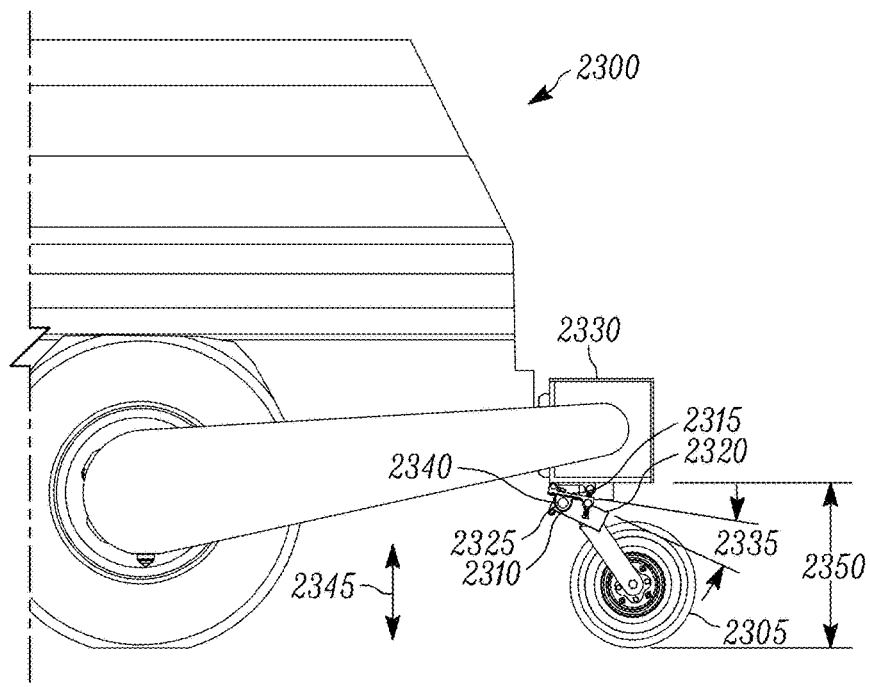
FIG. 23 is a side view of a suspension system in accordance with an embodiment of the disclosure.
Figure 24:
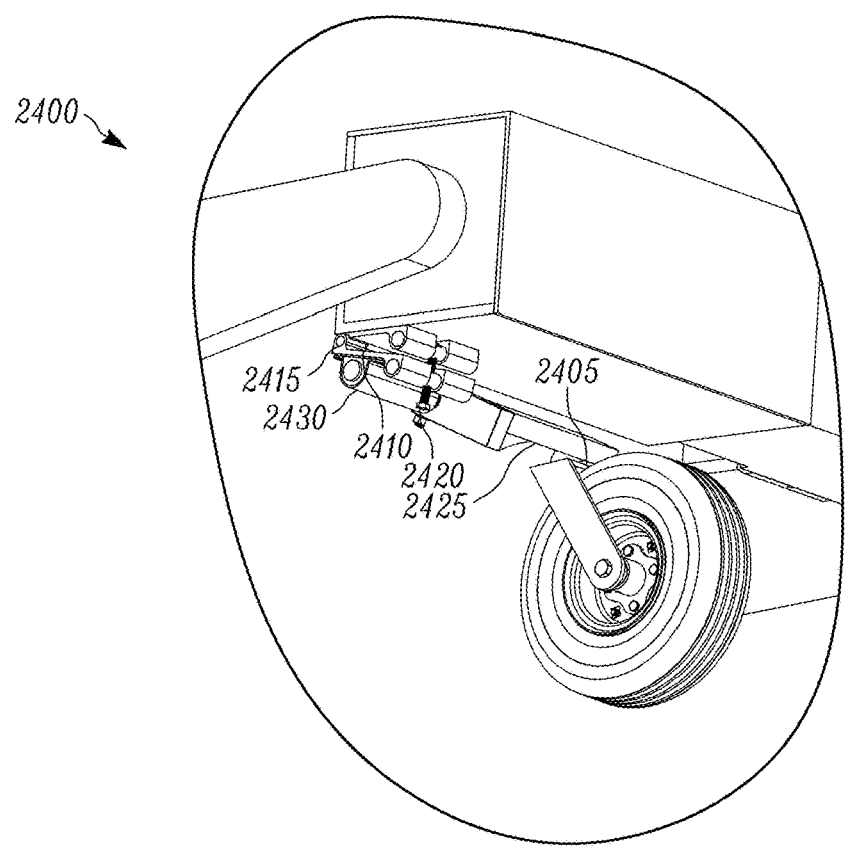
FIG. 24 is an isometric bottom view of a suspension system in accordance with an embodiment of the disclosure.

FIG. 23 shows a side view of an example suspension system 2300 that may be included with an AHS. FIG. 24 shows an isometric view 2400 of suspension system 2300. Suspension system 2300 includes one or more wheels 2305, one or more torsion half-axles 2310, and one or more suspension frames 2425. Suspension system 2300 may allow for a portion of the system's weight to be born by wheels 2305, reducing the load on a vehicle's suspension and decreasing the loss of ride height 2350. As used herein, ride height refers to the distance above the ground of the rear drive 305.

In order to eliminate tire scrub when a vehicle is turning and to allow a vehicle to be steered normally when backing up, caster wheels 2305 may be used. A spherical wheel, Mecanum, or other type of omni-wheel, as described in U.S. Pat. No. 3,876,255, may also be used. The spring force required to support the weight of an AHS on the suspension system 2300 may be provided by a torsion half-axle 2310, commonly used on trailers, which includes a suspension shaft 2325 and suspension arm 2320. Rotation of suspension shaft 2325 may be resisted by an internal spring mechanism (not shown). Suspension arm 2320 may be rigidly connected to suspension shaft 2325, suspension frame 2425 may be rigidly connected to suspension arm 2320, and caster wheel 2305 may be rotationally connected to suspension frame 2425 at caster axis 2405 such that when suspension shaft 2325 rotates, the wheel 2305 travels in a substantially vertical direction 2345. Caster axis 2405 may include a plain, ball, or roller bearing to connect to caster wheel 2305 to suspension frame 2425

In order to make connection of AHS-E drive 1510, 1610 to mounting systems 1500, 1600, 1700 described in FIGS. 15, 16, and 17 easier, a suspension system may include a height adjusting assembly 2430. Torsion half axle 2310 may be rigidly connected to a lower suspension mount 2315, which may be rotationally connected to an upper suspension mount 2410 through a hinge pin 2415. A jack screw 2420 may be rotationally connected to the upper suspension mount 2410 and threaded into the lower suspension mount 2315. Turning the jack screw 2420 may vary the angle 2335 between the upper suspension mount 2410 and lower suspension mount 2315, changing the ride height 2350 of AHS-E drive 2330.

In some embodiments, the ride height may be adjusted so that AHS-E drive 2330 is aligned with a mounting system, as previously described, when connecting them together. Once connected, the ride height of the AHS-E drive 2330 can be increased to transfer a further portion of the weight of an AHS to the suspension system 2300, 2400. The ride height of the AHS-E drive 2330 may also be adjusted by varying a resting angle 2335 between suspension arm 2320 and lower suspension mount 2315 as is commonly allowed by such trailer suspension systems. This may be accomplished by connecting the suspension arm 2320 to suspension shaft 2325 using a splined interface 2340, which may allow a multitude of resting angles 2335.

Figure 25:
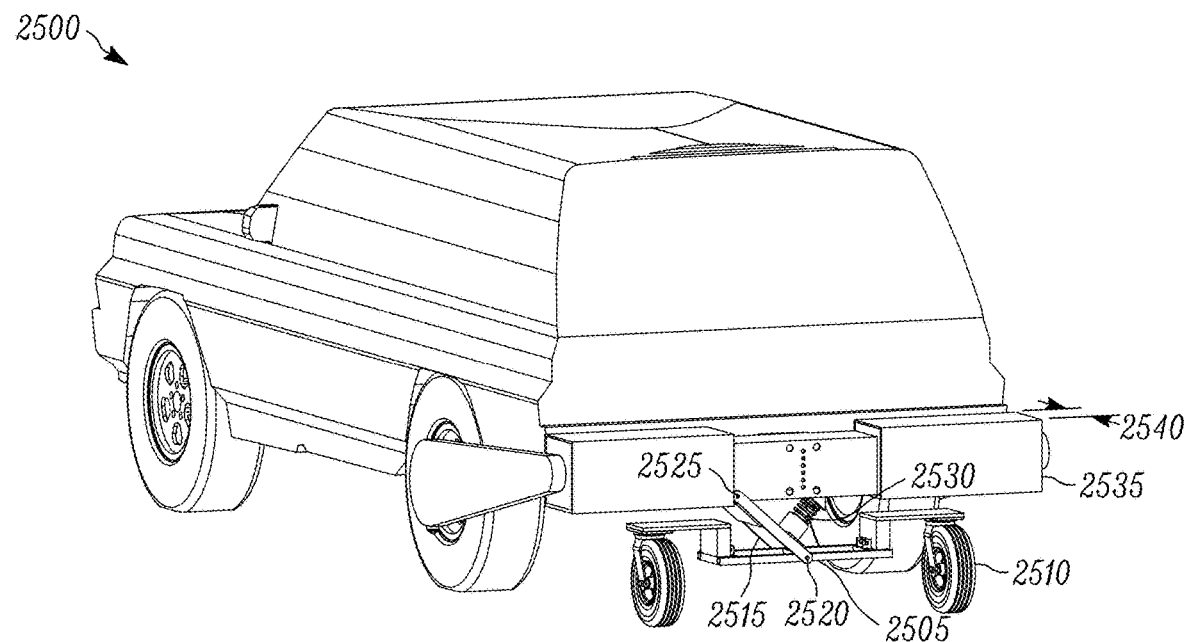
FIG. 25 is an isometric rear view of a suspension system in accordance with an embodiment of the disclosure.
Figure 26:
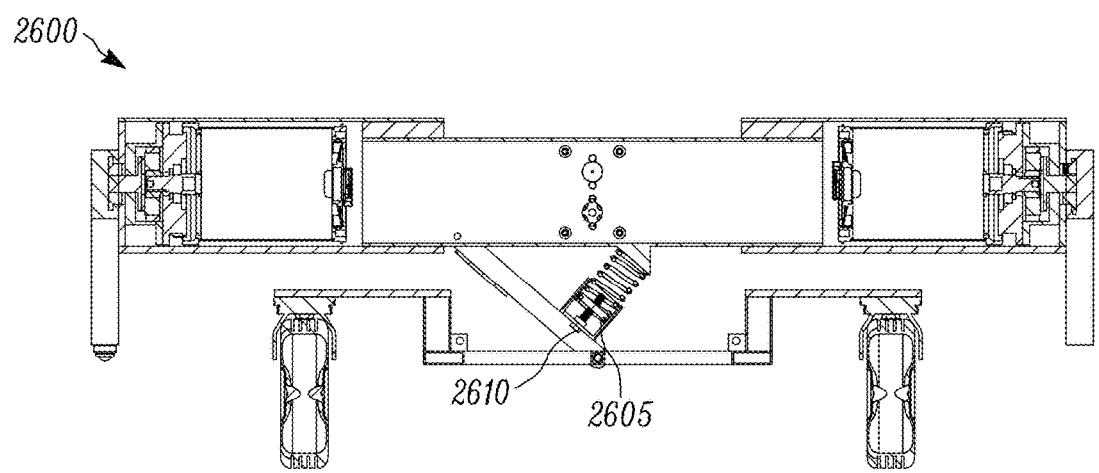
FIG. 26 is a rear section view of a suspension system in accordance with an embodiment of the disclosure.

FIGS. 25 and 26 show a walking-beam example of a suspension system 2500. Suspension system 2500 includes one or more wheels 2510, a suspension frame 2505, a control arm 2515, a spring 2530, and a height adjusting mechanism 2600. In this embodiment, wheels 2510 may be mounted to suspension frame 2505. Suspension frame 2505 may be connected to AHS-E drive 2535 with a control arm 2515 that may connect to front and/or rear pivot points 2520 located on suspension frame 2505 and front and/or rear pivot points 2525 on AHS-E drive 2535. As shown, front and/or rear pivot points 2520 are centrally located on suspension frame 2505.

In some embodiments, by spanning the full or near-full longitudinal length 2540 of the AHS-E drive 2535, control arm 2515 may resist twisting. Spring force for suspension may be provided by a spring 2530 located between control arm 2515 and AHS-E drive 2535.

FIG. 26 shows a height adjusting mechanism 2600 for suspension system 2500. A suspension spring perch 2605 may set the amount of compression of spring 2530, increasing or decreasing the ride height. The position of suspension spring perch 2605 may be adjusted by a spring jack screw 2610 that may be rotationally connected to control arm 2515 and threaded into the suspension spring perch 2605.

Figure 27:
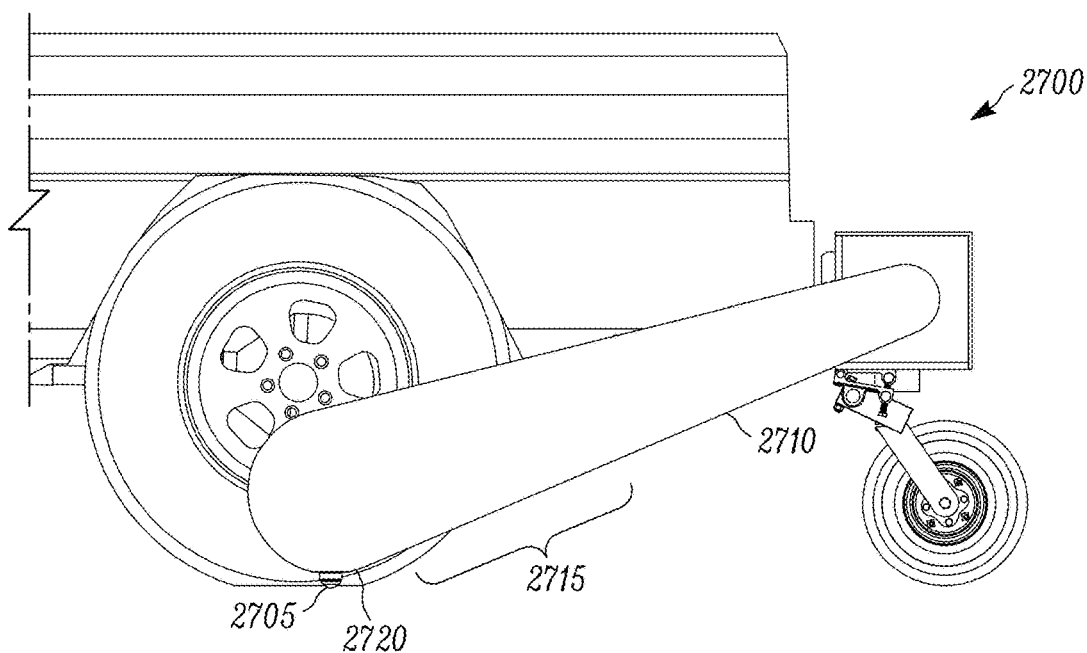
FIG. 27 is a side view of an AHS-E with a swing arm in a lowered position in accordance with an embodiment of the disclosure.

FIG. 27 shows an example AHS-E drive 2700 configured such that it is freestanding and can be wheeled around by a user. Swing arms 2710 may be locked in a lower position 2715 by inserting a pin, screw, or other suitable fastener (not shown) through the lock holes 735 and 865, as shown in FIGS. 7 and 8. A roller ball 2705 may be connected to the bottom 2720 of swing arm 2710 to allow it to roll smoothly along the ground in any direction.

Figure 28:
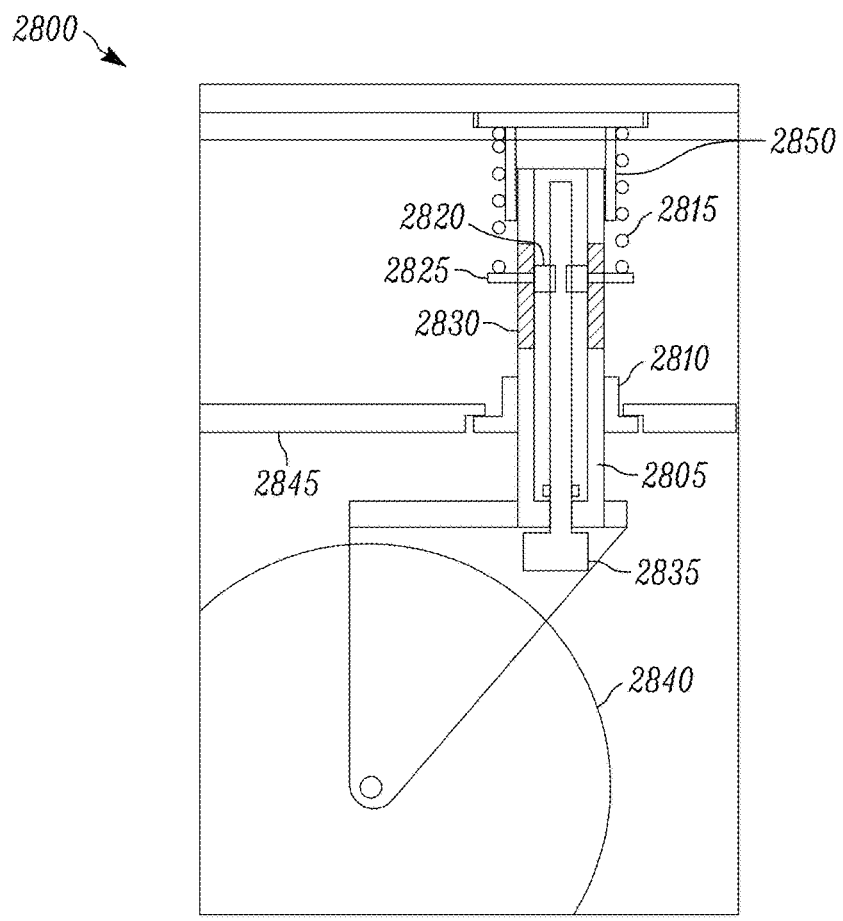
FIG. 28 is a side section view of a suspension system in accordance with an embodiment of the disclosure.

FIG. 28 shows a section view of another example of a suspension system 2800. Suspension system 2800 includes one or more suspension shafts 2805, one or more wheels 2840, a lower bushing 2810, an upper bushing 2850, one or more coil springs 2815, one or more pins 2825, one or more perch nuts 2820, and one or more jack screws 2835. In this embodiment, suspension shaft 2805 may act as both a linear shaft, providing up and down movement, and as a caster axis for wheel 2840. Bushings 2810, 2850 may be rigidly connected to an AHS-E drive 2845 and may allow the suspension shaft 2805 to translate vertically to provide suspension action, and to rotate to allow the wheel 2840 to caster.

Spring force may be provided by a coil spring 2815 located concentrically with suspension shaft 2805. Coil spring 2815 may impart force on one or more pins 2825 that are rigidly connected to perch nut 2820 located inside suspension shaft 2805. Pins 2825 may pass through slots 2830 in suspension shaft 2805. Ride height may be adjusted by turning jack screw 2835 that may be rotationally connected to the suspension shaft 2805 and threaded through perch nut 2820. Friction opposing rotation of suspension shaft 2805 may be reduced by a thrust bearings (not shown) between coil spring 2815 and upper bushing 2850 and/or between coil spring 2815 and pins 2825.

Figure 29:
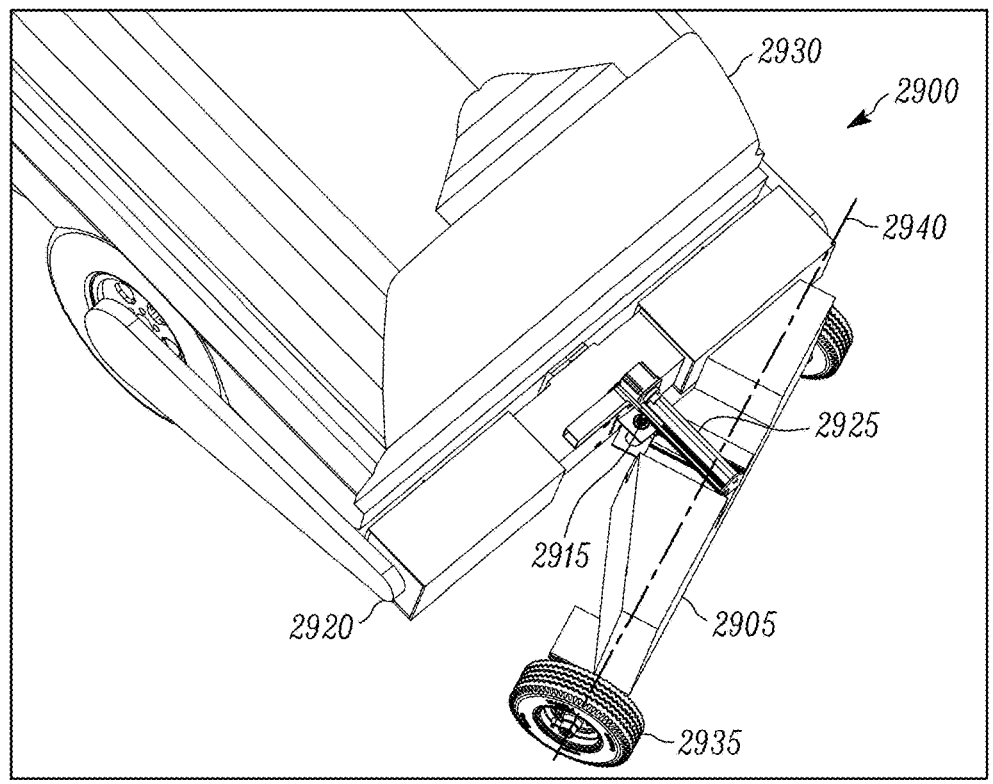
FIG. 29 is an isometric plan view of an AHS-E with a battery trailer and a moving caster axis mechanism with the caster axis configured for forward travel in accordance with an embodiment of the disclosure.
Figure 30:
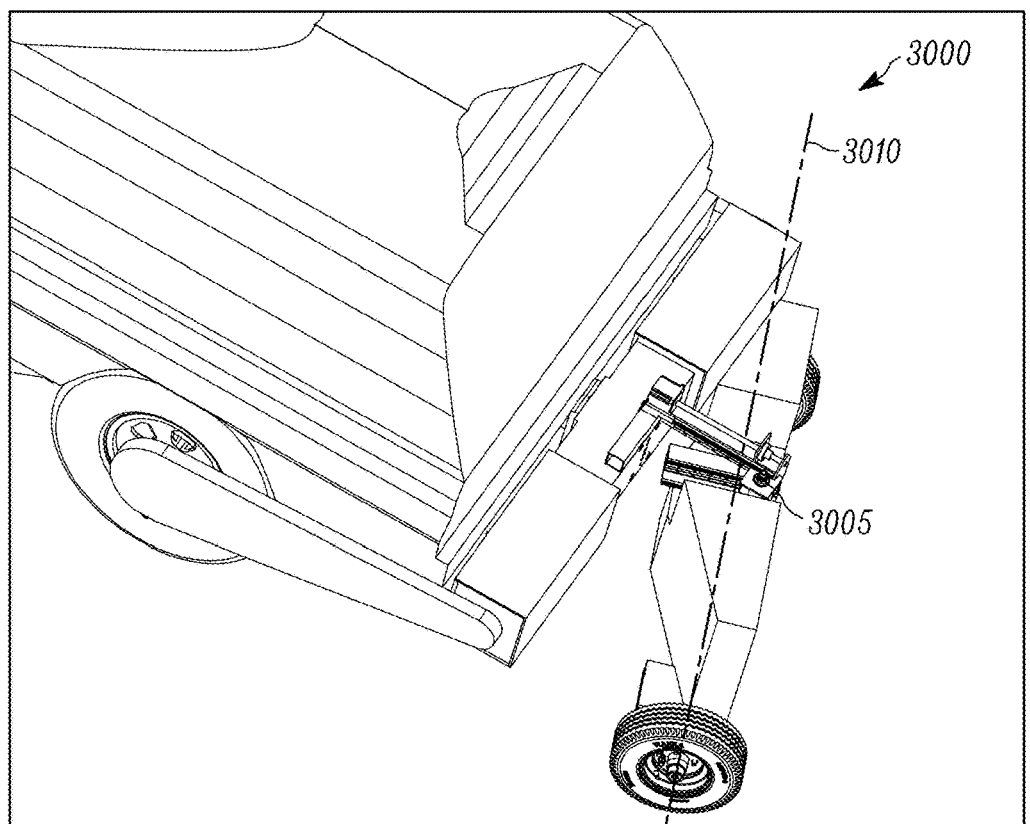
FIG. 30 is an isometric plan view of an AHS-E with a battery trailer and a moving caster axis mechanism with the caster axis configured for reverse travel in accordance with an embodiment of the disclosure.

FIG. 29 shows an example of AHS-E 2900 as it moves in a forward direction while turning. FIG. 30 shows an example of AHS-E 3000 as it travels in a reverse direction while turning. AHS-E 2900 includes an AHS-E drive 2920, a battery trailer 2905, and a moving caster axis mechanism 2925. In this embodiment, one or more batteries (not shown), and/or other components, such as a motor controller or battery charger, are located in battery trailer 2905, so that vehicle 2930 doesn't need to carry the weight of the batteries and other components, thereby allowing use with lighter vehicles.

In some embodiments, rigidly connecting battery trailer 2905 to AHS-E drive 2920 and utilizing caster, spherical, Mecanum, or omni-wheels, as described previously, may adversely affect the vehicle's handling because of the greater weight associated with battery trailer 2905 and because such wheels may not provide lateral force. Consequently, the centripetal force required to motivate the battery trailer 2905 around a corner would need to be provided by the vehicle 2930. Such additional forces on the vehicle 2930 may cause instability by causing the rear wheels 225 to lose traction and slide laterally.

In order to allow the vehicle to be steered normally when reversing, while still allowing the trailer wheels 2935 to provide centripetal forces, a caster axis 2915, 3005 that allows the entire battery trailer 2905 to pivot may be utilized. In any general caster system, the caster axis needs to be ahead of the wheel axis relative to the direction of motion. Rather than requiring the entire battery trailer to rotate approximately 180 degrees when switching from forward to reverse and vice versa, a moving caster axis mechanism 2925 may be used which moves the caster axis 2915 such that it always remains ahead of the wheel axis relative to the direction of motion. For example, when moving forward, the caster axis 2915 is ahead of the wheel axis 2940 as shown in FIG. 29. For further example, when moving in reverse, caster axis 3005 is behind the wheel axis 3010 as shown in FIG. 30. The moving caster axis mechanism 2925 may allow a relatively light vehicle 2930 to tow a relatively heavy battery trailer 2905, may allow battery trailer 2905 to add less additional length to the vehicle 2930 than is typical of trailers, and may allow the user or driver to employ standard steering techniques when reversing rather than the specialized technique typically required of trailers.

Figure 31:
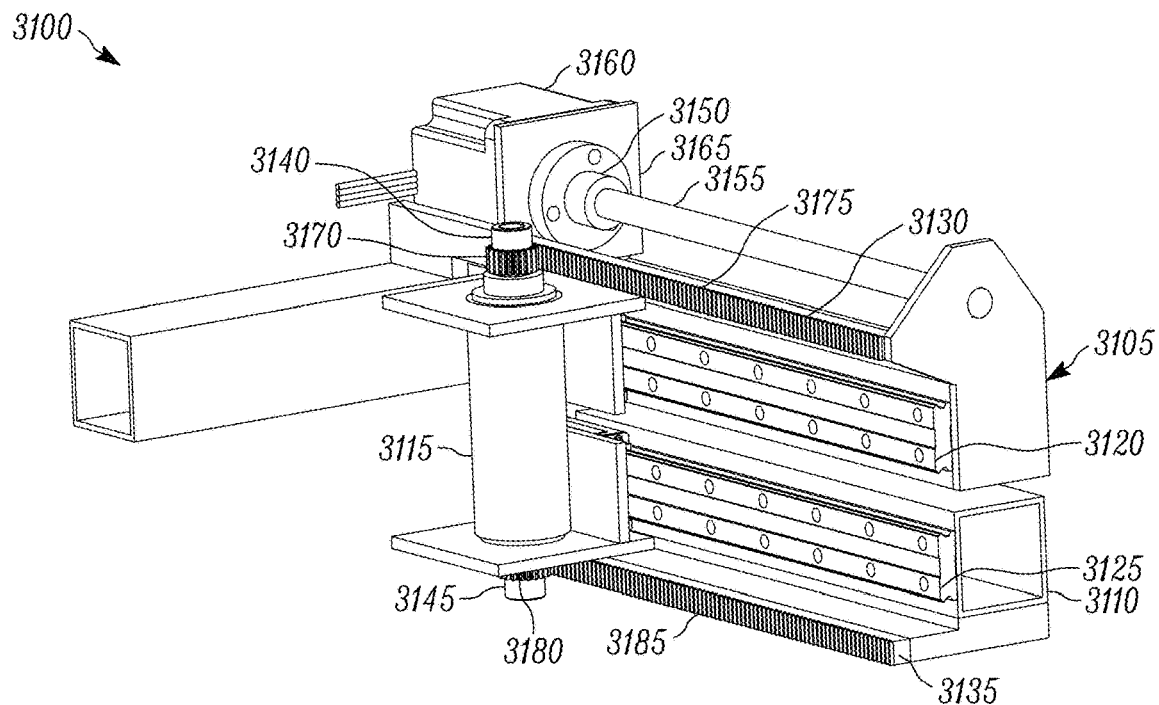
FIG. 31 is an isometric view of a moving caster axis mechanism in accordance with an embodiment of the disclosure.

FIG. 31 shows an example of moving caster axis mechanism 3100. Moving caster axis mechanism 3100 includes an upper pivot frame 3105, a lower pivot frame 3110, a moving caster pivot 3115, an upper rail 3120, a lower rail 3125, a linear actuator 3165, an upper pinion 3140, a lower pinion 3145, a core shaft 3205, shown in FIG. 32, an upper rack 3130, and a lower rack 3135. Upper pivot frame 3105 may be rigidly connected to the AHS-E drive (not shown). Lower pivot frame 3110 may be rigidly connected to the chassis of the trailer (not shown). Moving caster pivot 3115 may be capable of sliding fore and aft on upper rail 3120 and lower rail 3125. A linear actuator 3165 may cause the moving caster pivot 3115 to slide fore and aft as needed. The linear actuator 3165 may include an electric motor 3160 that turns a lead screw 3155, causing a lead nut 3150, which may be rigidly connected to the moving caster pivot 3115, to move fore and aft.

Figure 32:
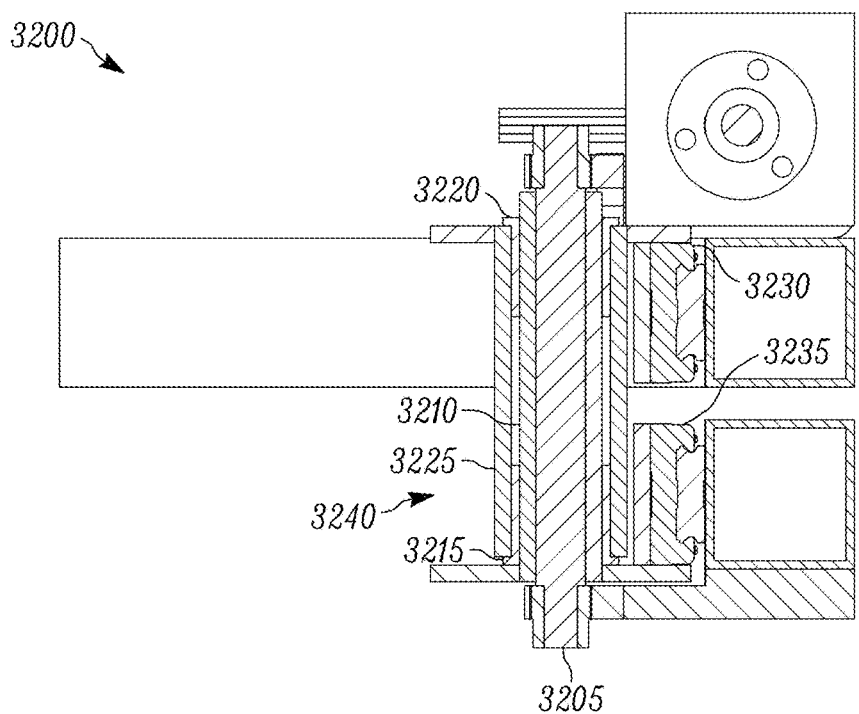
FIG. 32 is a rear section view through a moving caster pivot of a moving caster axis mechanism in accordance with an embodiment of the disclosure.

An upper pinion 3140 and lower pinion 3145 may both be rigidly connected to a core shaft 3205, shown in FIG. 32. Gear teeth 3170 of upper pinion 3140 may be meshed with teeth 3175 of upper rack 3130. Gear teeth 3180 of lower pinion 3145 may be meshed with teeth 3185 of lower rack 3135. The pinions 3140, 3145, racks 3130, 3135, and core shaft 3205 may ensure that the fore-aft alignment of upper pivot frame 3105 with lower pivot frame 3110 is maintained as the moving caster pivot 3115 translates fore and aft.

FIG. 32 shows a section 3200 through a moving caster axis mechanism 3100, described in FIG. 31. Moving caster pivot 3240 includes an upper pivot 3225 that is rigidly connected to an upper carriage 3230, which slides on upper rail 3120, and a lower pivot 3210 that is rigidly connected to a lower carriage 3235, which slides on lower rail 3125. Upper pivot 3225 and lower pivot 3210 may be configured to rotate relative to each other so that the lower pivot frame 3110, and therefore the battery trailer 2905, may caster beneath the upper pivot frame 3105. An upper bushing 3220 and a lower bushing 3215 may aid in making the relative rotation smooth and reduce friction between upper pivot 3225 and lower pivot 3210. A core shaft 3205 may be concentric with lower pivot 3210.

Upper pivot frame 3105 may also connect to a vehicle via a horizontally oriented hinge (not shown) that allows battery trailer 2905 to pitch relative to the vehicle when traversing uneven terrain, but doesn't allow the upper pivot frame 3105 to yaw. This will prevent significant load transfers between the vehicle 2930 and the trailer 2905 when the vehicle wheels 125, 225 are not coplanar with the trailer wheels 2935.

In general, it is desirable to know the direction of travel so that control electronics (not shown) can command linear actuator 3165 to position moving caster pivot 3115 in the correct location. Knowing the direction of travel can be accomplished by a wheel-speed sensor (not shown), typical of those used on automobiles for anti-lock braking and traction control systems, fitted to the battery trailer 2905 and configured to determine the direction of rotation of the trailer wheel 2935. It may also be accomplished by connecting electrically to a vehicle's onboard diagnostics (OBD) port and acquiring the vehicle's speed sensor output. It may also be accomplished by optically scanning the ground, as is commonly done with computer mice. In a range extending auxiliary hybrid system (AHS-R) embodiment described below, it may also be accomplished by electrically connecting to the vehicle's reversing light circuit.

Figure 33:
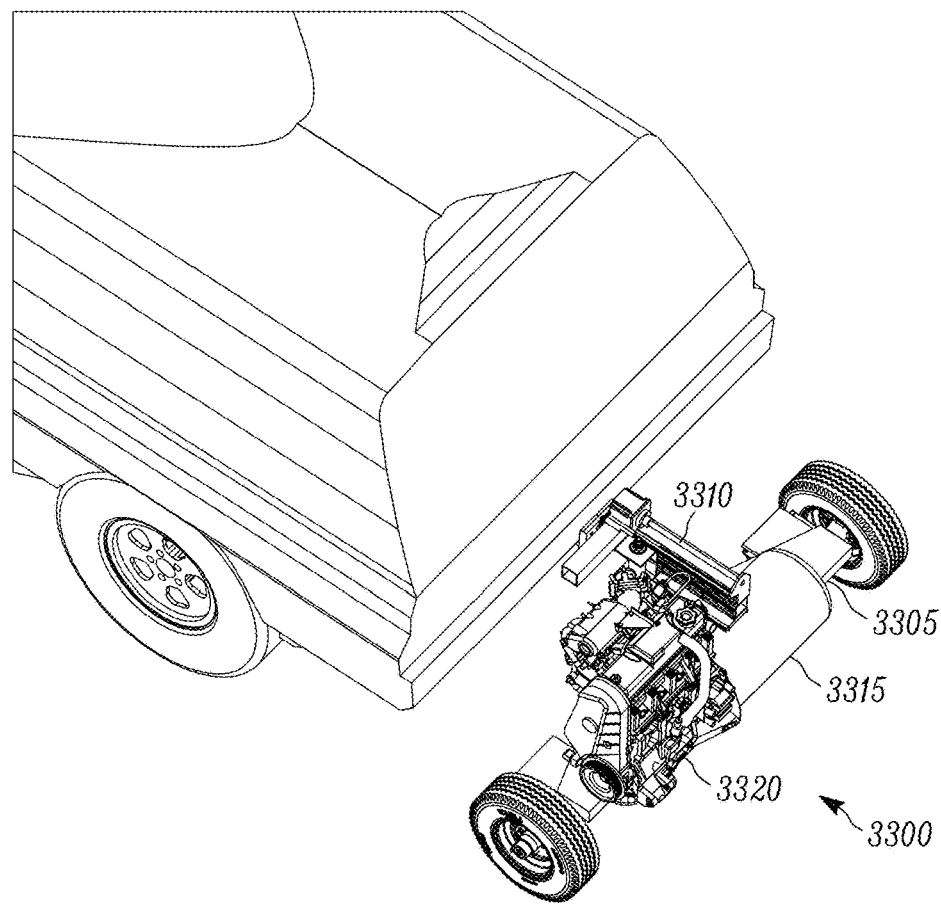
FIG. 33 is an isometric plan view of an example range-extending version (AHS-R) of an AHS with a moving caster axis mechanism in accordance with an embodiment of the disclosure.

FIG. 33 shows an example of a range extending auxiliary hybrid system (AHS-R) 3300. The AHS-R 3300 includes a generator 3315 powered by an engine 3320 on a trailer 3305. Generator 3315 may supply electrical power to electric vehicles when their batteries are depleted, allowing for extended range.

In some embodiments, trailer 3305 may utilize moving caster axis mechanism 3310 described in FIG. 31 and FIG. 32, but with upper pivot frame 3105 rigidly connected to the vehicle. Upper pivot frame 3105 may also connect to the vehicle via a horizontally oriented hinge (not shown) that allows trailer 3305 to pitch relative to the vehicle when traversing uneven terrain, but doesn't allow the upper pivot frame 3105 to yaw. As described above, this is desirable because it will prevent significant load transfers between a vehicle 2930 and trailer 2905 when the vehicle wheels 125, 225 are not coplanar with the trailer wheels 2935.

In some embodiments, trailer 3305 and moving caster axis mechanism 3310 may also be used for carrying cargo with or without a range-extending generator 3315 included. This may allow a relatively light vehicle to tow a relatively heavy load of cargo, add less additional length to the vehicle than is typical of trailers, and allow the user or driver to employ standard steering techniques when reversing rather than the specialized technique typically required of trailers.

As described above, an AHS includes a battery pack or energy storage device to store energy for use by the AHS. In the example of a battery pack, the energy is stored as electrical energy. The energy may also be stored in the form of compressed air, a hydraulic accumulator, or as hydrogen for a fuel cell.

Figure 34:
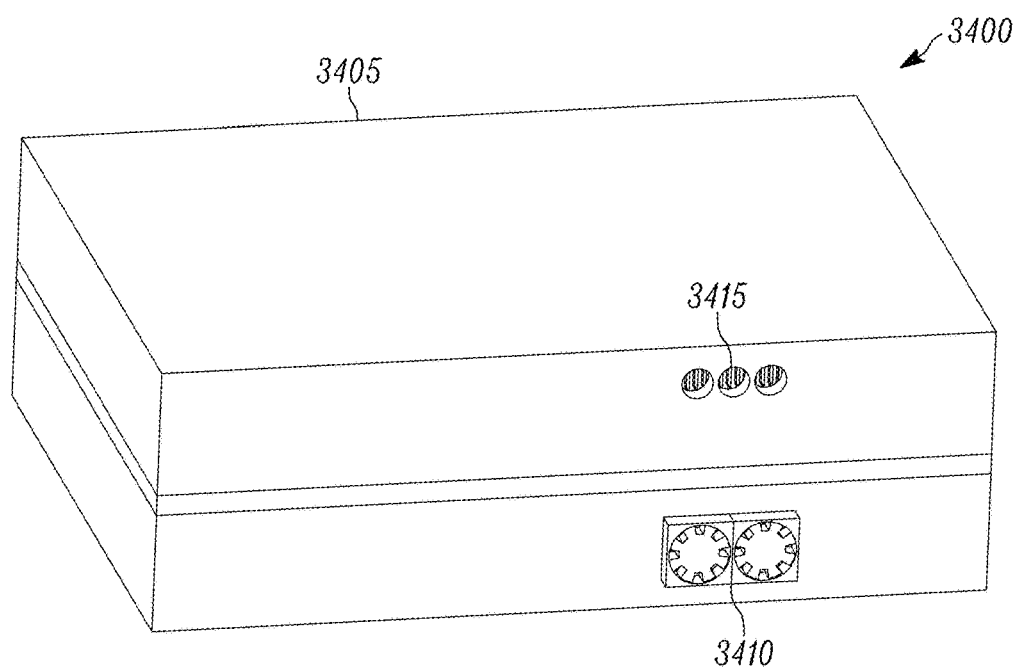
FIG. 34 is an isometric view of a battery pack with case in accordance with an embodiment of the disclosure.

FIG. 34 shows an example battery pack 3400. Battery pack 3400 may include case 3405 that houses or protects battery pack 3400 from outside elements and ensures a user does not come into direct contact with battery pack 3400. Case 3405 may be of a size and shape that fits inside a vehicle. For example, case 3405 may be approximately 36×26×10 inches in size. As shown, case 3405 provides a housing or encasement for battery pack 3400. Case 3405 may include ventilation accommodations for battery pack 3400, such as built in holes or openings 3415 that allow battery pack 3400 to include one or more fans 3410 to provide convective cooling of electronic components, described in further detail in FIG. 35. In some embodiments, battery pack 3400 may be placed in the bed of a pickup truck (not shown). A battery pack 3400 intended for the bed of a pickup truck may be of size and shape typical of a truck bed box, e.g., that described in U.S. patent application No. 20030102322, with dimensions in the general range of 60×12×18 inches.

Figure 35:
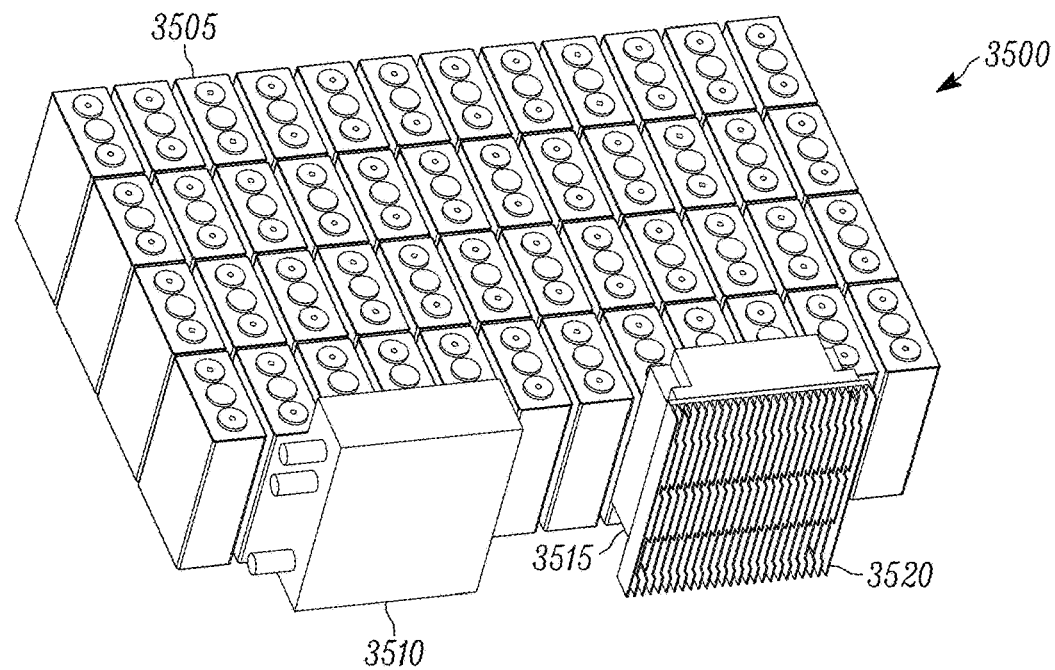
FIG. 35 is an isometric view of components of a battery pack in accordance with an embodiment of the disclosure.

FIG. 35 shows example internal components of a battery pack 3500. The internal components may include one or more battery cells 3505, a motor controller 3515, and a battery charger 3510. The one or more battery cells 3505 may be configured to store electrical energy for use by a motor and may be wired in series, parallel, or a combination of series and parallel. The battery cells may be of lead acid, nickel cadmium, nickel metal hydride, lithium, or any other rechargeable type. Motor controller 3515 may be configured to control the current, waveform, and frequency of electricity sent to the motor. A heatsink 3520 may be thermally connected to motor controller 3515 to provide more effective cooling. Battery charger 3510 may be configured to allow a battery to be recharged by plugging the AHS into a building's electricity source or a dedicated electric vehicle charging station. Battery charger 3510 may be configured to interface with the electricity source using an industry standard connector and protocol, such as an SAE J1772 connector.

Motor controller 3515 and/or battery charger 3510 may also be located inside the chassis 320 of AHS-E drive 300 or combined with the display and control electronics, described below in FIG. 37, and mounted to the dashboard 3620 or center console 3615, shown in FIG. 36.

Battery pack 3500 may be charged by regenerative braking when the AHS-E is in use. As used herein, regenerative braking refers to the charging of a battery with the current generated by an electric motor when the force provided by the motor is in opposition to the direction of travel. For example, when the driver uses a throttle to decelerate a vehicle, electrical current from the motor may be used to add charge to the battery pack 3500, as is common in electric vehicles.

In order for the user to operate the AHS-E, an input device that allows the user to command the desired magnitude and direction of torque from the motor is required. As described above, an AHS-E includes a throttle to allow this input. The throttle may communicate electrically or wirelessly with display and control electronics and/or a motor controller, which control the input to the motor. The AHS-E may be configured such that a neutral or resting throttle position may result in no torque from the motor, or may result in a fixed amount of regenerative braking. At low speeds, a neutral throttle position may also provide a small amount of forward torque to mimic that of a conventional vehicle with an automatic transmission.

Figure 36:
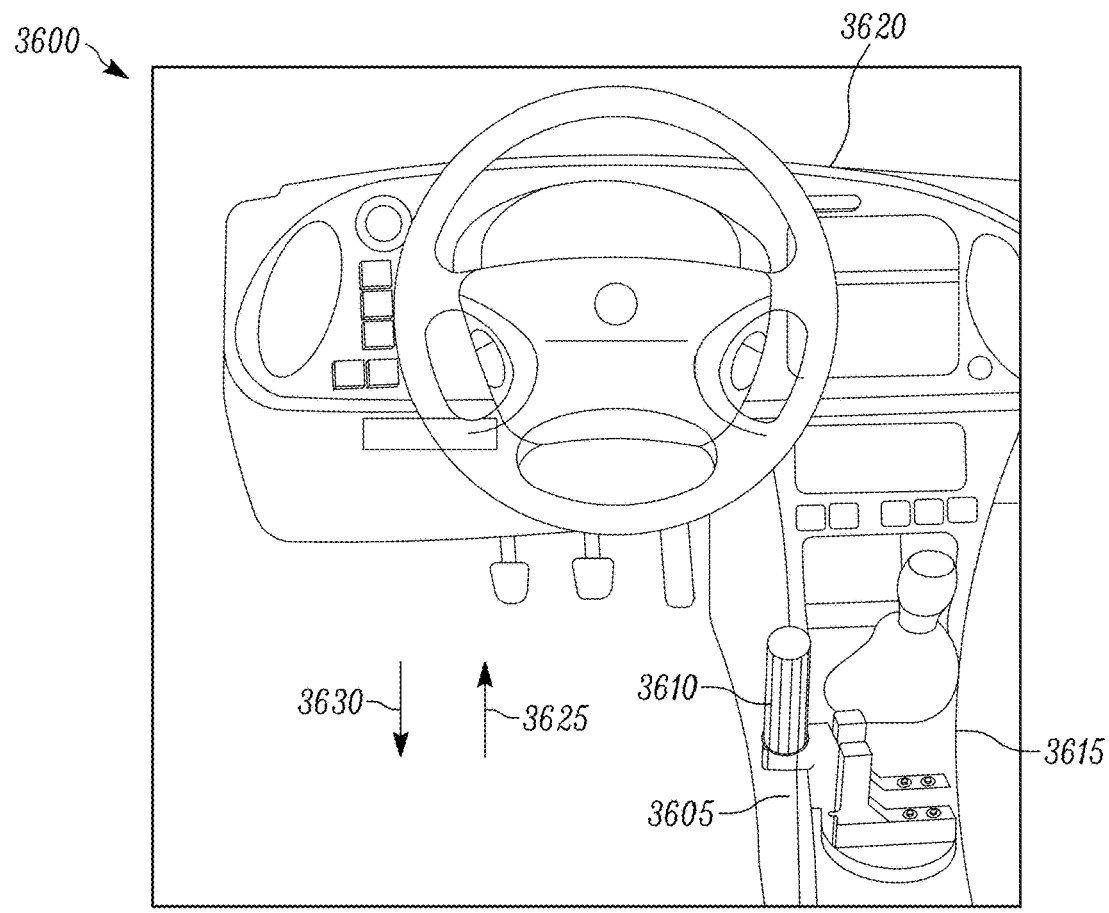
FIG. 36 is a vehicle interior with a hand lever throttle in accordance with an embodiment of the disclosure.

FIG. 36 shows an example vehicle interior 3600 with an example throttle 3605. In this embodiment, the throttle 3605 includes a hand lever 3610 mounted to a center console 3615. Pushing the lever 3610 forward 3625 may command forward torque while pulling the lever 3610 backward 3630 may command reverse torque, or vice versa. The hand lever 3610 may also be mounted to a dashboard 3620.

Figure 37:
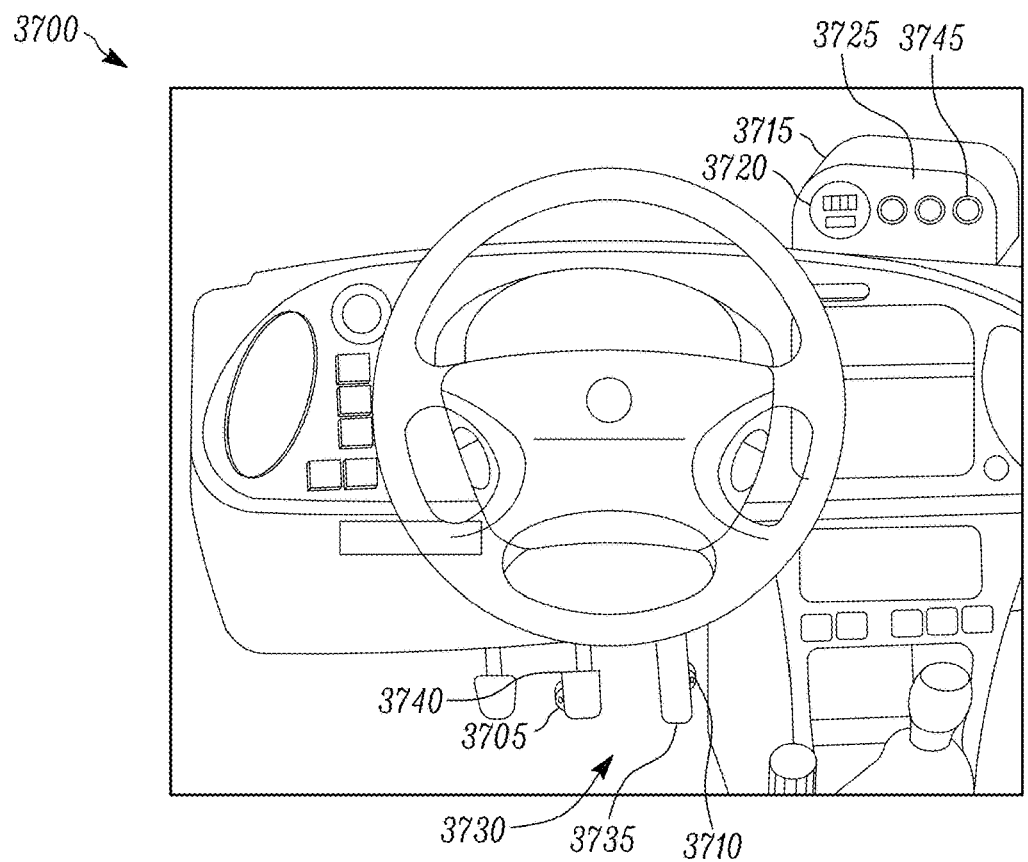
FIG. 37 is a vehicle interior with throttle and brake rangefinders and display and control electronics in accordance with an embodiment of the disclosure.

FIG. 37 shows an example vehicle interior 3700 with an example throttle 3730. In this embodiment, throttle 3730 includes a throttle range-finder 3710 and a brake range-finder 3705. Throttle range-finder 3710 may be affixed to the standard vehicle throttle pedal 3735, and a brake range-finder 3705 may be affixed to the standard vehicle brake pedal 3740. The range-finders 3705, 3710 may measure the distance above the pedal of the driver's foot (not shown) and apply either a forward or brake torque based inversely on that distance. The range-finders 3705, 3710 can be of optical, ultrasonic, or other type.

Figure 42:
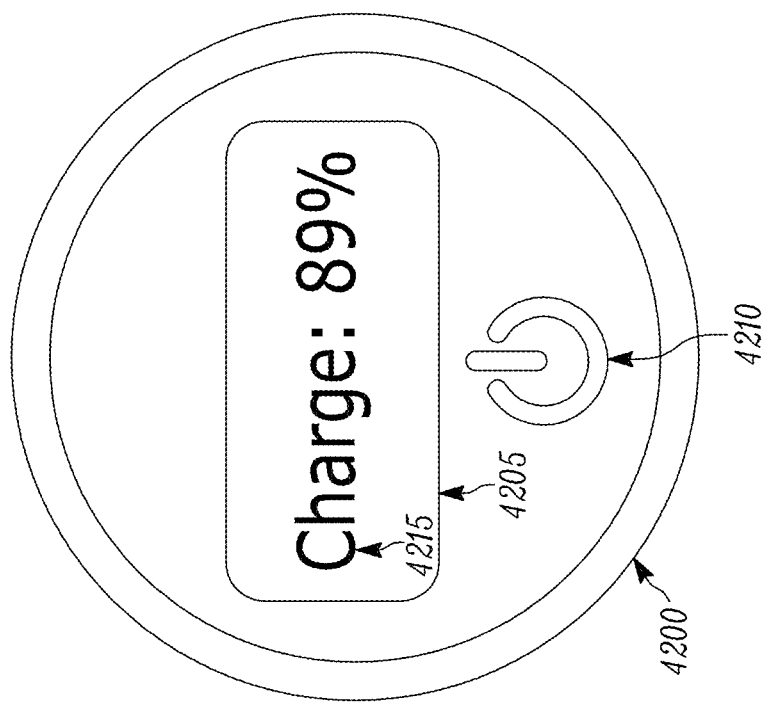
FIG. 42 is a front view of a display of display and control electronics in accordance with an embodiment of the disclosure.

FIGS. 37 and 42 also show display and control electronics 3715 mounted to the dashboard 3620. A display 3720 may provide information such as the state of charge of the battery and other vital information, including but not limited to battery voltage, motor current, motor speed, motor temperature, motor controller temperature, and the like. Input devices 3725, such as buttons or switches 3745 for controlling various functions, such as powering the system on, reversing the motor throttle response for backing up, and initiating charging may also be included. The display 4200 may include a power-on indicator 4210 and a configurable display 4205. The configurable display may be configured to display a variety of information, such as remaining charge 4215.

Figure 38:
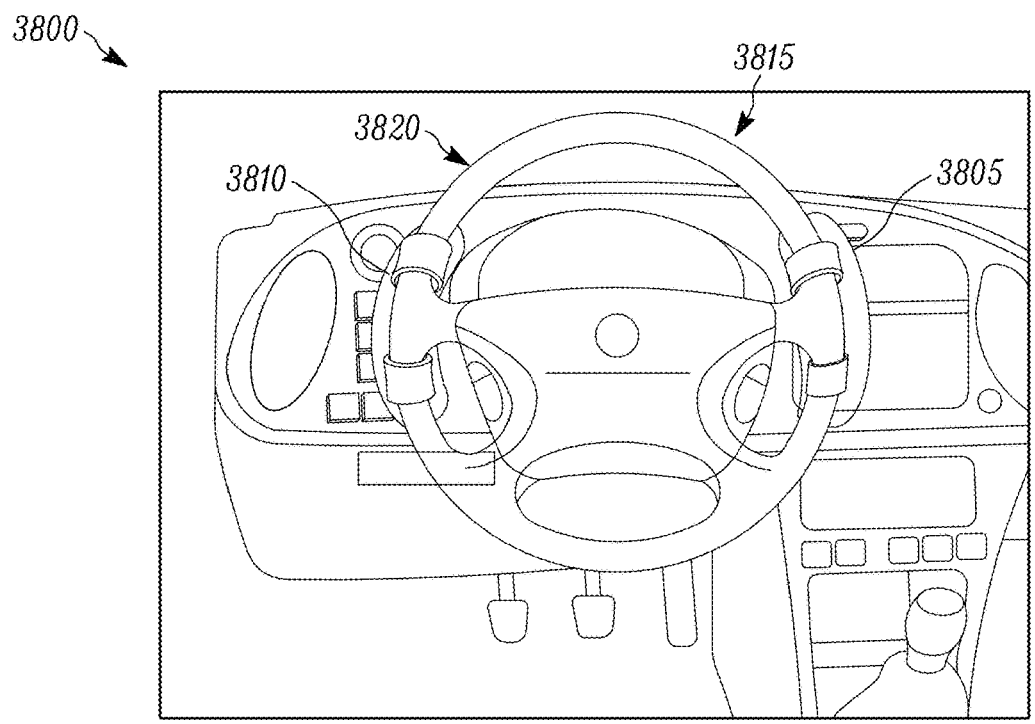
FIG. 38 is a vehicle interior with throttle and brake paddles in accordance with an embodiment of the disclosure.

FIG. 38 shows an example vehicle interior 3800 with an example throttle 3815. In this embodiment, a throttle paddle 3805 and a brake paddle 3810 are mounted to the steering wheel 3820. Pulling the throttle paddle 3805 may cause forward torque while pulling the brake paddle 3810 may cause reverse torque.

Alternatively, the throttle may be an additional pedal (not shown) that may be affixed to the driver's foot well. Pressing down on the pedal may command forward torque. The pedal may include a toe box, which may allow the driver to pull up on the pedal to command braking or reverse torque. Toe boxes are commonly used on industrial control foot switches, such as the SSC Controls G-Series foot switches.

Alternatively, if the vehicle's engine is not idled during operation of the AHS-E, the AHS-E may connect electrically with the vehicle's onboard diagnostic (ODB) port and acquire the vehicle's throttle position sensor data. Thus, the driver would control the AHS-E by using the vehicle's throttle pedal as usual.

In some embodiments, input devices such as the throttle and/or display and control electronics may be configured to communicate with various systems such as the motor of the AHS. Such communication may be implemented as software and executed by a general-purpose computer. For example, such a general-purpose computer may include a control unit/controller or central processing unit ("CPU"), coupled with memory, EPROM, and control hardware. The CPU may be a programmable processor configured to control the operation of the computer and its components. For example, CPU may be a microcontroller ("MCU"), a general purpose hardware processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration. Such operations, for example, may be stored and/or executed by memory unit.

In some embodiments, the methodologies described herein are modules that may be configured to operate as instructed by a general process computer. In the case of a plurality of modules, the modules may be located separately or one or more may be stored and/or executed by the memory unit.

While not specifically shown, the general computer may include additional hardware and software typical of computer systems (e.g., power, cooling, operating system) is desired. In other implementations, different configurations of a computer can be used (e.g., different bus or storage configurations or a multi-processor configuration). Some implementations include one or more computer programs executed by a programmable processor or computer. In general, each computer may include one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

As is known, some vehicles use their engine to power certain accessory systems. For example, engine vacuum is commonly used to power the power brake booster. A hydraulic pump driven by the engine via a belt is often used to provide power steering. Some automatic transmissions require the engine to be running to provide lubrication to the transmission. Heat is typically provided to a vehicle cabin by extracting it from the engine's cooling system. To minimize fuel usage, electrically powered accessories may be installed in the vehicle so that the vehicle's engine does not need to be idled while using the AHS-E. If the vehicle uses a vacuum brake booster, an electric vacuum pump may be installed. If the vehicle normally requires the engine to be running to lubricate the transmission and the transmission cannot be decoupled from the wheels at, for example, a transfer case, an electric transmission lubrication pump may be installed. An electrically powered heater may be installed to provide heat to the vehicle's cabin. If the vehicle has hydraulic power steering, an electro-hydraulic power steering pump may be installed in parallel with the engine-driven pump, as shown in the schematic 3900 in FIG. 39.

Figure 39:
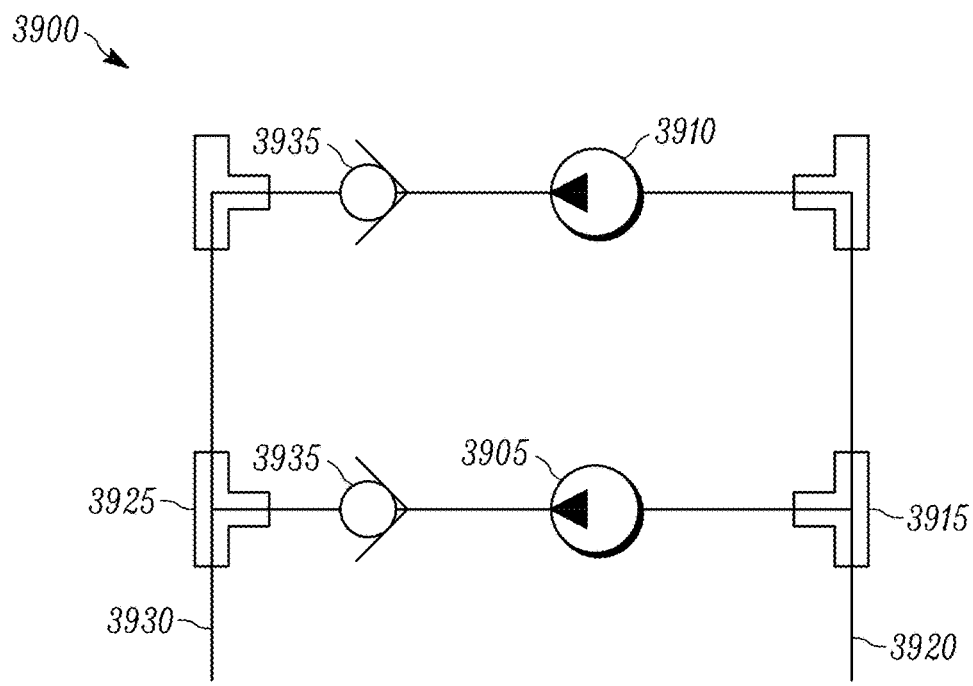
FIG. 39 is a schematic of a hydraulic power steering system with an electro-hydraulic pump added in parallel with an engine-driven hydraulic pump in accordance with an embodiment of the disclosure.

In FIG. 39, a vehicle's engine-driven pump 3905 is left in place. An electro-hydraulic pump 3910 is installed by adding a tee 3915 to hydraulic return line 3920, two check valves 3935 on pump outlets to prevent back-pressurizing whichever pump is inoperative, and a tee 3925 on high pressure hydraulic line 3930. As such, when the vehicle is operating conventionally, the engine-driven pump 3905 may provide hydraulic power to the steering system while the electro-hydraulic pump 3910 remains inoperative. When the vehicle is operating with the AHS-E, the engine-driven pump 3905 is inoperative and the electro-hydraulic pump 3910 provides hydraulic power to the steering system.

In some embodiments, at least a portion of electric accessories may receive power from the vehicle's 12-volt system. A DC-DC converter that reduces the AHS-E battery voltage and a typical lead-acid battery charging circuit may connect the AHS-E battery to the vehicle's 12-volt battery to prevent it from being drained.

To increase safety, a vacuum sensor may monitor brake booster vacuum and a pressure sensor may monitor power steering hydraulic pressure. The control electronics may cut motor power if either fall out of normal range.

Brake lights (not shown) may be included in the AHS. Brake lights may illuminate whenever braking torque is being applied by the motor to signal to other motorists that the vehicle may be decelerating.

A cooling system (not shown) may be included in the AHS-E. The cooling system may include an electrically driven pump, hoses, and a small radiator. The radiator may be located on or in the chassis 320 and may include an electrically driven fan to improve cooling efficiency. With such a system, liquid coolant may be circulated to the motor 505, motor controller 3515, battery cells 3505, or any combination thereof, to remove heat, which may then be expelled from the system by the radiator. In another example, the cooling system may fluidically connect to the vehicle's cooling system so that the vehicle's radiator may be used for expelling heat. This example may also allow heat to be extracted from the AHS to provide warmth to the vehicle cabin through the vehicle's heater core.

As is known, some battery types lose significant electrical energy capacity at low temperatures. Therefore the AHS-E may include resistive heaters (not shown) in the battery pack 3500 that convert electrical energy from the battery pack 3500 into thermal energy, which may be used to heat the battery cells 3505, improving their energy capacity.

Figure 41:
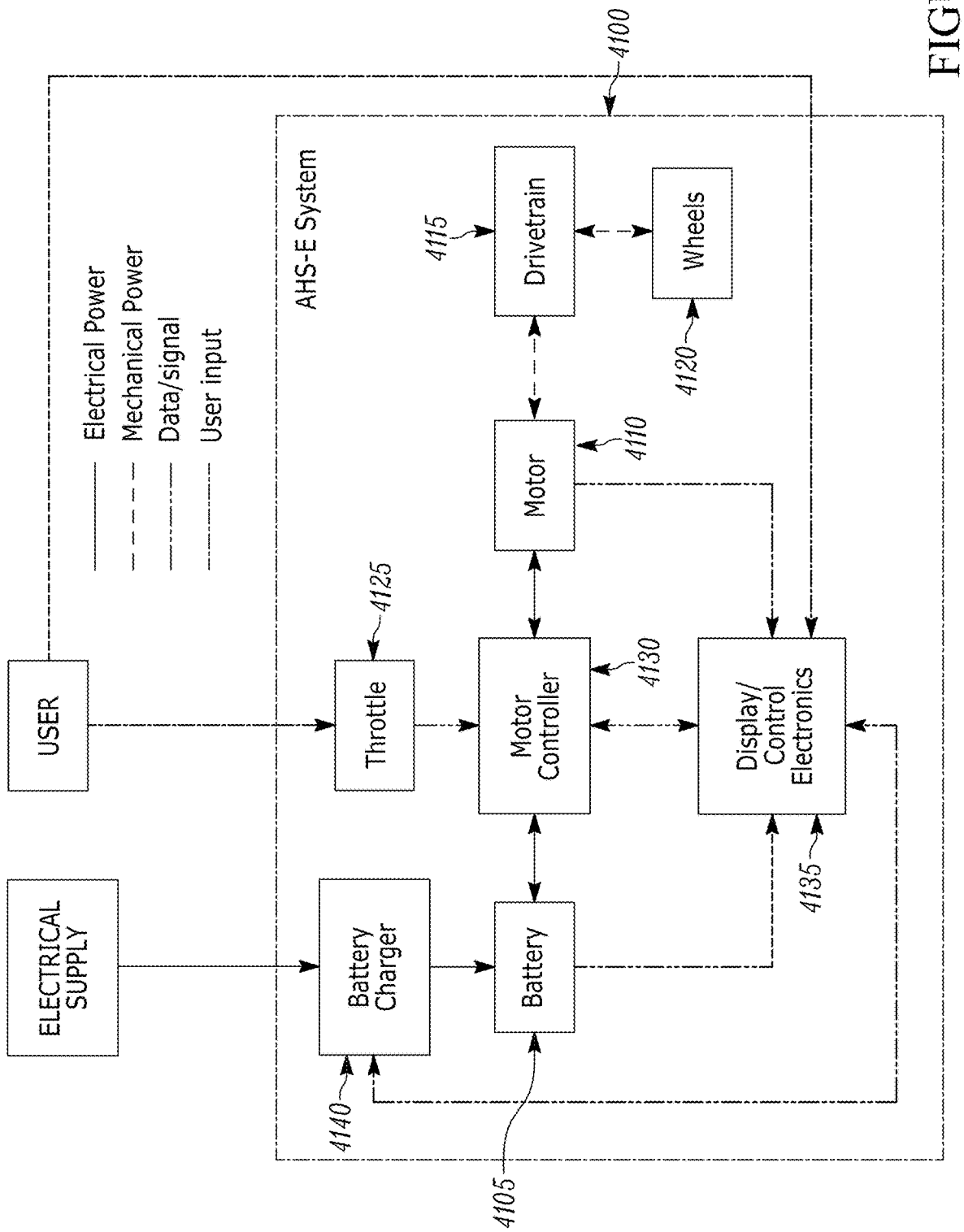
FIG. 41 is a schematic of an AHS-E system in accordance with an embodiment of the disclosure.

An example summary of functionality of an AHS 4100 is provided in FIG. 41. In general, an energy storage device such as battery pack 4105 may be configured to store electrical energy for use by the AHS 4100. An energy conversion device such as motor 4110 may be configured to convert stored electrical energy from the battery pack 4105 into mechanical power and vice versa. The drivetrain 4115 may be configured to transfer the mechanical power between the motor 4110 and vehicle 4120 to provide propulsion and braking. The chassis 320 may be configured to provide a structure for mounting and/or enclosing the e.g., motor 4110 and drivetrain 4115. An input device such as a throttle 4125, which may be a lever, pedal, knob, paddle, button, sensor, or other input device, may be configured to allow a user or driver to specify an amount and direction of torque provided by the motor 4110. A power conversion controller such as a motor controller 4130 may be an electronic device that may be configured to take electrical power from the battery 4105, convert it to a form usable by the motor 4110, and/or send a specific amount of current to the motor 4110. The amount of current may be determined by the controller 4130 based on a command from the throttle 4125 and the relationship between motor current and motor torque. A user interface such as control and display electronics 4135 may be configured to provide information about the AHS 4100 to a user and allow the user to provide additional inputs and commands to the AHS 4100. An energy storage device such as a battery charger 4140 may be configured to allow electrical power to be drawn from a building electrical supply or electric vehicle charging station and used to add electrical energy to the battery pack 4105. The power conversion device may include a system drive. The power conversion device may further include the drivetrain and energy conversion device.

To use the AHS-E, the user would first charge the battery by plugging the battery charger into an electrical supply such as a household outlet or a dedicated electric vehicle charging station. Once sufficiently charged, the system is unplugged. The swing arms next need to be coupled to the wheels if they are not already. To do this, the user removes the pin from the support (prop) and lowers the support. Next, they remove the pin from the swing arm frame and pivot the swing arm down to the wheel. Next, they connect the coupling system by inserting the male pilot of the coupling assembly into the female pilot of the wheel-side coupling. To secure the connection, the user turns the coupling knob until tight. The process is repeated for the other swing arm. Next, from inside the vehicle the user turns on the vehicle's engine to power any engine-driven accessories such as hydraulic power steering and vacuum power brakes. It may not be necessary to turn the engine on if electrically-driven alternatives to any engine-driven accessories have been installed, such as an electric brake booster pump. The user now turns on the AHS-E by actuating, for example, a switch on the display and control electronics, which may be mounted to the dashboard. The display now indicates that the system is on.

The system is now active and the user drives the vehicle with the AHS-E throttle, which may be a hand lever mounted to the center console. To move forward, the user pushes the lever forward. To coast, the user releases the lever. To slow down, the user pulls the lever back. Pulling the lever back while moving forward provides regenerative braking, which returns some charge to the battery. If stationary, pulling back on the lever will cause the vehicle to reverse. While reversing, pushing forward on the lever will cause the vehicle to slow down. Pushing the lever forward while reversing also provides regenerative braking.

To regulate the amount of power delivered to or from the vehicle, the user varies how much they push the throttle. A small translation from the neutral position will result in a small amount of power and a large translation will result in a large amount of power, in a similar manner to the gas pedal of a conventional vehicle. The relationship may be linear, but may also be non-linear. For example, translations near the neutral position may produce a less pronounced increase or decrease in power than translations further from the neutral position. Such a non-linearity may allow the user to more smoothly control the vehicle in slow-speed maneuvers.

The throttle position is communicated to the motor electrically or wirelessly. The motor controller determines how much power is to be transmitted to/from the system based on the throttle position. The motor controller then takes the appropriate amount of current from the battery pack and converts it to a form usable by the motor. The form of electricity will be determined by the type of motor. For example, the motor controller would use the DC current from the battery to generate 2 sets of 3 AC waveforms at the required frequency if dual 3-phase AC induction motors are used. The current is sent to the motor or motors and the motor or motors convert the electrical power into rotational mechanical power. When regenerative braking is being utilized, the power flow and conversion is reversed.

The motor power is now transmitted to the vehicle by the drivetrain. In the example of a system configured to transmit power between dual motors and the vehicle's wheels, the power from each motor is transmitted to a transmission (one for each motor), which increases the torque from the motor and consequently decreases the rotational speed. The power from each transmission in next transmitted to the swing arm. In the example wherein the swing arm uses a chain to transmit power, a driven sprocket transmits power from the transmission to a chain, which transmits power to a wheel sprocket. The wheel sprocket transmits power to the coupling assembly, which transmit power to the wheel-side coupling. The wheel-side coupling transmits power the vehicle wheel, enabling propulsion. When regenerative braking is being utilized, the power flow is reversed.

While driving, the display on the display and control electronics provides information such as the remaining charge in the battery, which can be provided as a percentage of capacity, a unit of energy such as kilowatt-hours or kilojoules, or as an estimated remaining range.

If the battery is depleted, the system cuts power to the AHS-E motor. The user has the option of continuing to drive with the swing arms still coupled to the wheels. Or, to eliminate the extra friction caused by AHS-E drivetrain continuing to turn with the vehicle's wheels, the swing arms can be disconnected.

To disconnect the swing arms when the AHS-E is not in use, the user first unscrews the coupling knob. Once unscrewed enough to release the coupling system, the user continues to unscrew the knob. Once it becomes tight in the unscrewed direction, the coupling assembly is locked to the swing arm frame. Now the coupling system can be decoupled and the coupling assembly will stay at the same position on the swing arm frame, making it easier to recouple the next time. The swing arm is now swung into an upright position. The pin is reinserted into the swing arm frame, holding it upright. The support (prop) is raised and the pin is reinserted into it, connecting it to the swing arm frame and providing additional support. The process is repeated for the other swing arm.

It should be appreciated that a number of sub-systems described as part of the AHS have a number of beneficial features. Furthermore, while described as part of an AHS, each of the various sub-systems may be used independently from the AHS system. As provided in FIGS. 44-47, example hierarchies of different embodiments of AHS systems showing various sub-systems are provided. Referring in general to FIGS. 44-47 and any other identified Figures below, the following features provide benefits/advantages to the disclosed AHS systems:

The overall drive layout-mounting at the rear of the vehicle of using swing arms to get power to the wheels (FIG. 1).
   The coupling system in general
      The drive-side coupling that is free to rotate and slide on the swing arm and is driven by a chain/belt from the rear drive (FIG. 8).
      The wheel-side coupling that mounts to the wheel using specially adapted lug nuts/screws (FIG. 14).

The pilots and dogs of the interface between the two couplings (FIGS. 10, 11, 12)

The way the two couplings are secured together by either the threaded coupling shaft or the quick release pin (FIGS. 11, 43).

The way the coupling shaft or quick release pin can lock the coupling assembly to the swing arm frame (FIGS. 10, 43).

The way the swing arms can be positioned in standby (FIG. 2).

The way the swing arms can be locked in a lowered position to allow the drive to be wheeled around (FIG. 27).

The counterbalance mechanism that opposes chain/belt tension in the swing arm (FIG. 13).

The mounting system in general

Using a trailer hitch receiver to mount the main structure of the drive (FIG. 15).

The way the mounting system is split in half, with half mounted to the vehicle and half a part of the drive (FIG. 16).

The adjustment mechanism for the part mounted to the vehicle (FIG. 15).

The adjustable height of the part mounted to the vehicle (FIGS. 16, 17).

The pilot and clocking features of the mounting system (FIGS. 15, 17).

The single motor rear drive

Using a differential to split power left and right (FIG. 5).

Using a coaxial differential with a hollow motor shaft.

The sliding axle assemblies and telescoping driveshafts that allow adjustment of the width (FIG. 5).

The dual motor rear drive

Mounting the motors in nacelles that can slide to adjust the width (FIG. 18).

Using a transmission on each motor, e.g., an epicyclic gear transmission (FIG. 19).

The shaft-driven swing arm

The two right angle gearboxes (FIG. 40).

The telescoping driveshaft and torque tube (FIG. 40).

The live rear axle configuration

The bearing block that clamps on the vehicle's axle tube (FIG. 20).

The chain sprocket that gets sandwiched between the vehicle's driveshaft and the vehicle's differential and is driven by the sprocket on the end of the driveshaft in the bearing block (FIG. 21).

The use of a right angle gearbox that allows the motor to be oriented transversely (FIG. 22).

The telescoping driveshaft that allows for suspension articulation and vehicles of different length (FIG. 20).

Suspension systems.

The general arrangement of the torsion half-axle suspension system with caster wheels (FIG. 24).

The ride-height/spring preload adjustment system (FIG. 24).

The general arrangement of the walking beam suspension (FIG. 25).

The ride-height/spring preload adjustment system (FIG. 26).

The general arrangement of the combined suspension/caster system (FIG. 28).

The ride-height/spring preload adjustment system (FIG. 28).

The moving caster axis mechanism (FIGS. 31, 32)

The moving caster axis mechanism as applied to a battery trailer (FIGS. 29, 30).

The moving caster axis mechanism as applied to a range-extending generator (FIG. 33).

The moving caster axis mechanism as applied to a cargo trailer.

The ways of implementing a throttle

The throttle and brake rangefinders mounted to the gas and brake pedals of the vehicle (FIG. 37).

The throttle and brake paddles mounted to the steering wheel (FIG. 38).

The extra pedal mounted in the footwell, e.g., with a toebox.

Further Non-Limiting Description of the Disclosure

The following numbered paragraphs constitute a further non-limiting description of the disclosure in a form suitable for appending to the claim section if later desired.

1. A hybrid system comprising:
an energy storage device;
a drive system configured to transfer power between the energy storage device and one or more of a vehicle's wheels;
a power control device configured to regulate the power flow between the energy storage device and the energy conversion device;
a throttle configured to allow a user to communicate to the hybrid system a desired magnitude and direction of force to be imparted on the vehicle by the system;
a user interface configured to allow the user to communicate with the system;
an energy addition device configured to add energy to the energy storage device; and
a vehicle system configured to mount or enclose the hybrid system and to receive power from, and transfer power to, the energy storage device.

2. The drive system of aspect 1, wherein the drive system comprises:
a rear drive configured to transfer power between the energy storage device and one or more swing arms; and
one or more swing arms configured to transfer power between the rear drive and one or more vehicle wheels.

3. The vehicle system of aspect 1, wherein the vehicle system comprises:
a vehicle configured to mount one or more wheel-side couplings and a vehicle-portion of a mounting system;
one or more wheel-side coupling assemblies configured to transfer power between a vehicle wheel and a swing arm; and
a vehicle-portion of a mounting system configured to mount the drive system to the vehicle.

4. The rear drive of aspect 2, wherein the rear drive comprises:
a chassis configured to mount or enclose the rear drive;
a drive-portion of a mounting system configured to mount the rear drive to the vehicle system;
an energy conversion device configured to convert energy from the energy storage device into mechanical energy;
a differential drive configured to transfer power between the energy conversion device and one or more driveshafts;
one or more driveshafts configured to transfer power between the differential drive and an axle assembly; and
one or more axle assemblies configured to transfer power between a driveshaft and a swing arm.

5. The swing arm of aspect 2, wherein the swing arm comprises:
   a power transmitting device configured to transfer power between the axle assembly and a coupling assembly;
   a coupling assembly configured to transfer power between a coupler and the wheel-side coupling; and
   a swing arm frame configured to mount the swing arm and communicate with the rear drive.

6. The wheel-side coupling assembly of aspect 3, wherein the wheel-side coupling assembly comprises:
   a wheel-side coupling;
   one or more wheel fasteners; and
   one or more screws.

7. The vehicle-portion of the mounting system of aspect 3, wherein the vehicle-portion of the mounting system comprises:
   a trailer hitch receiver configured to engage the vehicle;
   a receiver post configured to engage the hitch receiver and a mounting plate; and
   a mounting plate configured to engage the drive.

8. The swing arm of aspect 5, wherein the swing arm is rotationally connected to the rear drive such that the swing arm can be positioned in a multitude of orientations including:
   an orientation that aligns the coupling assembly with the wheel-side coupling;
   a substantially vertical orientation that decouples the coupling assembly from the wheel-side coupling; and
   a lowered orientation that places the coupling assembly end of the swing arm in contact or nearly in contact with the ground.

9. The swing arm of aspect 8, wherein the swing arm is secured in each orientation by the insertion of a coupler through a hole in the swing arm frame and a hole in the rear drive that are in alignment.

10. The coupler of aspect 9, wherein the coupler is a pin.

11. The coupler, of aspect 9 wherein the coupler is a screw.

12. The rear drive of aspect 4, further comprising a support that is rotationally connected to the chassis such that it can be in either a substantially horizontal position or raised and connected to the swing arm with a coupler when the swing arm is in a substantially vertical orientation.

13. The support of aspect 12, wherein the coupler is a pin.

14. The support of aspect 12, wherein the coupler is a screw.

15. The support of aspect 12, wherein the coupler is a magnet.

16. The support of aspect 12, wherein the coupler is a clip.

17. The support of aspect 12, wherein the support is secured in a substantially horizontal position with a coupler.

18. The support of aspect 17, wherein the coupler is a pin.

19. The support of aspect 17, wherein the coupler is a screw.

20. The support of aspect 17, wherein the coupler is a magnet.

21. The support of aspect 17, wherein the coupler is a clip.

22. The swing arm of aspect 8, further comprising a wheel at the lower forward end configured so that it may roll on the ground when the swing arm is in a lowered position.

23. The wheel of aspect 22, wherein the wheel is a spherical wheel.

24. The wheel of aspect 22, wherein the wheel is a caster wheel.

25. A coupling system comprising the coupling assembly of aspect 5 and the wheel-side coupling assembly of aspect 3 configured to allow the swing arm to be coupled to the vehicle wheel such that power can be transferred between the swing arm and the vehicle wheel, and decoupled such that there is no power connection between the swing arms and the vehicle wheel.

26. The coupling assembly of aspect 25, wherein the coupling assembly comprises:
   a bearing housing;
   a bearing;
   a drive-side coupling;
   a coupling shaft; and
   a coupling knob;

27. The swing arm of aspect 5, wherein the coupling assembly is slidably connected to the swing arm frame.

28. The coupling assembly of aspect 26, configured such that the drive side coupling is rotationally connected to the bearing housing with the bearing.

29. The swing arm frame of aspect 5, wherein the swing arm frame includes a central slot.

30. The swing arm frame of aspect 5, wherein the swing arm frame includes one or more locking features configured to engage with a locking ferrule.

31. The coupling assembly of aspect 26, configured such that the coupling shaft passes through the central slot of the swing arm frame and the drive-side coupling and is rigidly connected to the coupling knob.

32. The coupling system of aspect 25, configured such that when the swing arm is coupled to the vehicle wheel, the drive-side coupling is rigidly connected to the wheel-side coupling and is secured with an interface between the coupling shaft and the wheel-side coupling.

33. The coupling system of aspect 32, configured such that torque-transmitting features on the drive-side coupling engage with torque-transmitting features on the wheel-side coupling such that torque can be transmitted between the swing arm and the wheel.

34. The coupling system of aspect 32, wherein the interface between the coupling shaft and the wheel-side coupling is a threaded interface.

35. The coupling system of aspect 32, wherein the interface between the coupling shaft and the wheel-side coupling is a latching interface.

36. The coupling system of aspect 33, wherein the torque-transmitting features are dogs.

37. The coupling system of aspect 33, wherein the torque-transmitting features are protrusions and slots.

38. The coupling assembly of aspect 26, further comprising a locking ferrule configured such that is rotationally connected and axially constrained to coupler shaft.

39. The locking ferrule of aspect 38, wherein the locking ferrule is configured such it includes a locking feature.

40. The coupling assembly of aspect 26, wherein the coupling assembly is configured such that it includes an interface with the coupling shaft that can axially constrain the shaft in an outward position.

41. The coupling assembly of aspect 26, wherein the coupling assembly is configured such that when the coupling shaft is constrained in an outward position by the interface of aspect 40, the locking ferrule is engaged with the swing arm such that the coupling assembly cannot slide relative to the swing arm frame.

42. The coupling assembly of aspect 41, wherein the coupling assembly is configured such that the locking feature of the locking ferrule can engage with the locking feature of the central slot of the swing arm frame.

43. The locking features of aspects 30 and 39, wherein the locking feature of the central slot is a chamfer and the locking feature of the locking ferrule is a conical surface.

44. The locking features of aspects 30 and 39, wherein the locking features are teeth configured such that they intermesh.

45. The interface of aspect 40, wherein the interface is a threaded interface.

46. The interface of aspect 40, wherein the interface is a latching interface.

47. The interface of aspect 40, wherein the interface includes a spring that biases the locking ferrule towards the swing arm frame.

48. The coupling assembly of aspect 26, further comprising a bearing screw configured such that it threads into the drive-side coupling and secures the inner race of the bearing to the drive-side coupling.

49. The interface of aspect 40, wherein the bearing screw includes the internal thread of the interface.

50. The coupling system of aspect 32, wherein the drive-side coupling includes a male pilot feature configured such that it can be inserted into a female pilot feature on the wheel-side coupling such that the couplings are coaxially aligned.

51. The coupling system of aspect 32, wherein the wheel-side coupling includes a male pilot feature configured such that it can be inserted into a female pilot feature on the drive-side coupling such that the couplings are coaxially aligned.

52. The pilot features of aspects 50 and 51, wherein one pilot feature includes a lead-in feature.

53. The pilot features of aspects 50 and 51, wherein both pilot features include a lead-in feature.

54. The dogs of aspect 36, wherein the dogs include one or more lead-in features.

55. The lead-in features of aspect 54, wherein the lead-in features form a sharp or nearly-sharp peak.

56. The coupling assembly of aspect 26, further comprising a handle rigidly connected to the bearing housing and configured such that a user can grasp it to slide the coupling assembly relative to the swing arm frame.

57. The wheel fasteners of aspect 6, wherein the wheel fasteners are lug nuts configured to mount the wheel to the vehicle, provide a mounting point for the wheel-side coupling, and transfer power between the wheel-side coupling and the vehicle wheel.

58. The wheel fastener of aspect 57, wherein the wheel fastener includes a feature on its outer end for interfacing with the wheel-side coupling.

59. The wheel faster of aspect 58, wherein the feature at the outer end is a cylindrical surface.

60. The wheel-side coupling of aspect 6, wherein the wheel-side coupling includes features for interfacing with the wheel fasteners.

61. The wheel-side coupling of aspect 60, wherein the features for interfacing with the wheel fasters are radially oriented slots.

62. The wheel-side coupling of aspect 61, wherein the slots are arranged in a symmetrical radial pattern of four.

63. The wheel-side coupling of aspect 61, wherein the slots are arranged in a symmetrical radial pattern of five.

64. The wheel-side coupling of aspect 61, wherein the slots are arranged in a symmetrical radial pattern of six.

65. The wheel-side coupling of aspect 61, wherein the slots are arranged in a symmetrical radial pattern of eight.

66. The wheel-side coupling of aspect 61, wherein the slots are arranged in two or more of the symmetrical radial pattern in aspects 62, 63, 64, 65 and configured so that they do not overlap.

67. The swing arm of aspect 5, further comprising a counterbalance mechanism configured to impart a force on the coupling assembly in opposition to the force imparted by any tension in the power-transmitting device.

68. The counterbalance mechanism of aspect 67, comprising one or more springs and a spring perch configured such that the spring perch may be rigidly connected to the swing arm frame in a plurality of locations corresponding to the distance from a coupler assembly that achieves proper spring preload.

69. The counterbalance mechanism of aspect 68, further comprising spring guides configured to prevent spring bucking and to provide spring retention.

70. The counterbalance mechanism of aspect 68, further comprising an adjustment rod configured to be:
rigidly connected to a coupler assembly;
passing through a hole in the spring perch;
including a threaded portion on the end passing through the spring perch; and
allowing a nut to be threaded onto it such that the nut can be used to advance the spring perch towards the coupling assembly to preload the springs.

71. The swing arm of aspect 5, wherein the power-transmitting device comprises a chain, a drive sprocket, and a wheel sprocket.

72. The swing arm of aspect 5, wherein the power-transmitting device comprises a belt, a drive pulley, and a wheel pulley.

73. The swing arm of aspect 5, further comprising one or more tensioners configured to remove slack from the power-transmitting device.

74. The tensioner of aspect 73 comprising:
a roller rotationally connected to a tensioner arm and in communication with the power transmitting device;
a tensioner arm rotationally connected to the swing arm frame; and
one or more springs configured to pull the tensioner arm inwards towards the swing arm frame.

75. The swing arm of aspect 5, the swing arm frame further comprising one or more opposing pairs of the tensioners of aspect 74, configured such that each pair is pulled inwards towards each other by the spring.

76. The differential drive of aspect 2, wherein differential drive comprises a power-transmitting device configured to transfer power between the motor and a differential, and a differential configured to transfer power between the motor and one or more driveshaft, and to allow the driveshafts to rotate at different speeds.

77. The differential drive of aspect 76, wherein the power-transmitting device comprises a chain, a motor sprocket, and a differential sprocket.

78. The differential drive of aspect 76, wherein the power-transmitting device comprises a belt, a motor pulley, and a differential pulley.

79. The differential drive of aspect 76, wherein the power-transmitting device comprises a gear pair.

80. The differential drive of aspect 76, further comprising one or more tensioners configured to take slack out of the power-transmitting device.

81. The tensioner of aspect 80, wherein the tensioner comprises:
a roller rotationally connected to a tensioner arm and in communication with the power transmitting device;
a tensioner arm rotationally connected to the differential drive chassis; and
one or more springs configured to pull the tensioner arm inwards towards the swing arm frame.

82. The differential drive of aspect 76, further comprising one or more opposing pairs of the tensioners of aspect 81, configured such that each pair is pulled inwards towards each other by the spring.

83. The driveshafts of aspect 4, wherein the driveshafts are configured to telescope.

84. The driveshafts of aspect 4, wherein the driveshafts comprise one or more universal joints.

85. The axle assembly of aspect 4, wherein the axle assembly comprises:
an axle configured to transfer power between a driveshaft and a power-transmitting device; one or more bearings configured to support the axle;
a bearing housing configured to rigidly support the bearings;
one or more slider blocks rigidly connected to the bearing housing; and
a pivot plate rigidly connected to the slider block, in communication with a swing arm, and configured such that the swing arm can be pivoted about a transverse axis.

86. The axle assembly of aspect 85, wherein the axle assembly is configured to be positionable at a multitude of locations in the rear drive such that variable width-between-swing arms can be achieved.

87. The pivot plate of aspect 85, wherein the transverse axis is substantially coaxial with the axle.

88. The energy conversion device of aspect 4, wherein the energy conversion device is an electric motor.

89. The mounting system of aspect 7, comprising the vehicle-portion of a mounting system and the drive-portion of a mounting system configured to allow a rear drive to be mounted to a vehicle.

90. The vehicle-portion of the mounting system of aspect 7, further comprising:
a receiver stop configured to be secured inside the trailer hitch receiver with one or more couplers; and
an adjustment screw rotationally connected to the receiver stop and threaded into the receiver post, and configured such that when turned, the receiver post advances into or out of the trailer hitch receiver.

91. The vehicle-portion of the mounting system of aspect 90, wherein the coupler is a screw.

92. The vehicle-portion of the mounting system of aspect 90, wherein the coupler is a pin.

93. The vehicle-portion of the mounting system of aspect 7, wherein the vehicle-portion includes a pilot feature configured to engage with a pilot feature of the drive system.

94. The pilot feature of aspect 93, wherein the pilot feature is hole.

95. The pilot feature of aspect 93, wherein the pilot feature is a protrusion.

96. The pilot feature of aspect 93, wherein the pilot feature includes a lead-in feature.

97. The vehicle-portion of the mounting system of aspect 7, wherein the vehicle-portion includes one or more rotational alignment features configured to engage with a one or more rotational alignment features of the drive system.

98. The rotational alignment feature of aspect 97, wherein the feature is a slot.

99. The rotational alignment feature of aspect 97, wherein the feature is a hole.

100. The rotational alignment feature of aspect 97 wherein the feature is a protrusion.

101. The rotational alignment feature of aspect 97 wherein the feature includes a lead-in feature.

102. The drive-portion of the mounting system of aspect 4, wherein the drive-portion includes a pilot feature configured to engage with a pilot feature of the vehicle system.

103. The pilot feature of aspect 102, wherein the pilot feature is hole.

104. The pilot feature of aspect 102, wherein the pilot feature is a protrusion.

105. The pilot feature of aspect 102, wherein the pilot feature includes a lead-in feature.

106. The drive-portion of the mounting system of aspect 4, wherein the drive-in portion includes one or more rotational alignment features configured to engage with a one or more rotational alignment features of the vehicle system.

107. The rotational alignment feature of aspect 106 wherein the feature is a slot.

108. The rotational alignment feature of aspect 106 wherein the feature is a hole.

109. The rotational alignment feature of aspect 106 wherein the feature is a protrusion.

110. The rotational alignment feature of aspect 106 wherein the feature includes a lead-in. feature 111. The vehicle-portion of the mounting system of aspect 7, configured such that the receiver post can be rigidly connected to the mounting plate in a multitude of vertical positions using one or more screws.

112. The vehicle-portion of the mounting system of aspect 111, configured such that one or more protrusions on the receiver post engage with a slot in the mounting plate to rotationally align the receiver post to the mounting plate.

113. The vehicle-portion of the mounting system of aspect 111, configured such that one or more protrusions on the mounting plate engage with a slot in the receiver post to rotationally align the receiver post to the mounting plate.

114. The pilot feature of aspect 95, configured such that the pilot feature can be rigidly connected to the mounting plate in a multitude of vertical positions using one or more screws.

115. The pilot feature of aspect 104, configured such that the pilot feature can be rigidly connected to the drive in a multitude of vertical positions using one or more screws.

116. The pilot feature of aspect 94, wherein a multitude of pilot features are included and are configured to correspond with the multitude of vertical positions in which the pilot feature of aspect 114 are located.

117. The pilot feature of aspect 103, wherein a multitude of pilot features are included and are configured to correspond with the multitude of vertical positions in which the pilot feature of aspect 115 are located.

118. The drive-portion of a mounting system of aspect 4, further comprising one or more screws configured such that they can interface with the mounting plate and secure the drive to the vehicle.

119. The screws of aspect 118, wherein the screws are captured.

120. The rear drive of aspect 4, wherein the rear drive includes one or more holes configured to allow access to the screws of aspect 118.

121. The rear dive of aspect 4, wherein the rear drive includes one or more holes configured to allow access to the adjustment screw of aspect 90.

The dimensions and/or values disclosed herein are not to be understood as being strictly limited to the exact numerical dimension and/or values recited. Instead, unless otherwise specified, each such dimension and/or value is intended to mean both the recited dimension and/or value and a functionally equivalent range surrounding that dimension and/or value. For example, a dimension disclosed as "12 inches" is intended to mean "about 12 inches".

Every document cited herein, including any cross-referenced or related patent or application is hereby incorporated herein by reference in its entirety unless expressly excluded or otherwise limited. The citation of any document is not an admission that it is prior art with respect to any invention disclosed or claimed herein or that it alone, or in any combination with any reference or references, teaches, suggests or discloses any such invention. Further, to the extend that any meaning or definition of a term in this document conflicts with any meaning or definition of the same term in a document incorporated by reference, the meaning or definition assigned to that term in this document shall govern.

While particular embodiments of the disclosure have been illustrated and described, it would be obvious to those skilled in the art that various other changes and modifications can be made without departing from the spirit and scope of the disclosure It is therefore intended to cover in the appended claims all such changes and modifications that are within the scope of this disclosure.

What is claimed is:

1. A system comprising:
    an energy storage device configured to store power for a vehicle, wherein the vehicle has a back end and at least one rear wheel;
    at least one power conversion device configured to transfer power between the energy storage device and the vehicle;
    a power conversion controller configured to regulate power flow between the energy storage device and the at least one power conversion device;
    an input device configured to receive input from a user and configured to translate the input into instructions for the power conversion controller;
    a rear drive comprising the at least one power conversion device and configured to be connected to the back end of the vehicle;
    a drivetrain configured to transmit power between the rear drive and the vehicle's at least one rear wheel;
    a drive mounting system comprising a rear-side coupling configured to connect to the back end of the vehicle; and
    a drive mounting assembly configured to connect the rear drive to the rear-side coupling.

2. The system of claim 1, wherein the energy storage device comprises a battery configured to store electrical energy.

3. The system of claim 1, wherein the at least one power conversion device comprises at least one electric motor.

4. The system of claim 1, wherein the power conversion controller comprises an electric motor drive.

5. The system of claim 1, wherein the input device comprises a throttle configured to communicate a magnitude of power flow between the at least one power conversion device and the vehicle as requested from a user.

6. The system of claim 5, wherein the vehicle further comprises an accelerator pedal and wherein the throttle comprises a range finder configured to be connected to the accelerator pedal and to communicate a distance between a user's foot and the accelerator pedal to the power conversion controller.

7. The system of claim 5, wherein the vehicle further comprises a steering wheel and wherein the throttle comprises a paddle configured to:
    be connected to the steering wheel,
    be pulled by a user to a desired paddle position; and
    communicate the paddle position to the power conversion controller.

8. The system of claim 5, wherein the throttle comprises a throttle pedal configured to be depressed by a user.

9. The system of claim 5, wherein the throttle is configured to communicate a request for accelerative power to the system when operated in a first input range by a user, and configured to communicate a request for braking power when operated in a second input range by the user.

10. The system of claim 1, wherein the input device comprises a brake input device configured to communicate a magnitude of braking power provided by the at least one power conversion device to the vehicle, as requested by a user.

11. The system of claim 10, wherein the vehicle further comprises a brake pedal and wherein the brake input device comprises a range finder configured to be connected to the brake pedal and configured to communicate a distance between a user's foot and the brake pedal to the power conversion controller.

12. The system of claim 10, wherein the vehicle further comprises a steering wheel and wherein the brake input device comprises a paddle configured to:
    be connected to the steering wheel,
    be pulled by a user to a desired paddle position; and
    communicate the paddle position to the system.

13. The system of claim 1, wherein the vehicle further comprises an onboard diagnostic system and an accelerator pedal, and wherein the input device comprises an interface with the onboard diagnostic system and is configured to read an accelerator pedal position from the onboard diagnostic system and communicate it to the power conversion controller.

14. The system of claim 1, wherein the vehicle further comprises a frame and the system comprises a drive mounting system configured to connect the rear drive to the frame.

15. The system of claim 1, wherein the vehicle further comprises a trailer hitch receiver and the system comprises a drive mounting system configured to connect the rear drive to the trailer hitch receiver.

16. The system of claim 1, the system further comprising a drive mounting system configured to connect the rear drive to the vehicle at a plurality of vertical positions.

17. The system of claim 1, the system further comprising an energy storage device charger.

18. The system of claim 17, wherein the energy storage device charger is a battery charger.

19. The system of claim 1, the system further comprising a user interface comprising a display and control electronics configured to allow a user to communicate with the system.

20. The system of claim 19, wherein the vehicle further comprise a dashboard and wherein the user interface is configured to be installed on top of the dashboard.

21. The system of claim 19, wherein the user interface is configured to receive and communicate requests from a user for forward and reverse direction of travel.

22. The system of claim 19, wherein the user interface is configured to receive and communicate requests from a user to power the system on and off.

23. The system of claim 19, wherein the user interface is configured to communicate a state of charge of the energy storage device to a user.

24. The system of claim 1, the rear drive further comprising at least one wheel configured to support at least a portion of the system's weight.

25. The system of claim 24, wherein the at least one wheel is a caster wheel.

26. The system of claim 24, wherein the rear drive further comprises a suspension system configured to allow vertical travel of the at least one wheel.

27. The system of claim 26, wherein the suspension system comprises a height adjustment mechanism configured to enable a user to adjust the nominal ride height of the rear drive.

28. The system of claim 26, wherein the suspension system comprises a height adjustment mechanism configured to enable a user to adjust a portion of the total system weight supported by the suspension system.

29. The system of claim 1, the system further comprising a trailer comprising the energy storage device, at least one wheel having a centerline, and a moving caster axis mechanism, wherein the moving caster axis mechanism is configured to:
 connect the trailer to the rear drive such that relative yaw rotation is allowed;
 position the axis of yaw rotation ahead of the at least one trailer wheel centerline when moving in a forward direction; and
 position the axis of yaw rotation behind the at least one trailer wheel centerline when moving in a reverse direction.

30. The system of claim 1, wherein the vehicle comprises an engine-driven power steering pump, the system further comprising a power steering pump configured to be hydraulically connected in parallel with the engine-driven power steering pump and to receive power from the energy storage device.

31. The system of claim 30, wherein the power steering pump comprises an electric motor and is configured to receive electrical energy.

32. The system of claim 30, wherein the power steering pump comprises a power steering pump outlet, the system further comprising a check valve configured to allow flow out of the power steering pump outlet and prevent flow into the power steering pump outlet.

33. The system of claim 30, wherein the engine-driven power steering pump comprises an engine-driven power steering pump outlet, the system further comprising a check valve configured to allow flow out of the engine-driven power steering pump outlet and prevent flow into the engine-driven power steering pump outlet.

34. A system comprising a trailer configured to be connected to a vehicle having a back end, the trailer comprising a moving caster axis mechanism and at least one wheel configured to rotate about a wheel axis, wherein the moving caster axis mechanism is configured to:
 connect the trailer to the back end of a vehicle such that relative yaw rotation is allowed;
 position the axis of yaw rotation ahead of the wheel axis when moving in a forward direction; and
 position the axis of yaw rotation behind the wheel axis when moving in a reverse direction.

\* \* \* \* \*